(12) United States Patent
Lyden

(10) Patent No.: US 7,770,306 B2
(45) Date of Patent: Aug. 10, 2010

(54) CUSTOM ARTICLE OF FOOTWEAR

(76) Inventor: Robert M. Lyden, 18261 SW. Fallatin Loop, Aloha, OR (US) 97007

( * ) Notice: Subject to any disclaimer, the term of this patent is extended or adjusted under 35 U.S.C. 154(b) by 249 days.

(21) Appl. No.: 11/895,506

(22) Filed: Aug. 23, 2007

(65) Prior Publication Data

US 2008/0060220 A1   Mar. 13, 2008

Related U.S. Application Data

(63) Continuation-in-part of application No. 11/519,166, filed on Sep. 11, 2006, which is a continuation-in-part of application No. 10/279,626, filed on Oct. 24, 2002, now Pat. No. 7,107,235, which is a continuation-in-part of application No. 10/152,402, filed on May 21, 2002, now Pat. No. 7,016,867, and a continuation-in-part of application No. 09/573,121, filed on May 17, 2000, now Pat. No. 6,601,042, which is a continuation-in-part of application No. 09/523,341, filed on Mar. 10, 2000, now Pat. No. 6,449,878.

(60) Provisional application No. 60/360,784, filed on Mar. 1, 2002, provisional application No. 60/345,951, filed on Dec. 29, 2001, provisional application No. 60/292,644, filed on May 21, 2001.

(51) Int. Cl.
  *A43B 13/28* (2006.01)
  *A43B 3/24* (2006.01)
  *A43B 13/20* (2006.01)

(52) U.S. Cl. .............................. 36/27; 36/35 R; 36/29; 36/35 B; 36/68; 36/7.8; 36/100

(58) Field of Classification Search .................... 36/27, 36/35 R, 29, 35 B, 68, 7.8, 25 R, 30 R, 100
See application file for complete search history.

(56) References Cited

U.S. PATENT DOCUMENTS

| 75,900 A | 3/1868 | Hale et al. ................... 36/28 |
| 217,761 A | 7/1879 | Winn |
| 220,629 A | 10/1879 | Massey et al. ................ 36/39 |
| RE9,618 E | 3/1881 | Nichols ........................ 36/27 |
| 298,844 A | 6/1884 | Glanville |
| 318,366 A | 5/1885 | Fitch |
| 324,065 A | 8/1885 | Andrews ....................... 36/37 |
| 337,146 A | 3/1886 | Gluecksmann ............... 36/7.8 |

(Continued)

FOREIGN PATENT DOCUMENTS

AT   33492   6/1908

(Continued)

OTHER PUBLICATIONS http://adidas.freehomepage.com/technology-timeline.html, 3 pages.

(Continued)

*Primary Examiner*—Ted Kavanaugh

(57) ABSTRACT

The present invention teaches a custom article of footwear, a method of making the same, and a method of conducting retail and Internet business. In particular, the components of the custom article of footwear can be selected from a wide range of options, and they can be easily removed and replaced, as desired.

22 Claims, 30 Drawing Sheets

U.S. PATENT DOCUMENTS

| | | | |
|---|---|---|---|
| 357,062 A | 2/1887 | Buch | |
| 372,435 A | 11/1887 | Sommerfield | 36/42 |
| 620,582 A | 3/1889 | Goff | |
| 413,693 A | 10/1889 | Walker | 36/7.8 X |
| 418,922 A | 1/1890 | Minahan | |
| 427,136 A | 5/1890 | Walker | 36/7.8 X |
| 504,660 A | 9/1893 | Blandy | 36/15 |
| 622,673 A | 4/1899 | Ferrata | |
| 641,642 A | 1/1900 | Gunn | |
| 733,169 A | 7/1903 | Denton | 36/37 X |
| 854,274 A | 5/1907 | Crook et al. | |
| 871,864 A | 11/1907 | Feazell et al. | |
| 927,831 A | 7/1909 | Crane | |
| 968,020 A | 8/1910 | Yandoli | 36/179 |
| 997,657 A | 7/1911 | Drake | 36/129 |
| 1,022,672 A | 4/1912 | Hammer | 36/37 X |
| 1,043,350 A | 11/1912 | Owes | |
| 1,080,781 A | 12/1913 | Razntch | |
| 1,088,328 A | 2/1914 | Cucinotta | |
| 1,107,894 A | 8/1914 | Cain | |
| 1,113,266 A | 10/1914 | Wächter | |
| 1,127,456 A | 2/1915 | Kurz | 36/38 |
| 1,141,889 A | 6/1915 | Trolle | 36/134 |
| 1,147,508 A | 7/1915 | Hussey | |
| 1,154,340 A | 9/1915 | Rolfe | |
| 1,160,810 A | 11/1915 | Abramowitz | |
| 1,182,787 A | 5/1916 | Murphy | |
| 1,196,410 A | 8/1916 | Walker | |
| 1,219,507 A | 3/1917 | Teare | 36/7.2 |
| 1,283,456 A | 11/1918 | Basler | 36/9 R |
| 1,304,646 A | 5/1919 | Barber | 36/15 |
| 1,352,865 A | 9/1920 | Augestad | 36/27 |
| 1,370,212 A | 3/1921 | Iaculli | |
| 1,380,879 A | 6/1921 | Young | |
| 1,387,411 A * | 8/1921 | Kolkebeck | 36/76 R |
| 1,403,970 A | 1/1922 | Lioy | |
| 1,493,856 A | 5/1924 | Golden | 36/59 R |
| 1,502,087 A | 7/1924 | Bunns | |
| 1,587,749 A | 7/1924 | Bierly | |
| 1,522,890 A | 1/1925 | Krap | |
| 1,539,762 A | 5/1925 | Mussabini | |
| 1,585,220 A | 5/1926 | Willis | 36/39 |
| 1,625,048 A | 4/1927 | Nock | 36/38 |
| 1,726,028 A | 8/1929 | Keller | 36/7.8 |
| 1,741,340 A | 12/1929 | Scholl | |
| 1,773,242 A | 8/1930 | Siekacz | 36/15 |
| 1,778,089 A | 10/1930 | Pomerantz | 36/36 R |
| 1,786,374 A | 12/1930 | Walton | 36/15 |
| 1,841,710 A | 1/1932 | Bryne et al. | 36/7.3 |
| 1,889,716 A | 11/1932 | Walker | |
| 1,894,681 A | 1/1933 | Greider | |
| 1,920,112 A | 7/1933 | Shaft | |
| 1,936,637 A | 11/1933 | Manfra | 36/36 R |
| 1,982,588 A | 11/1934 | Bartel | 36/59 R |
| 2,095,095 A | 3/1935 | Howard | 36/59 |
| D95,767 S | 5/1935 | Marks | |
| 2,002,706 A | 5/1935 | Mong | 36/7.6 |
| 2,040,186 A | 5/1936 | Riddell | 36/107 |
| 2,048,683 A | 7/1936 | Brockman | |
| 2,082,537 A | 6/1937 | Butler | 36/129 |
| 2,095,766 A | 10/1937 | Shapiro | 36/129 |
| 2,102,368 A | 12/1937 | Martel | 66/182 |
| 2,112,052 A | 3/1938 | Smith | 36/2.5 |
| 2,129,424 A * | 9/1938 | Jay | 36/76 R |
| D111,852 S | 10/1938 | Hurzeler | |
| 2,144,563 A | 1/1939 | Davis | 66/182 |
| 2,172,000 A | 3/1939 | Wenker | 272/70 |
| 2,178,025 A | 10/1939 | Richter | 36/2.5 |
| 2,183,277 A | 12/1939 | Heilhecker | 36/14 |
| 2,199,713 A | 5/1940 | Perujia | 36/8.3 |
| 2,200,080 A | 5/1940 | Fein | 36/2.5 |
| D121,466 S | 6/1940 | Calderazzo | |
| 2,205,091 A | 6/1940 | Geffner | 36/2.5 |
| 2,207,476 A | 7/1940 | Bernstein | 36/59 R |
| 2,208,104 A | 7/1940 | Perujia | 36/92 |
| D122,607 S | 9/1940 | Nutt | |
| 2,220,534 A | 11/1940 | McLean | 36/11.5 |
| 2,234,542 A | 3/1941 | Anderson | 36/36 R |
| 2,236,367 A | 3/1941 | Gruber | 36/2.5 |
| 2,260,138 A | 10/1941 | Feinberg | 36/1 |
| 2,391,064 A | 2/1942 | McCandless | 2/239 |
| 2,368,314 A | 5/1942 | Marx | 36/11.5 |
| 2,288,168 A | 6/1942 | Leu | 36/39 |
| 2,302,596 A | 11/1942 | Bigio | 36/2.5 |
| 2,333,373 A | 12/1942 | Grey | 66/171 |
| 2,403,442 A | 7/1946 | Klaus | 36/87 |
| D145,816 S | 10/1946 | Payne | D7/7 |
| 2,413,545 A | 12/1946 | Cordi | 36/7.8 X |
| 2,414,445 A | 1/1947 | Cahill | 36/8.5 |
| 2,424,609 A | 7/1947 | Friedmann, Jr. | 36/91 |
| 2,444,865 A | 7/1947 | Warrington | 36/38 |
| 2,430,338 A | 11/1947 | Heiman | 36/12 |
| 2,435,668 A | 2/1948 | Behringer et al. | 36/11.5 |
| 2,447,603 A | 8/1948 | Snyder | 36/38 |
| 2,456,102 A | 12/1948 | Agostinelli | 36/68 |
| 2,508,318 A | 1/1949 | Wallach | 36/38 |
| 2,465,817 A | 3/1949 | Perujia | 36/88 |
| 2,469,708 A | 5/1949 | Alexander | 36/11.5 |
| 2,486,704 A | 11/1949 | Cameron | 36/36 R |
| 2,491,930 A | 12/1949 | Parlante | 36/2.5 |
| 2,493,154 A | 1/1950 | Mavrakis | 36/2.5 |
| 2,497,175 A | 2/1950 | Mantos | 36/2.5 |
| 2,537,156 A | 1/1951 | Pennell | 36/43 |
| 2,552,943 A | 5/1951 | Danielius | 36/15 |
| 2,579,953 A | 12/1951 | Morris | 36/7.6 |
| 2,588,061 A | 3/1952 | Vesely | 36/11.5 |
| 2,721,400 A | 10/1952 | Israel | 36/8.5 |
| 2,640,283 A | 6/1953 | McCord | 36/25 |
| 2,645,864 A | 7/1953 | Ballasch | 36/36 C |
| 2,814,132 A | 10/1953 | Montoscuro | 36/37 |
| 2,687,528 A | 8/1954 | Paul | 2/61 |
| 2,761,224 A | 9/1956 | Gardiner | 36/11.5 |
| 2,767,487 A | 10/1956 | Friedmann, Jr. | 36/91 |
| 2,771,691 A | 11/1956 | Luchs | 36/10 |
| 2,776,502 A | 1/1957 | Taylor | 36/39 |
| 2,790,975 A | 5/1957 | McCormick | 2/239 |
| 2,809,449 A | 10/1957 | Smith | 36/2.5 |
| 2,817,165 A | 12/1957 | Dassler | 36/59 |
| 2,873,540 A | 2/1959 | Murphy | 36/2.5 |
| 2,953,861 A | 5/1959 | Horten | 36/7.8 |
| 2,908,983 A | 10/1959 | Berke | 36/39 |
| 2,931,110 A | 4/1960 | Pietrocola | 36/30 |
| 3,012,340 A | 12/1961 | Reinhart | 36/2.5 |
| 3,012,341 A | 12/1961 | Schaefer | 36/2.5 |
| D194,309 S | 1/1963 | Levine | D7/7 |
| D194,345 S | 1/1963 | Levine | D7/7 |
| 3,075,212 A | 1/1963 | Sherbrook | 12/142 |
| 3,085,410 A | 4/1963 | Loizillon | 66/185 |
| 3,102,271 A | 9/1963 | Wilkerson | 2/239 |
| 3,127,687 A | 4/1964 | Hollister et al. | 36/2.5 |
| 3,130,504 A | 4/1964 | Deitch | 36/36 R |
| 3,142,910 A | 8/1964 | Levine | 36/92 |
| 3,204,346 A | 9/1965 | Lockard et al. | 36/2.5 |
| 3,214,849 A | 11/1965 | Nadaud | 36/38 |
| 3,251,144 A | 5/1966 | Weitzner | 36/2.5 |
| 3,274,409 A | 9/1966 | Lipinski | 36/10 |
| D205,882 S | 10/1966 | Post | D7/7 |
| 3,333,353 A | 8/1967 | Garcia | 36/68 |
| 3,352,034 A | 11/1967 | Braun | 36/67 |
| 3,369,309 A | 2/1968 | Brooks | 36/2.5 |
| 3,373,510 A | 3/1968 | Memole et al. | 36/100 |
| 3,404,468 A | 10/1968 | Rosen | 36/11 |
| 3,436,843 A | 4/1969 | Sacks | 36/2.5 |
| 3,526,976 A | 9/1970 | Jacobs | 36/100 |

| | | | |
|---|---|---|---|
| 3,538,628 A | 11/1970 | Einstein, Jr. .................... 36/15 |
| 3,541,708 A | 11/1970 | Rosen ............................ 36/2.5 |
| 3,577,663 A | 5/1971 | Mershon ........................ 36/67 |
| 3,597,863 A | 8/1971 | Austin ............................ 36/59 |
| 3,684,175 A | 8/1972 | Arle, Jr. et al. ................. 36/7.6 |
| 3,686,777 A | 8/1972 | Rosen ............................ 36/2.5 |
| 3,686,779 A | 8/1972 | Sacks ........................ 36/2.5 W |
| 3,735,507 A | 5/1973 | Granger ....................... 36/59 R |
| 3,775,873 A | 12/1973 | Small ........................... 36/11.5 |
| 3,777,374 A | 12/1973 | Hendricks ........................ 36/38 |
| 3,786,579 A | 1/1974 | Clark et al. .................... 36/7.6 |
| 3,796,067 A | 3/1974 | East ................................ 66/178 |
| 3,810,318 A | 5/1974 | Epstein ....................... 36/2.5 F |
| 3,812,605 A | 5/1974 | Kaestle ........................ 36/67 D |
| 3,818,617 A | 6/1974 | Dassler et al. ............... 36/32 R |
| 3,822,488 A | 7/1974 | Johnson ........................ 36/129 |
| 3,822,490 A | 7/1974 | Murawski ................... 36/2.5 R |
| 3,846,919 A | 11/1974 | Milotic ............................ 36/100 |
| 3,858,337 A | 1/1975 | Vogel ............................... 36/55 |
| 3,859,739 A | 1/1975 | Dassler ........................ 36/67 D |
| 3,866,339 A | 2/1975 | Latto ............................. 36/100 |
| 3,878,626 A | 4/1975 | Isman .............................. 36/15 |
| 3,886,674 A | 6/1975 | Pavia .............................. 36/38 |
| 3,906,646 A | 9/1975 | Milotic ........................ 36/2.5 C |
| 3,911,600 A | 10/1975 | Dassler ........................ 36/67 D |
| 3,967,392 A | 7/1976 | Dassler ........................ 36/67 B |
| 3,982,336 A | 9/1976 | Herro .............................. 36/62 |
| 3,983,642 A | 10/1976 | Liao .............................. 36/101 |
| 4,062,132 A | 12/1977 | Klimaszewski ............... 36/100 |
| 4,091,472 A | 5/1978 | Daher et al. ..................... 623/55 |
| 4,103,440 A | 8/1978 | Lawrence ..................... 36/101 |
| 4,107,857 A | 8/1978 | Devlin .......................... 36/129 |
| 4,107,858 A | 8/1978 | Bowerman et al. ............ 36/134 |
| 4,128,950 A | 12/1978 | Bowerman et al. ......... 36/30 R |
| 4,132,016 A | 1/1979 | Vaccari .......................... 36/114 |
| 4,146,981 A | 4/1979 | Renaldo ......................... 36/100 |
| 4,183,156 A | 1/1980 | Rudy .............................. 36/44 |
| 4,187,623 A | 2/1980 | Dassler .......................... 36/129 |
| 4,194,249 A | 3/1980 | Thorneburg ...................... 2/239 |
| 4,198,037 A | 4/1980 | Anderson ..................... 267/153 |
| 4,217,705 A | 8/1980 | Donzis ............................. 36/29 |
| 4,219,945 A | 9/1980 | Rudy .............................. 36/29 |
| 4,237,625 A | 12/1980 | Cole et al. ....................... 36/28 |
| 4,253,317 A | 3/1981 | Howard et al. ................. 66/186 |
| 4,255,877 A * | 3/1981 | Bowerman .................... 36/129 |
| 4,255,949 A | 3/1981 | Thorneburg .................... 66/185 |
| 4,258,480 A | 3/1981 | Famolare, Jr. .................. 36/91 |
| 4,259,792 A | 4/1981 | Halberstadt ..................... 36/28 |
| 4,262,434 A | 4/1981 | Michelotti ....................... 36/67 |
| 4,263,793 A | 4/1981 | Safrit et al. .................... 66/185 |
| 4,267,649 A | 5/1981 | Smith ............................ 36/101 |
| 4,267,650 A | 5/1981 | Bauer ........................... 36/101 |
| 4,267,728 A | 5/1981 | Manley et al. ................. 73/172 |
| 4,271,606 A | 6/1981 | Rudy .............................. 36/29 |
| 4,271,607 A | 6/1981 | Funck ............................. 36/30 |
| 4,277,959 A | 7/1981 | Thorneburg .................... 66/182 |
| 4,279,083 A | 7/1981 | Dilg .............................. 36/101 |
| 4,287,250 A | 9/1981 | Rudy ............................. 428/166 |
| 4,299,038 A | 11/1981 | Epple ........................... 36/67 D |
| 4,300,294 A | 11/1981 | Riecken .......................... 36/97 |
| 4,314,412 A | 2/1982 | Anderson et al. ............. 36/100 |
| 4,314,413 A | 2/1982 | Dassler ......................... 36/129 |
| 4,317,294 A | 3/1982 | Goodyear ..................... 36/100 |
| 4,322,893 A | 4/1982 | Halvorsen ...................... 36/43 |
| 4,322,895 A | 4/1982 | Hockerson ..................... 36/129 |
| 4,333,248 A | 6/1982 | Samuels ....................... 36/72 R |
| 4,335,530 A | 6/1982 | Stubblefield .................... 36/83 |
| 4,340,626 A | 7/1982 | Rudy ............................. 428/35 |
| 4,341,096 A | 7/1982 | Safrit et al. .................... 66/185 |
| 4,342,158 A | 8/1982 | McMahon et al. .......... 36/35 R |
| 4,343,057 A | 8/1982 | Bensley ..................... 12/142 D |
| 4,349,970 A | 9/1982 | Silver ........................... 36/3 B |
| 4,351,120 A | 9/1982 | Dalebout .................... 36/117 |

| | | | |
|---|---|---|---|
| 4,358,902 A | 11/1982 | Cole et al. ........................ 36/28 |
| 4,360,978 A | 11/1982 | Simpkins .................. 36/7.8 X |
| 4,361,971 A | 12/1982 | Bowerman .................... 36/129 |
| 4,364,188 A | 12/1982 | Turner et al. ................... 36/31 |
| 4,364,189 A | 12/1982 | Bates ............................. 36/31 |
| 4,366,632 A | 1/1983 | Bente ......................... 36/67 D |
| 4,370,754 A | 2/1983 | Donzis ............................. 2/2 |
| 4,372,058 A | 2/1983 | Stubblefield ................. 36/32 R |
| 4,373,361 A | 2/1983 | Thorneburg ................ 66/178 R |
| 4,377,042 A | 3/1983 | Bauer ........................... 36/101 |
| 4,389,798 A | 6/1983 | Tilles ........................... 36/129 |
| 4,391,048 A | 7/1983 | Lutz ................................ 36/28 |
| 4,399,620 A | 8/1983 | Funck ........................ 36/30 R |
| 4,402,146 A | 9/1983 | Parracho et al. .............. 36/129 |
| 4,409,745 A | 10/1983 | Musci .......................... 36/24.5 |
| 4,414,763 A | 11/1983 | Bente ........................... 36/134 |
| 4,420,894 A | 12/1983 | Glassman ........................ 36/12 |
| 4,429,474 A | 2/1984 | Metro ......................... 36/36 A |
| 4,429,475 A | 2/1984 | Bensley ........................... 36/45 |
| 4,430,810 A | 2/1984 | Bente .......................... 36/32 R |
| 4,439,935 A | 4/1984 | Kelly ........................... 36/101 |
| 4,439,936 A | 4/1984 | Clarke et al. .................. 36/102 |
| 4,441,211 A | 4/1984 | Donzis ............................. 2/2 |
| 4,450,633 A | 5/1984 | Connelly ...................... 36/101 |
| 4,453,271 A | 6/1984 | Donzis ............................. 2/2 |
| 4,470,207 A | 9/1984 | Bente ........................... 36/134 |
| 4,471,538 A | 9/1984 | Pomeranz et al. ............... 36/28 |
| 4,481,726 A | 11/1984 | Phillips ....................... 36/30 A |
| 4,481,727 A | 11/1984 | Stubblefield .................... 36/83 |
| 4,484,397 A | 11/1984 | Curley, Jr. ..................... 36/92 |
| 4,486,901 A | 12/1984 | Donzis ............................. 2/2 |
| 4,486,964 A | 12/1984 | Rudy ............................... 36/28 |
| 4,492,046 A | 1/1985 | Kosova ............................ 36/27 |
| 4,497,123 A | 2/1985 | Ehrlich ........................ 36/32 R |
| 4,506,460 A | 3/1985 | Rudy ............................... 36/28 |
| 4,506,462 A | 3/1985 | Cavanagh ....................... 36/92 |
| 4,513,449 A | 4/1985 | Donzis ............................. 2/2 |
| 4,520,635 A | 6/1985 | Shields et al. ................. 66/185 |
| 4,523,396 A | 6/1985 | Dassler ........................ 36/134 |
| 4,534,124 A | 8/1985 | Schnell ......................... 36/114 |
| 4,535,554 A | 8/1985 | De Obaldia B. ............. 36/113 |
| 4,536,974 A | 8/1985 | Cohen ............................. 36/28 |
| D280,567 S | 9/1985 | Ji ................................ D2/310 |
| 4,538,368 A | 9/1985 | Mugford ...................... 36/112 |
| 4,542,598 A | 9/1985 | Misevich et al. ............. 36/114 |
| 4,542,599 A | 9/1985 | Annovi ......................... 36/117 |
| 4,561,195 A | 12/1985 | Onoda et al. ................ 36/30 R |
| 4,562,651 A | 1/1986 | Frederick et al. ............. 36/102 |
| 4,566,206 A | 1/1986 | Weber ......................... 36/27 X |
| 4,577,417 A | 3/1986 | Cole ............................... 36/29 |
| 4,578,882 A | 4/1986 | Talarico, II ................... 36/103 |
| 4,586,209 A | 5/1986 | Bensley ..................... 12/142 D |
| 4,592,153 A | 6/1986 | Jacinto ............................ 36/38 |
| 4,598,376 A | 7/1986 | Burton et al. ................ 364/470 |
| 4,598,487 A | 7/1986 | Misevich ...................... 36/114 |
| 4,604,807 A | 8/1986 | Bock et al. ..................... 33/3 C |
| 4,606,139 A | 8/1986 | Silver ............................. 36/15 |
| 4,610,100 A | 9/1986 | Rhodes ........................... 36/42 |
| 4,611,412 A | 9/1986 | Cohen ............................. 36/28 |
| 4,615,188 A | 10/1986 | Hursh et al. ................... 66/196 |
| 4,620,372 A | 11/1986 | Goodrich ...................... 36/103 |
| 4,622,764 A | 11/1986 | Boulier .......................... 36/68 |
| 4,633,600 A | 1/1987 | Dassler et al. ................ 36/134 |
| 4,638,575 A | 1/1987 | Illustrato ........................ 36/38 |
| 4,638,576 A | 1/1987 | Parracho et al. ................. 36/68 |
| 4,642,911 A | 2/1987 | Talarico, II ................. 36/30 R |
| 4,644,672 A | 2/1987 | Dassler et al. ................ 36/134 |
| 4,648,187 A | 3/1987 | Dassler et al. |
| 4,651,354 A | 3/1987 | Petrey ........................... 2/239 |
| 4,651,445 A | 3/1987 | Hannibal ...................... 36/103 |
| 4,652,266 A | 3/1987 | Truesdell |
| 4,670,995 A | 6/1987 | Huang ............................ 36/29 |
| 4,694,591 A | 9/1987 | Banich et al. ................. 36/102 |

| Patent No. | Date | Inventor | Class |
|---|---|---|---|
| 4,706,392 A | 11/1987 | Yang et al. | 36/101 |
| 4,715,130 A | 12/1987 | Scatena | 36/27 |
| 4,727,661 A | 3/1988 | Kuhn | 36/100 |
| 4,732,015 A | 3/1988 | Abrams et al. | 66/172 E |
| 4,736,203 A | 4/1988 | Sidlauskas | 340/825.34 |
| 4,741,114 A | 5/1988 | Stubblefield | 36/32 R |
| 4,745,693 A | 5/1988 | Brown | 36/101 |
| 4,747,220 A | 5/1988 | Autry et al. | 36/59 R |
| 4,756,095 A | 7/1988 | Lakic | 36/2.6 |
| 4,766,679 A | 8/1988 | Bender | 36/30 R |
| 4,766,681 A | 8/1988 | O'Rourke et al. | 36/89 |
| 4,768,295 A | 9/1988 | Ito | 36/28 |
| 4,771,554 A | 9/1988 | Hannemann | 36/27 |
| 4,783,910 A | 11/1988 | Boys, II et al. | 36/107 |
| 4,794,707 A | 1/1989 | Franklin et al. | 36/107 |
| 4,800,657 A | 1/1989 | Brown | |
| 4,805,321 A | 2/1989 | Tonkel | 36/54 |
| 4,807,372 A | 2/1989 | McCall | 36/135 |
| 4,813,436 A | 3/1989 | Au | 128/779 |
| 4,815,221 A | 3/1989 | Diaz | 36/27 |
| 4,817,304 A | 4/1989 | Parker et al. | 36/114 |
| 4,821,430 A * | 4/1989 | Flemming et al. | 36/69 |
| 4,822,363 A | 4/1989 | Phillips et al. | |
| 4,825,563 A | 5/1989 | Strongwater | 36/73 |
| 4,833,795 A | 5/1989 | Diaz | 36/29 |
| 4,837,949 A | 6/1989 | Dufour | 36/127 |
| 4,843,737 A | 7/1989 | Vorderer | 36/38 |
| 4,850,122 A | 7/1989 | Schwab, Jr. | 36/72 R |
| 4,854,057 A | 8/1989 | Misevich et al. | 36/114 |
| 4,858,341 A | 8/1989 | Rosen | 36/97 |
| RE33,066 E | 9/1989 | Stubblefield | 36/83 |
| 4,874,640 A | 10/1989 | Donzis | 427/421 |
| 4,875,300 A | 10/1989 | Kazz | 36/134 |
| 4,878,300 A | 11/1989 | Bogaty | 36/35 R |
| 4,878,301 A | 11/1989 | Kiyosawa | 36/69 |
| 4,881,329 A | 11/1989 | Crowley | 36/38 |
| 4,887,367 A | 12/1989 | Mackness et al. | 36/28 |
| 4,887,369 A | 12/1989 | Bailey et al. | 36/101 |
| 4,890,397 A | 1/1990 | Harada et al. | 36/30 R |
| 4,892,554 A | 1/1990 | Robinson et al. | |
| 4,894,934 A | 1/1990 | Illustrato | 36/37 |
| 4,897,938 A | 2/1990 | Otsuka | 36/88 |
| 4,898,007 A | 2/1990 | Dahlgren | 66/185 |
| 4,906,502 A | 3/1990 | Rudy | 428/69 |
| 4,910,855 A | 3/1990 | Balarzs | 36/38 X |
| 4,910,884 A | 3/1990 | Lindh et al. | 36/28 |
| 4,912,861 A | 4/1990 | Huang | 36/29 |
| 4,918,838 A | 4/1990 | Chang | 36/28 |
| D307,608 S | 5/1990 | Shure | D21/72 |
| 4,922,631 A | 5/1990 | Anderié | 36/102 |
| 4,926,503 A | 5/1990 | Wingo, Jr. | 2/267 |
| 4,934,072 A | 6/1990 | Fredericksen et al. | 36/29 |
| 4,936,028 A | 6/1990 | Posacki | 36/15 |
| 4,936,029 A | 6/1990 | Rudy | 36/29 |
| 4,941,273 A | 7/1990 | Gross et al. | |
| 4,942,677 A | 7/1990 | Flemming et al. | |
| 4,949,476 A | 8/1990 | Anderié | 36/129 |
| 4,958,447 A | 9/1990 | DuPree | 36/101 |
| 4,967,492 A | 11/1990 | Rosen | 36/97 |
| 4,970,807 A | 11/1990 | Anderié et al. | 36/28 |
| 4,974,344 A | 12/1990 | Ching | 36/101 |
| 4,985,931 A | 1/1991 | Wingo, Jr. | 2/2 |
| 4,989,349 A | 2/1991 | Ellis, III | 36/25 R |
| 5,003,709 A | 4/1991 | Okayasu et al. | 36/107 |
| 5,005,300 A | 4/1991 | Diaz et al. | 36/101 |
| 5,014,449 A | 5/1991 | Richard et al. | 36/114 |
| 5,024,007 A | 6/1991 | Dufour | 36/127 |
| 5,029,341 A | 7/1991 | Wingo, Jr. | 2/2 |
| 5,035,009 A | 7/1991 | Wingo, Jr. et al. | 2/414 |
| 5,042,174 A | 8/1991 | Nichols | 36/25 |
| 5,042,175 A | 8/1991 | Ronen et al. | 36/28 |
| 5,042,176 A | 8/1991 | Rudy | 36/29 |
| 5,046,267 A | 9/1991 | Kilgore et al. | 36/114 |
| 5,052,130 A | 10/1991 | Barry et al. | 36/107 |
| 5,060,401 A | 10/1991 | Whatley | 36/25 R |
| 5,063,603 A | 11/1991 | Burt | 382/37 |
| 5,065,531 A | 11/1991 | Prestridge | 36/100 |
| 5,083,361 A | 1/1992 | Rudy | 29/454 |
| 5,083,385 A | 1/1992 | Halford | 36/101 |
| 5,086,576 A | 2/1992 | Lamson | 36/131 |
| 5,092,060 A | 3/1992 | Frachey et al. | 36/29 |
| 5,097,607 A | 3/1992 | Fredericksen | 36/291 |
| 5,109,614 A | 5/1992 | Curry | 36/100 |
| 5,113,599 A | 5/1992 | Cohen et al. | 36/88 |
| 5,123,169 A | 6/1992 | White et al. | 33/6 |
| 5,123,180 A | 6/1992 | Nannig et al. | 36/43 |
| 5,123,181 A | 6/1992 | Rosen | 36/97 |
| 5,125,173 A | 6/1992 | Nagano et al. | 36/131 |
| 5,128,880 A | 7/1992 | White | 364/550 |
| 5,131,173 A | 7/1992 | Anderé | 36/25 R |
| 5,133,138 A | 7/1992 | Durcho | 36/36 R |
| 5,138,776 A | 8/1992 | Levin | 36/38 |
| 5,155,927 A | 10/1992 | Bates et al. | 36/28 |
| 5,159,767 A | 11/1992 | Allen | 36/27 |
| 5,164,793 A | 11/1992 | Wolfersberger et al. | 356/376 |
| 5,185,943 A | 2/1993 | Tong et al. | 36/28 |
| 5,187,883 A | 2/1993 | Penny | 36/35 R |
| D334,276 S * | 3/1993 | Feller et al. | D2/946 |
| 5,191,727 A | 3/1993 | Barry et al. | 36/107 |
| 5,195,030 A | 3/1993 | White | 364/401 |
| 5,195,258 A | 3/1993 | Loader | 36/38 |
| 5,197,206 A | 3/1993 | Shorten | 36/29 |
| 5,197,207 A | 3/1993 | Shorten | 36/29 |
| 5,197,210 A | 3/1993 | Sink | 36/127 |
| 5,201,125 A | 4/1993 | Shorten | 36/29 |
| 5,203,095 A | 4/1993 | Allen | 36/27 |
| 5,205,056 A | 4/1993 | Okajima et al. | 36/131 |
| 5,206,804 A | 4/1993 | Thies et al. | 364/401 |
| 5,212,878 A | 5/1993 | Burke et al. | 36/27 |
| 5,216,594 A | 6/1993 | White et al. | 364/403 |
| 5,224,278 A | 7/1993 | Jeon | 36/29 |
| 5,230,333 A | 7/1993 | Yates et al. | 128/382 |
| 5,231,723 A | 8/1993 | White et al. | 12/133 R |
| 5,235,715 A | 8/1993 | Donzis | 12/142 R |
| 5,237,520 A | 8/1993 | White | 364/560 |
| 5,243,772 A | 9/1993 | Francis et al. | 36/114 |
| 5,247,742 A | 9/1993 | Kilgore | 36/114 |
| D340,349 S | 10/1993 | Kilgore et al. | D2/318 |
| D340,350 S | 10/1993 | Kilgore et al. | D2/318 |
| 5,255,451 A | 10/1993 | Tong et al. | 36/30 A |
| 5,279,051 A | 1/1994 | Whatley | 36/25 R |
| 5,280,680 A | 1/1994 | Burke et al. | 36/28 |
| 5,280,890 A | 1/1994 | Wydra | 267/220 |
| D344,174 S | 2/1994 | Kilgore | D2/964 |
| D344,398 S | 2/1994 | Kilgore | D2/967 |
| D344,399 S | 2/1994 | Kilgore | D2/965 |
| D344,400 S | 2/1994 | Kilgore | D2/965 |
| D344,401 S | 2/1994 | Kilgore | D2/965 |
| 5,282,288 A | 2/1994 | Henson | 12/142 P |
| 5,282,325 A | 2/1994 | Beyl | 36/27 |
| 5,285,583 A | 2/1994 | Aleven | 36/44 |
| D344,622 S | 3/1994 | Kilgore | D2/964 |
| 5,297,349 A | 3/1994 | Kilgore | 36/114 |
| 5,307,522 A | 5/1994 | Throneburg et al. | 2/239 |
| 5,311,357 A | 5/1994 | Summer et al. | 359/479 |
| 5,311,680 A * | 5/1994 | Comparetto | 36/154 |
| 5,313,717 A | 5/1994 | Allen et al. | 36/28 |
| 5,317,819 A | 6/1994 | Ellis, III | 36/25 R |
| 5,317,822 A | 6/1994 | Johnson | 36/101 |
| 5,319,866 A | 6/1994 | Foley et al. | 36/91 |
| 5,331,752 A | 7/1994 | Johnson et al. | 36/115 |
| D350,016 S | 8/1994 | Passke et al. | D2/946 |
| D350,018 S | 8/1994 | Kilgore | D2/964 |
| D350,019 S | 8/1994 | Kilgore | D2/965 |
| D350,020 S | 8/1994 | Kilgore | D2/965 |
| 5,335,517 A | 8/1994 | Throneburg et al. | 66/185 |

| Patent No. | Date | Inventor | Class |
|---|---|---|---|
| 5,337,492 A | 8/1994 | Anderié et al. | 36/28 |
| 5,339,252 A | 8/1994 | White et al. | 364/468 |
| 5,339,543 A | 8/1994 | Lin | 36/101 |
| 5,339,544 A | 8/1994 | Caberlotto | 36/102 |
| D350,225 S | 9/1994 | Kilgore | D2/964 |
| D350,226 S | 9/1994 | Kilgore | D2/964 |
| D350,227 S | 9/1994 | Kilgore | D2/964 |
| D350,433 S | 9/1994 | Kilgore | D2/961 |
| 5,343,636 A | 9/1994 | Sabol | 36/78 |
| 5,343,637 A | 9/1994 | Schindler | 36/28 |
| 5,343,639 A | 9/1994 | Kilgore et al. | 36/29 |
| 5,351,303 A | 9/1994 | Wilmore | 382/2 |
| D351,057 S | 10/1994 | Kilgore | D2/964 |
| D351,720 S | 10/1994 | Kilgore | D2/967 |
| 5,351,421 A | 10/1994 | Miers | 36/128 |
| 5,353,522 A | 10/1994 | Wagner | 36/15 |
| 5,353,523 A | 10/1994 | Kilgore et al. | 36/29 |
| D351,936 S | 11/1994 | Kilgore | D2/965 |
| D352,159 S | 11/1994 | Kilgore | D2/965 |
| D352,160 S | 11/1994 | Kilgore | D2/967 |
| 5,361,133 A | 11/1994 | Brown et al. | 356/612 |
| 5,361,518 A | 11/1994 | Sussmann et al. | 36/134 |
| 5,363,526 A | 11/1994 | Okajima | 12/133 B |
| 5,363,570 A | 11/1994 | Allen et al. | 36/28 |
| 5,367,790 A | 11/1994 | Gamow et al. | 36/27 |
| 5,367,791 A | 11/1994 | Gross et al. | 36/31 |
| 5,367,792 A | 11/1994 | Richard et al. | 36/114 |
| 5,369,896 A | 12/1994 | Frachey et al. | 36/29 |
| D354,617 S | 1/1995 | Kilgore | D2/964 |
| 5,381,608 A | 1/1995 | Claveria | 36/35 R |
| 5,381,610 A | 1/1995 | Hanson | 36/100 |
| 5,384,973 A | 1/1995 | Lyden | 36/25 R |
| D355,755 S | 2/1995 | Kilgore | D2/964 |
| 5,390,430 A | 2/1995 | Fitchmun et al. | 36/30 |
| 5,396,718 A | 3/1995 | Schuler | 36/38 |
| 5,401,564 A | 3/1995 | Lee et al. | 428/228 |
| 5,406,719 A | 4/1995 | Potter | 36/28 |
| 5,406,723 A | 4/1995 | Okajima | 36/131 |
| 5,410,821 A | 5/1995 | Hilgendorf | 36/100 |
| 5,419,060 A | 5/1995 | Choi | 36/36 R |
| 5,421,104 A | 6/1995 | Tally | 36/42 |
| 5,425,184 A | 6/1995 | Lyden et al. | 36/29 |
| 5,435,079 A | 7/1995 | Gallegos | 36/38 |
| 5,437,110 A | 8/1995 | Goldston et al. | 36/38 |
| 5,446,977 A | 9/1995 | Nagano et al. | 36/131 |
| 5,461,800 A | 10/1995 | Luthi et al. | 36/28 |
| 5,469,638 A | 11/1995 | Crawford, III | 36/28 |
| 5,483,601 A | 1/1996 | Faulkner | 382/115 |
| 5,483,757 A | 1/1996 | Frykberg | 36/101 |
| 5,493,792 A | 2/1996 | Bates et al. | 36/28 |
| 5,500,804 A | 3/1996 | Morris et al. | 700/182 |
| 5,501,022 A | 3/1996 | Cohn | 36/2 R |
| 5,511,324 A | 4/1996 | Smith | 36/27 |
| 5,515,268 A | 5/1996 | Yoda | 364/401 |
| 5,517,769 A | 5/1996 | Zhao | 36/27 |
| 5,519,950 A | 5/1996 | Wang | 36/42 |
| 5,528,842 A | 6/1996 | Ricci et al. | 36/27 |
| 5,533,280 A | 7/1996 | Halliday | 36/101 |
| 5,539,677 A | 7/1996 | Smith | 364/560 |
| 5,542,198 A | 8/1996 | Famolare | 36/130 |
| 5,543,194 A | 8/1996 | Rudy | 428/69 |
| 5,544,429 A | 8/1996 | Ellis, III | 36/25 R |
| 5,544,430 A | 8/1996 | Jacko | 36/7.1 R |
| 5,544,431 A | 8/1996 | Dixon | 36/38 |
| 5,546,829 A | 8/1996 | Bryne | 74/594.6 |
| D374,553 S | 10/1996 | Throneburg et al. | D2/979 |
| 5,560,126 A | 10/1996 | Meschan et al. | 36/42 |
| 5,560,226 A | 10/1996 | Throneburg | 66/185 |
| 5,566,477 A | 10/1996 | Mathis et al. | 36/100 |
| 5,570,523 A | 11/1996 | Lin | 36/112 |
| 5,572,804 A | 11/1996 | Skaja et al. | 36/29 |
| 5,592,706 A | 1/1997 | Pearce | 5/654 |
| 5,595,004 A | 1/1997 | Lyden et al. | 36/29 |
| 5,595,005 A | 1/1997 | Throneburg et al. | 36/91 |
| 5,596,819 A | 1/1997 | Goldston et al. | 36/35 R |
| 5,598,645 A | 2/1997 | Kaiser | 36/29 |
| 5,600,901 A | 2/1997 | Leonor | 36/7.1 R |
| 5,603,232 A | 2/1997 | Throneburg | 66/185 |
| 5,604,997 A | 2/1997 | Dieter | 36/45 |
| 5,611,152 A | 3/1997 | Richard et al. | 36/28 |
| 5,615,497 A | 4/1997 | Meschan | 36/36 R |
| 5,625,964 A | 5/1997 | Lyden et al. | 36/29 |
| 5,628,129 A | 5/1997 | Kilgore et al. | 36/134 |
| 5,632,057 A | 5/1997 | Lyden | 12/146 B |
| 5,636,456 A | 6/1997 | Allen | 36/168 |
| 5,640,779 A | 6/1997 | Rolloff et al. | 33/514.2 |
| 5,642,575 A | 7/1997 | Norton et al. | 36/27 |
| 5,644,857 A | 7/1997 | Ouellett et al. | 36/15 |
| 5,647,145 A | 7/1997 | Russell et al. | 36/28 |
| 5,649,374 A | 7/1997 | Chou | 36/37 |
| 5,653,046 A | 8/1997 | Lawlor | 36/28 |
| 5,657,558 A | 8/1997 | Pohu | 36/131 |
| 5,659,395 A | 8/1997 | Brown et al. | 356/376 |
| 5,659,979 A | 8/1997 | Sileo | 36/54 |
| 5,661,915 A | 9/1997 | Smith | 36/15 |
| 5,671,279 A | 9/1997 | Elgamal | 380/23 |
| 5,678,327 A | 10/1997 | Halberstadt | 36/27 |
| 5,678,329 A | 10/1997 | Griffin et al. | 36/50.1 |
| D387,892 S | 12/1997 | Briant | D2/962 |
| 5,692,319 A | 12/1997 | Parker et al. | 36/50.1 |
| 5,701,686 A | 12/1997 | Herr et al. | 36/27 |
| D389,298 S | 1/1998 | Briant | D2/962 |
| 5,704,137 A | 1/1998 | Dean et al. | 36/28 |
| 5,706,589 A | 1/1998 | Marc | 36/27 |
| 5,709,954 A | 1/1998 | Lyden et al. | 428/500 |
| 5,714,098 A | 2/1998 | Potter | 264/40.1 |
| 5,718,063 A | 2/1998 | Yamashita et al. | 36/28 |
| 5,724,522 A | 3/1998 | Kagami et al. | 395/226 |
| 5,724,753 A | 3/1998 | Throneburg et al. | 36/91 |
| 5,729,912 A | 3/1998 | Gutkowski et al. | 36/97 |
| 5,729,916 A | 3/1998 | Vorobiev et al. | 36/27 |
| 5,729,918 A | 3/1998 | Smets | 36/91 |
| 5,732,484 A | 3/1998 | Grutza et al. | 36/127 |
| 5,743,028 A | 4/1998 | Lombardino | 36/27 |
| 5,743,029 A | 4/1998 | Walker et al. | 36/134 |
| 5,753,931 A | 5/1998 | Borchers et al. | 250/559.22 |
| 5,755,001 A | 5/1998 | Potter | 12/142 P |
| 5,761,831 A | 6/1998 | Cho | 36/28 |
| 5,771,495 A | 6/1998 | Turner et al. | 2/239 |
| 5,775,005 A | 7/1998 | McClelland | 36/31 |
| 5,778,564 A | 7/1998 | Kettner | 36/101 |
| 5,778,565 A | 7/1998 | Holt et al. | 36/110 |
| 5,784,721 A | 7/1998 | Huff | 2/239 |
| 5,784,808 A | 7/1998 | Hockerson | 36/102 |
| 5,785,909 A | 7/1998 | Chang et al. | 264/46.5 |
| 5,786,057 A | 7/1998 | Lyden et al. | 428/52 |
| 5,787,610 A | 8/1998 | Brooks | 36/28 |
| 5,790,256 A | 8/1998 | Brown et al. | 356/376 |
| 5,791,163 A | 8/1998 | Throneburg | 66/178 R |
| 5,799,417 A | 9/1998 | Burke et al. | 36/105 |
| 5,802,739 A | 9/1998 | Potter | 36/29 |
| 5,806,209 A | 9/1998 | Crowley et al. | 36/28 |
| 5,806,210 A | 9/1998 | Meschan | 36/36 R |
| 5,813,146 A | 9/1998 | Gutkowski et al. | 36/97 |
| 5,822,886 A | 10/1998 | Luthi et al. | 36/28 |
| 5,822,888 A | 10/1998 | Terry | 36/100 |
| 5,826,350 A | 10/1998 | Wallerstein | 36/7.8 |
| 5,826,352 A | 10/1998 | Meschan et al. | 36/42 |
| 5,829,057 A | 11/1998 | Gunn | 2/69 |
| 5,832,629 A | 11/1998 | Wen | 36/27 |
| 5,832,630 A | 11/1998 | Potter | 36/29 |
| 5,832,634 A | 11/1998 | Wong | 36/107 |
| 5,832,636 A | 11/1998 | Lyden et al. | 36/59 R |
| 5,836,094 A | 11/1998 | Figel | 36/131 |
| D401,758 S | 12/1998 | Huff | D2/986 |
| D403,149 S | 12/1998 | Fincher | D2/989 |

| | | | |
|---|---|---|---|
| 5,843,268 A | 12/1998 | Lyden et al. ............... 156/324.4 |
| 5,848,484 A | 12/1998 | Dupree et al. .................. 36/101 |
| 5,852,887 A | 12/1998 | Healy et al. ..................... 36/88 |
| 5,853,844 A | 12/1998 | Wen ........................... 428/119 |
| 5,860,226 A | 1/1999 | Graham et al. ................. 36/28 |
| D404,896 S | 2/1999 | Cooper ........................ D2/947 |
| 5,875,567 A | 3/1999 | Bayley ........................... 36/27 |
| 5,879,725 A | 3/1999 | Potter ........................... 425/403 |
| 5,881,413 A | 3/1999 | Throneburg et al. ...... 12/133 B |
| 5,885,500 A | 3/1999 | Tawney et al. ............... 264/154 |
| 5,896,608 A | 4/1999 | Whatley ..................... 12/142 T |
| 5,896,679 A | 4/1999 | Baldwin ........................ 36/27 |
| 5,897,622 A | 4/1999 | Blinn et al. ..................... 705/26 |
| 5,906,872 A | 5/1999 | Lyden et al. ................... 428/52 |
| 5,909,719 A | 6/1999 | Throneburg et al. ...... 12/142 R |
| 5,915,820 A | 6/1999 | Kraeuter et al. ............... 36/114 |
| 5,918,384 A | 7/1999 | Meshan ........................ 36/37 |
| 5,921,004 A | 7/1999 | Lyden ......................... 36/25 R |
| 5,930,769 A | 7/1999 | Rose ........................... 705/27 |
| 5,930,918 A | 8/1999 | Healy et al. .................... 36/29 |
| 5,937,544 A | 8/1999 | Russell .......................... 36/28 |
| 5,940,994 A | 8/1999 | Allen ........................... 36/168 |
| 5,946,731 A | 9/1999 | Finlay et al. .................... 2/239 |
| 5,970,628 A | 10/1999 | Meshan ......................... 36/42 |
| 5,970,630 A | 10/1999 | Gallegos ....................... 36/100 |
| D416,381 S | 11/1999 | Senda et al. ................. D2/961 |
| 5,974,695 A | 11/1999 | Slepian et al. ................. 36/27 |
| 5,976,451 A | 11/1999 | Skaja et al. ................... 264/516 |
| 5,979,078 A | 11/1999 | McLaughlin ................... 36/29 |
| 5,983,200 A | 11/1999 | Slotznick ....................... 705/1 |
| 5,983,201 A | 11/1999 | Fay ............................... 705/26 |
| 5,987,779 A | 11/1999 | Litchfield et al. .............. 36/29 |
| 5,987,780 A | 11/1999 | Lyden et al. ................... 36/29 |
| 5,987,783 A | 11/1999 | Allen et al. ................... 36/127 |
| 5,991,950 A | 11/1999 | Schenkel ................... 12/142 T |
| 5,993,585 A | 11/1999 | Goodwin et al. ............ 156/145 |
| 5,996,255 A | 12/1999 | Ventura ......................... 36/44 |
| 6,006,449 A | 12/1999 | Orlowski et al. ............... 36/27 |
| 6,009,636 A | 1/2000 | Wallerstein ................... 36/7.8 |
| 6,009,641 A | 1/2000 | Ryan ........................... 36/131 |
| 6,013,340 A | 1/2000 | Bonk et al. ................. 428/35.2 |
| 6,016,613 A | 1/2000 | Campbell et al. ........... 36/59 C |
| 6,020,055 A | 2/2000 | Pearce ......................... 428/323 |
| 6,021,527 A | 2/2000 | Lessard .......................... 2/239 |
| 6,023,857 A | 2/2000 | Vizy et al. ................... 36/30 R |
| 6,023,859 A | 2/2000 | Burke et al. ................. 36/105 |
| 6,024,712 A | 2/2000 | Iglesias et al. .................. 602/6 |
| 6,029,374 A | 2/2000 | Herr et al. ...................... 36/27 |
| 6,029,962 A | 2/2000 | Shorten et al. .............. 267/145 |
| 6,032,386 A | 3/2000 | Evans ........................... 36/15 |
| 6,041,521 A | 3/2000 | Wong ........................... 36/28 |
| 6,050,002 A | 4/2000 | Meshan ......................... 36/37 |
| 6,050,006 A | 4/2000 | Swindle ........................ 36/134 |
| 6,055,746 A | 5/2000 | Lyden et al. ................... 36/29 |
| 6,055,747 A | 5/2000 | Lombardino ................... 36/27 |
| 6,065,228 A | 5/2000 | Begey et al. ................... 36/15 |
| 6,079,125 A | 6/2000 | Quellais et al. ................ 36/25 |
| 6,082,025 A | 7/2000 | Bonk et al. ..................... 36/29 |
| 6,092,251 A | 7/2000 | Tomat ....................... 12/142 P |
| 6,092,311 A | 7/2000 | MacNamara ................... 36/97 |
| D429,877 S | 8/2000 | Lozano et al. ............... D2/972 |
| 6,098,313 A | 8/2000 | Skaja ........................... 36/28 |
| 6,098,316 A | 8/2000 | Hong ............................. 36/97 |
| 6,112,433 A | 9/2000 | Greiner ..................... 36/67 R |
| 6,113,123 A | 9/2000 | Cabanis et al. ............. 280/341 |
| 6,115,941 A | 9/2000 | Ellis, III ..................... 36/25 R |
| 6,115,942 A | 9/2000 | Paradis .......................... 36/27 |
| 6,115,946 A | 9/2000 | Morris et al. ................. 36/115 |
| 6,115,947 A | 9/2000 | Swindle ........................ 36/134 |
| 6,119,371 A | 9/2000 | Goodwin et al. ............... 36/29 |
| 6,122,937 A | 9/2000 | Roell ............................. 66/70 |
| D431,898 S | 10/2000 | Clegg et al. ................. D2/972 |
| D432,293 S | 10/2000 | Clegg et al. ................. D2/955 |
| D432,764 S | 10/2000 | Clegg et al. ................. D2/955 |
| 6,127,026 A | 10/2000 | Bonk et al. ................. 428/213 |
| 6,131,309 A | 10/2000 | Walsh ............................ 36/28 |
| 6,138,281 A | 10/2000 | Chiaruttini ..................... 2/239 |
| 6,139,929 A | 10/2000 | Hayton et al. .............. 428/35.2 |
| D433,213 S * | 11/2000 | Schuette et al. .............. D2/957 |
| D433,216 S | 11/2000 | Avar et al. ................... D2/972 |
| 6,145,221 A | 11/2000 | Hockerson ................... 36/126 |
| 6,151,805 A | 11/2000 | Savoie ........................ 36/134 |
| D434,548 S | 12/2000 | Gallegos ..................... D2/905 |
| 6,154,983 A | 12/2000 | Austin et al. .................. 36/12 |
| 6,161,240 A | 12/2000 | Huang ........................... 5/710 |
| 6,170,177 B1 | 1/2001 | Frappier et al. ............ 12/142 R |
| 6,178,664 B1 | 1/2001 | Yant et al. ...................... 36/44 |
| 6,195,915 B1 | 3/2001 | Russell .......................... 36/28 |
| 6,195,916 B1 | 3/2001 | Meschan ........................ 36/37 |
| 6,206,750 B1 | 3/2001 | Barad et al. .................. 446/268 |
| 6,216,365 B1 | 4/2001 | Cohen ........................... 36/44 |
| 6,230,525 B1 | 5/2001 | Dunlap .......................... 66/182 |
| 6,237,251 B1 | 5/2001 | Litchfield et al. ........... 36/25 R |
| 6,247,182 B1 | 6/2001 | Tasbas ........................... 2/239 |
| 6,247,249 B1 | 6/2001 | Lindquist ....................... 36/28 |
| 6,256,824 B1 | 7/2001 | Austin et al. ............... 12/142 P |
| 6,256,907 B1 | 7/2001 | Jordan et al. ................... 36/61 |
| 6,258,421 B1 | 7/2001 | Potter ......................... 428/35.2 |
| D446,387 S | 8/2001 | McCourt ..................... D2/972 |
| D446,917 S * | 8/2001 | Brown ........................ D2/961 |
| D446,923 S | 8/2001 | McCourt ..................... D2/972 |
| D447,330 S | 9/2001 | McCourt ..................... D2/972 |
| 6,282,814 B1 | 9/2001 | Krafsur et al. .................. 36/27 |
| 6,286,151 B1 | 9/2001 | Lambertz ....................... 2/239 |
| 6,292,951 B1 | 9/2001 | Kalde ............................. 2/239 |
| 6,295,679 B1 | 10/2001 | Chenevert ................. 12/142 P |
| 6,299,962 B1 | 10/2001 | Davis et al. .................... 428/98 |
| 6,301,806 B1 | 10/2001 | Heller ......................... 36/134 |
| 6,306,483 B1 | 10/2001 | Bessey et al. ................ 428/175 |
| 6,308,438 B1 | 10/2001 | Throneburg et al. .......... 36/9 R |
| D450,437 S | 11/2001 | Simpson et al. ............. D2/967 |
| 6,314,584 B1 | 11/2001 | Errera ............................ 2/239 |
| 6,321,465 B1 | 11/2001 | Bonk et al. ..................... 36/28 |
| 6,324,772 B1 | 12/2001 | Meschan .................... 36/25 R |
| 6,324,874 B2 | 12/2001 | Fujimoto ....................... 66/185 |
| 6,327,795 B1 | 12/2001 | Russell .......................... 36/28 |
| 6,330,757 B1 | 12/2001 | Russell .......................... 36/28 |
| 6,332,281 B1 | 12/2001 | Savoie ........................ 36/134 |
| 6,334,222 B1 | 1/2002 | Sun ............................... 2/239 |
| 6,336,227 B1 | 1/2002 | Liput et al. ..................... 2/239 |
| 6,341,432 B1 | 1/2002 | Muller ........................... 36/27 |
| 6,342,544 B1 | 1/2002 | Krstic et al. ................. 523/167 |
| 6,345,454 B1 | 2/2002 | Cotton ........................ 36/101 |
| 6,349,486 B1 | 2/2002 | Lin .............................. 36/101 |
| 6,354,114 B1 | 3/2002 | Sghiatti ..................... 66/178 R |
| 6,357,146 B1 | 3/2002 | Wordsworth et al. .......... 36/128 |
| 6,367,167 B1 | 4/2002 | Krstic et al. ................ 36/25 R |
| 6,367,168 B1 | 4/2002 | Hatfield et al. ................. 36/45 |
| 6,389,712 B1 | 5/2002 | Schelling ....................... 36/15 |
| 6,393,620 B2 | 5/2002 | Hatch et al. .................... 2/239 |
| 6,393,731 B1 | 5/2002 | Moua et al. .................... 36/27 |
| 6,401,366 B2 | 6/2002 | Foxen et al. ................... 36/91 |
| 6,405,456 B1 | 6/2002 | Nichelson ...................... 36/29 |
| 6,416,610 B1 | 7/2002 | Matis et al. .................. 156/245 |
| 6,421,937 B1 | 7/2002 | Heller ......................... 36/134 |
| D461,045 S | 8/2002 | Warren, Jr. .................. D2/980 |
| 6,430,843 B1 | 8/2002 | Potter et al. .................... 36/29 |
| D462,830 S | 9/2002 | Greene ........................ D2/967 |
| 6,442,870 B1 | 9/2002 | Tsai ............................ 36/11.5 |
| 6,442,874 B1 | 9/2002 | Long ............................. 36/97 |
| 6,446,267 B1 | 9/2002 | Shah ............................. 2/239 |
| 6,449,878 B1 | 9/2002 | Lyden ............................ 36/27 |
| 6,451,144 B2 | 9/2002 | Williamson et al. ......... 156/148 |
| 6,457,261 B1 | 10/2002 | Crary ............................. 36/27 |
| 6,457,332 B1 | 10/2002 | Schiavello ....................... 66/8 |
| 6,463,351 B1 | 10/2002 | Clynch ......................... 700/163 |

| | | | | | | | |
|---|---|---|---|---|---|---|---|
| 6,463,681 B1 | 10/2002 | Savoie | 36/134 | 7,082,700 B2 | 8/2006 | Meschan | 36/42 |
| 6,477,793 B1 | 11/2002 | Pruitt et al. | 36/131 | 7,089,152 B2 | 8/2006 | Oda et al. | 702/182 |
| 6,487,796 B1 | 12/2002 | Avar et al. | 36/28 | 7,089,689 B2 | 8/2006 | Meschan | 36/25 R |
| 6,533,885 B2 | 3/2003 | Davis et al. | 156/219 | 7,100,308 B2 | 9/2006 | Aveni | 36/27 |
| D472,696 S | 4/2003 | Magro | D2/902 | 7,100,309 B2 | 9/2006 | Smith et al. | 36/28 |
| 6,546,648 B2 | 4/2003 | Dixon | 36/25 R | 7,107,235 B2 | 9/2006 | Lyden | 705/26 |
| D474,332 S | 5/2003 | Turner et al. | D2/964 | 7,114,269 B2 | 10/2006 | Meschan | 36/25 R |
| 6,557,271 B1 | 5/2003 | Weaver, III | 36/27 | 7,127,835 B2 | 10/2006 | Meschan | 36/27 |
| 6,568,101 B1 | 5/2003 | Jansen et al. | 36/7.3 | 7,140,129 B2 | 11/2006 | Newson et al. | 36/100 |
| 6,568,102 B1 | 5/2003 | Healy et al. | 36/28 | 7,155,843 B2 | 1/2007 | Meschan | 36/25 R |
| 6,581,255 B2 | 6/2003 | Kay | 24/640 | 7,175,187 B2 | 2/2007 | Lyden | 280/11.3 |
| 6,598,320 B2 | 7/2003 | Turner et al. | 36/28 | 7,225,565 B2 | 6/2007 | DiBenedetto et al. | 36/132 |
| 6,601,042 B1 | 7/2003 | Lyden | 705/26 | 7,284,344 B2 | 10/2007 | Pawlus et al. | 36/100 |
| 6,604,300 B2 | 8/2003 | Meschan | 36/25 R | 7,353,527 B2 | 4/2008 | Preis et al. | 720/651 |
| 6,622,401 B2 | 9/2003 | Carroll, III | 36/105 | 7,406,781 B2 | 8/2008 | Scholz | 36/67 D |
| D483,936 S | 12/2003 | Fullum | D2/972 | 7,428,790 B2 | 9/2008 | Pellerin | 36/126 |
| 6,662,471 B2 | 12/2003 | Meschan | 36/27 | 2002/0178613 A1 | 12/2002 | Williamson et al. | 36/15 |
| 6,665,957 B2 | 12/2003 | Levert et al. | 36/27 | 2002/0184795 A1 | 12/2002 | Kan | 36/115 |
| 6,684,532 B2 | 2/2004 | Greene et al. | 36/28 | 2004/0024645 A1 | 2/2004 | Potter et al. | 705/26 |
| 6,694,642 B2 | 2/2004 | Turner | 36/28 | 2004/0040180 A1 | 3/2004 | Rennex et al. | 36/28 |
| 6,711,834 B1 | 3/2004 | Kita | 36/27 | 2004/0107606 A1 | 6/2004 | Paoli | 36/134 |
| 6,722,058 B2 | 4/2004 | Lucas et al. | 36/28 | 2004/0148803 A1 | 8/2004 | Grove et al. | 36/103 |
| 6,748,677 B2 | 6/2004 | Briant et al. | 36/134 | 2004/0177531 A1 | 9/2004 | DiBenedetto et al. | 36/132 |
| 6,749,187 B2 | 6/2004 | Yang | 267/141 | 2005/0071242 A1 | 3/2005 | Allen et al. | 705/26 |
| 6,751,891 B2 | 6/2004 | Lombardino | 36/28 | 2005/0097781 A1 | 5/2005 | Greene | 36/101 |
| 6,763,611 B1 | 7/2004 | Fusco | 36/28 | 2005/0108897 A1 | 5/2005 | Aveni | 36/27 |
| 6,807,753 B2 | 10/2004 | Steszy et al. | 36/28 | 2005/0166422 A1 | 8/2005 | Schaeffer et al. | 36/27 |
| 6,823,613 B2 | 11/2004 | Kelly et al. | 36/134 | 2005/0193592 A1 | 9/2005 | Dua et al. | 36/45 |
| 6,829,848 B2 | 12/2004 | Gallegos | 36/103 | 2005/0198868 A1 | 9/2005 | Scholtz | 36/67 D |
| 6,842,999 B2 | 1/2005 | Russell | 36/28 | 2005/0210275 A1 | 9/2005 | Grove et al. | 36/101 |
| 6,851,204 B2 | 2/2005 | Aveni et al. | 36/28 | 2005/0268491 A1 | 12/2005 | McDonald et al. | 36/28 |
| 6,860,034 B2 | 3/2005 | Schmid | 36/27 | 2006/0010715 A1 | 1/2006 | Tseng et al. | 36/11.5 |
| 6,865,824 B2 | 3/2005 | Levert et al. | 36/29 | 2006/0010716 A1 | 1/2006 | Kerns et al. | 36/25 |
| 6,879,945 B1 | 4/2005 | Cook | 703/2 | 2006/0048413 A1 | 3/2006 | Sokolowski et al. | 36/45 |
| 6,880,267 B2 | 4/2005 | Smaldone et al. | 36/28 | 2006/0059713 A1 | 3/2006 | Stockbridge et al. | 36/30 R |
| 6,886,274 B2 | 5/2005 | Krafsur et al. | 36/27 | 2006/0059715 A1 | 3/2006 | Aveni | 36/45 |
| 6,898,870 B1 | 5/2005 | Rohde | 36/28 | 2006/0101671 A1 | 5/2006 | Berend et al. | 36/100 |
| D507,094 S | 7/2005 | Lyden | D2/946 | 2006/0112592 A1 | 6/2006 | Leedy et al. | 36/29 |
| 6,915,596 B2 * | 7/2005 | Grove et al. | 36/100 | 2006/0117602 A1 | 6/2006 | Meschan et al. | 36/35 |
| 6,915,597 B2 | 7/2005 | Jungkind | 36/134 | 2006/0129416 A1 | 6/2006 | Shum | 705/1 |
| 6,920,705 B2 | 7/2005 | Lucas et al. | 36/25 R | 2006/0130359 A1 | 6/2006 | Dua et al. | 36/9 R |
| 6,925,732 B1 | 8/2005 | Clarke | 709/226 | 2006/0130365 A1 | 6/2006 | Sokolowski et al. | 36/35 R |
| 6,928,756 B1 | 8/2005 | Haynes | 36/27 | 2006/0213082 A1 | 9/2006 | Meschan | 36/27 |
| 6,931,766 B2 | 8/2005 | Greene | 36/101 | 2006/0213088 A1 | 9/2006 | Grove et al. | 36/100 |
| 6,939,502 B2 | 9/2005 | Lyden | 264/496 | 2006/0254086 A1 | 11/2006 | Meschan | 36/25 R |
| 6,944,972 B2 | 9/2005 | Schmid | 36/27 | 2006/0276095 A1 | 12/2006 | Dua et al. | 442/400 |
| 6,948,262 B2 | 9/2005 | Kerrigan | 36/27 | 2006/0283050 A1 | 12/2006 | Carnes et al. | 36/132 |
| 6,948,264 B1 | 9/2005 | Lyden | 36/59 C | 2007/0011920 A1 | 1/2007 | DiBenedetto et al. | 36/132 |
| 6,954,998 B1 | 10/2005 | Lussier | 36/107 | 2007/0022627 A1 | 2/2007 | Sokolowski et al. | 36/3 A |
| 6,957,503 B2 | 10/2005 | De Paoli | 36/67 D | 2007/0101614 A1 * | 5/2007 | Meschan | 36/35 |
| 6,962,002 B2 | 11/2005 | Panosian | 36/25 R | 2009/0000149 A1 * | 1/2009 | Grove et al. | 36/88 |
| 6,964,119 B2 | 11/2005 | Weaver, III | 36/27 | | | | |
| 6,964,120 B2 | 11/2005 | Cartier et al. | 36/29 | | | | |
| 6,966,129 B2 | 11/2005 | Meschan | 36/25 R | | | | |
| 6,966,130 B2 | 11/2005 | Meschan | 36/25 R | | | | |
| 6,968,635 B2 | 11/2005 | Meschan | 36/25 R | | | | |
| 6,968,636 B2 | 11/2005 | Aveni et al. | 36/28 | | | | |
| 6,983,553 B2 | 1/2006 | Lussier et al. | 36/28 | | | | |
| 6,986,269 B2 | 1/2006 | Dua | 66/177 | | | | |
| 6,996,923 B2 | 2/2006 | Meschan | 36/25 R | | | | |
| 6,996,924 B2 | 2/2006 | Meschan | 36/25 R | | | | |
| 7,013,581 B2 | 3/2006 | Greene et al. | 36/25 R | | | | |
| 7,013,583 B2 | 3/2006 | Greene et al. | 36/28 | | | | |
| 7,016,867 B2 | 3/2006 | Lyden | 705/26 | | | | |
| 7,040,040 B2 | 5/2006 | Meschan | 36/25 R | | | | |
| 7,040,041 B2 | 5/2006 | Meschan | 36/29 | | | | |
| 7,043,857 B2 | 5/2006 | Meschan | 36/25 R | | | | |
| 7,047,675 B2 | 5/2006 | Briant et al. | 36/134 | | | | |
| 7,047,676 B2 | 5/2006 | Nicholson et al. | 37/334 | | | | |
| 7,069,671 B2 | 7/2006 | Meschan | 36/91 | | | | |
| 7,076,890 B2 | 7/2006 | Grove et al. | 36/15 | | | | |
| 7,076,892 B2 | 7/2006 | Meschan | 36/29 | | | | |
| 7,082,698 B2 | 8/2006 | Smaldone et al. | 36/28 | | | | |

FOREIGN PATENT DOCUMENTS

| | | | |
|---|---|---|---|
| BE | 493654 | 6/1950 | |
| CA | 115950 | 1/1982 | 36/6 |
| CH | 425537 | 5/1967 | |
| DE | 59317 | 3/1891 | |
| DE | 141998 | 6/1903 | |
| DE | 620963 | 10/1935 | |
| DE | 1808245 | 2/1960 | |
| DE | 2216252 | 4/1972 | |
| DE | 2419870 | 11/1974 | |
| DE | 2501561 | 7/1976 | |
| DE | 2543268 A1 | 3/1977 | |
| DE | 2851535 A1 | 4/1980 | |
| DE | 2851571 A1 | 5/1980 | |
| DE | 29 29 365 A1 | 2/1981 | |
| DE | 3034126 A1 | 3/1982 | |
| DE | 3219652 A1 | 12/1983 | |
| DE | 3415705 | 10/1985 | 36/28 |
| DE | 3415705 A1 | 10/1985 | |
| DE | 0443293 A1 | 8/1991 | |

| | | | | |
|---|---|---|---|---|
| DE | 4120133 A1 | 12/1992 | | |
| DE | 4120134 A1 | 12/1992 | | |
| DE | 4120136 A1 | 12/1992 | | |
| DE | 4123302 A1 | 1/1993 | | |
| DE | 4210292 A1 | 9/1993 | | |
| DE | 4214802 | 11/1993 | | |
| DE | 4214802 A1 | 11/1993 | | |
| DE | 202 08 713 U1 | 6/2002 | | |
| EP | 0103041 | 3/1984 | ................... | 36/27 |
| EP | 0 272 082 A2 | 6/1988 | | |
| EP | 0 471 447 B1 | 2/1992 | | |
| EP | 0 593 394 A1 | 10/1993 | | |
| EP | 0 619 084 A1 | 10/1994 | | |
| EP | 0 752 216 A2 | 1/1997 | | |
| EP | 0 890 321 A2 | 1/1999 | | |
| EP | 0890321 A2 | 1/1999 | | |
| EP | 0 947 145 A1 | 10/1999 | | |
| EP | 1025770 A2 | 2/2000 | | |
| EP | 1048233 A2 | 2/2000 | | |
| EP | 1 016 353 A2 | 7/2000 | | |
| EP | 1033087 A1 | 9/2000 | | |
| EP | 1 240 838 A1 | 3/2002 | | |
| EP | 1 240 838 A1 | 9/2002 | | |
| FR | 424140 | 5/1911 | | |
| FR | 0472735 | 12/1916 | ................... | 36/37 |
| FR | 701729 | 3/1931 | | |
| FR | 1227420 | 8/1960 | ................... | 36/37 |
| FR | 2448308 | 2/1980 | | |
| FR | 2507066 | 12/1982 | ................... | 36/27 |
| FR | 2658396 | 8/1991 | | |
| FR | 2813766 | 3/2002 | | |
| GB | 443571 | 2/1936 | | |
| GB | 608180 | 9/1948 | | |
| GB | 2189978 A | 11/1987 | | |
| GB | 2200030 | 7/1988 | ................... | 36/27 |
| GB | 2256784 A | 12/1992 | | |
| GB | 2 297 235 | 1/1995 | | |
| GB | 2376409 B | 12/2003 | | |
| GB | 2379155 B | 11/2004 | | |
| IT | 633409 | 2/1962 | | |
| JP | 4024001 | 1/1992 | | |
| WO | WO-87/05192 | 9/1987 | | |
| WO | WO 90/05345 | 5/1990 | | |
| WO | 90/11698 | 10/1990 | | |
| WO | 91/01659 | 2/1991 | | |
| WO | 91/09547 | 7/1991 | | |
| WO | 92/08384 | 5/1992 | | |
| WO | 94/13164 | 6/1994 | | |
| WO | 94/21454 | 9/1994 | | |
| WO | WO 94/20020 | 9/1994 | | |
| WO | US 95/15570 | 11/1995 | | |
| WO | WO 96/21366 | 7/1996 | | |
| WO | WO 97/46127 | 12/1997 | | |
| WO | 98/07343 | 2/1998 | | |
| WO | WO98/07341 | 2/1998 | | |
| WO | WO 98/18386 | 5/1998 | | |
| WO | WO9924498 A2 | 5/1999 | | |
| WO | WO0170061 A2 | 9/2001 | | |
| WO | WO0170061 A2 | 9/2001 | | |
| WO | WO0170062 A2 | 9/2001 | | |
| WO | WO 0170062 A2 | 9/2001 | | |
| WO | WO0170063 A2 | 9/2001 | | |
| WO | WO 0170063 A2 | 9/2001 | | |
| WO | WO 0170064 A2 | 9/2001 | | |
| WO | WO0170064 A2 | 9/2001 | | |
| WO | WO 0178539 A2 | 10/2001 | | |
| WO | WO0178539 A2 | 10/2001 | | |
| WO | WO0170060 A2 | 11/2001 | | |
| WO | WO0170060 A2 | 11/2001 | | |
| WO | WO0213641 A1 | 2/2002 | | |
| WO | WO 0213641 A1 | 2/2002 | | |

OTHER PUBLICATIONS

Adidas Adistar Track Shoes, 2 Photos.
K. J. Fisher, "Advanced Composites Step into Athletic Shoes," *Advanced Composites*, May/Jun. 1991, pp. 32-35.
Product Literature From L.A. Gear Regarding the Catapult Shoe Design.
*Discovery*, Oct. 1989, pp. 77-83, Kunzig.
U.S. Appl. No. 09/228,206, filed Jan. 11, 1999 by Robert M. Lyden entitled "Wheeled Skate With Step-IN Binding and Brakes".
U.S. Appl. No. 09/570,171, filed May 11, 2000 by Robert M. Lyden entitled "Light Cure Comformable Device for Articles of Footwear and Method of Making the Same."
8 Photos of Nike Secret Prior Art Published Oct. 2000.
2 Pages, DuPont Website Information Re: Zytel® and Nike Track Shoes dated Feb. 1, 2001, published Oct. 2000.
Runner's World, Fall 2000 Shoe Buyer's Guide, Sep. 2000.
www.nike.com (see the "Nike ID" program).
www.customatrix,com (see the entire website).
www.adidas.com (click on "products" and then click on "mass customization" and review everything related to "MI Adidas").
Press Release, "Nike ID™ Puts The Power of Design in the People's Hands," on www.nikebiz.com, Nov. 2, 1999.
Press Release, "Internet Mall Attracts Retailers," Oakland Tribune 9 (CA) p. C1, Dec. 18, 1996 Disloses That a Specialty Store COPY CAPS (Cape Cod, MA) allows clients to design their own hats on the PCs on Internet.
Supplemental Information Disclosure Statement submitted by the Applicant Re: U.S. Appl. No. 09/523,341 on Aug. 7, 2001.
Information Disclosure Statement submitted by the Applicant Re: U.S. Appl. No. 09/573,121 on Dec. 7, 2001.
Robert Lyden, "Distance Running", pp. 5-8, 249-297, In Press.
Herr et al., "A Mechanically Efficient Shoe Midsole Improves Running Economy, Stability and Cushioning," J. Appl. Physiol., in Press.
Kerdok et al., "Energetics and mechanics of human running on surfaces of different stiffnesses," J. Appl. Physiol 92: 469-478, 2002.
Robert Lyden, "Distance Running", pp. 5-8, 269-319, In Press.
www.dadafootwear.com (Dada) "Sole Sonic Force", extracted from internet on Sep. 21, 2002, 2 pages.
www.runningtimes.com (Avia) "ECS Cushioning & ECS Stability", extracted from internet on Sep. 21, 2002, 2 pages.
www.runningtimes.com (Adidas) "A3", extracted from internet on Sep. 21, 2002, 2 pages.
Wilson, Tim, "Custom Manufacturing-Nike Model Shows Web's Limitations", Internetweek; Manhasset; Dec. 6, 1999, Special Vol./Issue 792, Start p. 1, 12, extracted from Proquest database on Internet on May 30, 2002.
Robert Lyden U.S. Appl. No. 10/234,508, filed Sep. 4, 2002 for Method of Making Custom Insoles and Point of Purchases Display.
www.customatix.com (see the entire website).
www.adidas.com (click on "products" and thenc lick on "mass customization" review everything related to "Mi Adidas").
U.S. Appl. No. 09/721,445, "Method and System For Custom-Manufacturing Items, Such As FootWear," filed Nov. 21, 2000.
Crawford, Krysten A., "Customizing for the Masses," Forbes Magazine, Oct. 16, 2000, p. 168.
"Custom Fit Footwear," www.digitoe.com, 1984-Present, Digitoe., Inc.
Dworkin, Andy, "Nike Will Let Buyers Help Design Shoes," The Oregonian Newspaper, Business Section, Oct. 21, 1999.
"NGAGE™ Digital Sizing System," NWR, Feb.-Mar. 1997.
"The Florsheim Shoe Company—Express Shop," Havard Business School, Copyright 1988 by The President and Fellows of Havard College.
"6 Steps to Ordering Shoe Lasts & Footwear from DIGITOE®," Jun. 1998. Digitoe, Inc.
http:/www.digitoe.com, <retrieved from the Internet using WayBackMachine.org—http:/web.archive.org/web/*/www.digitor.com> Dec. 8, 2000.

\* cited by examiner

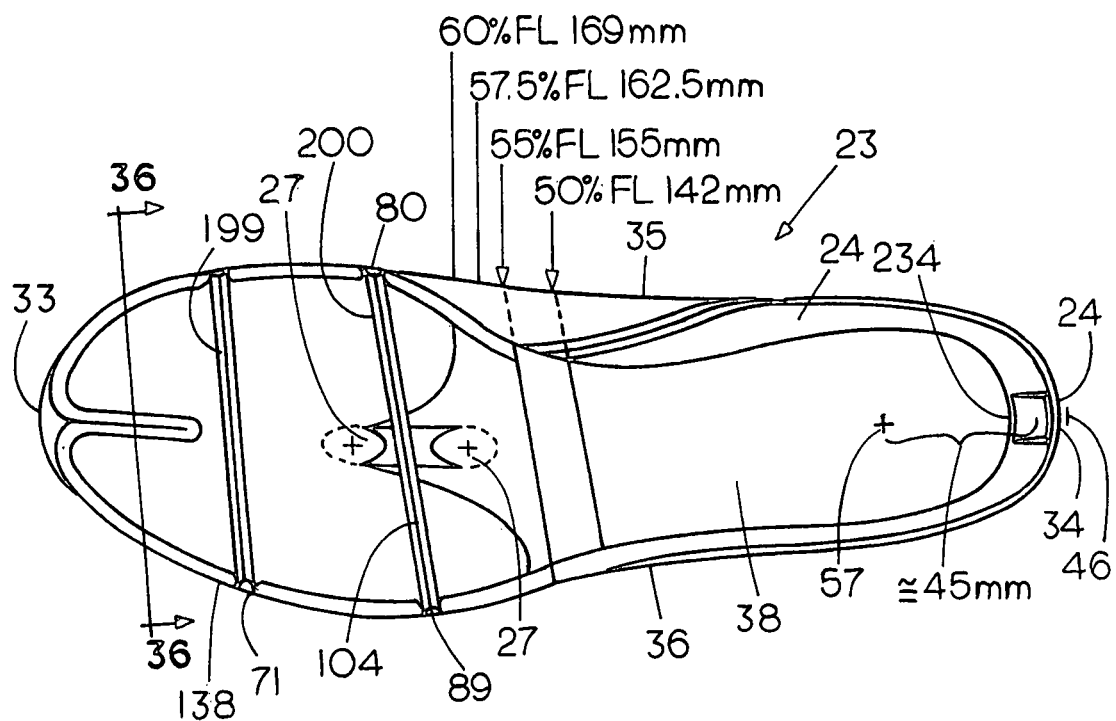
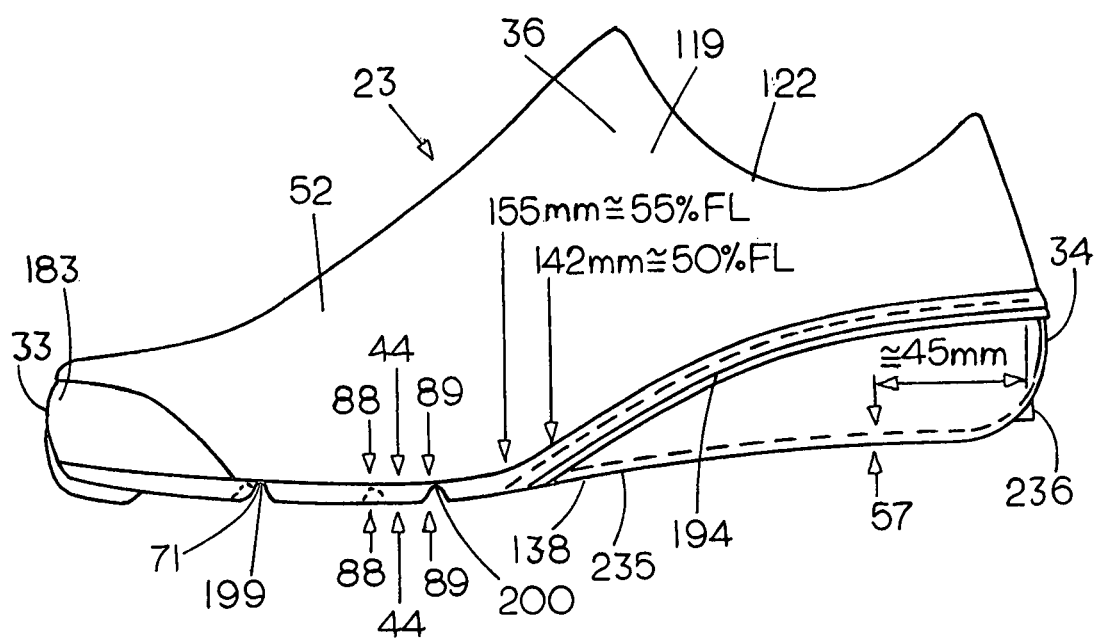

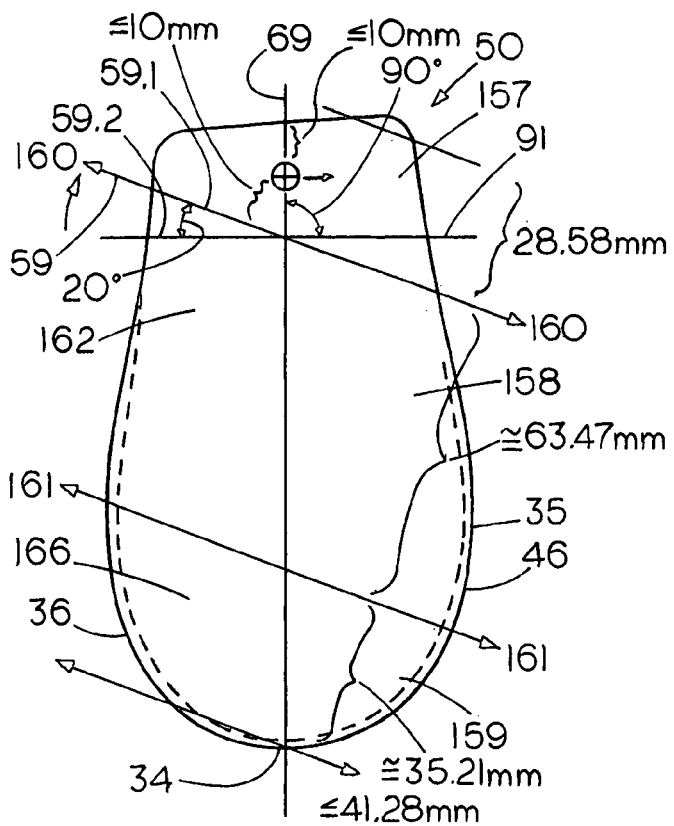
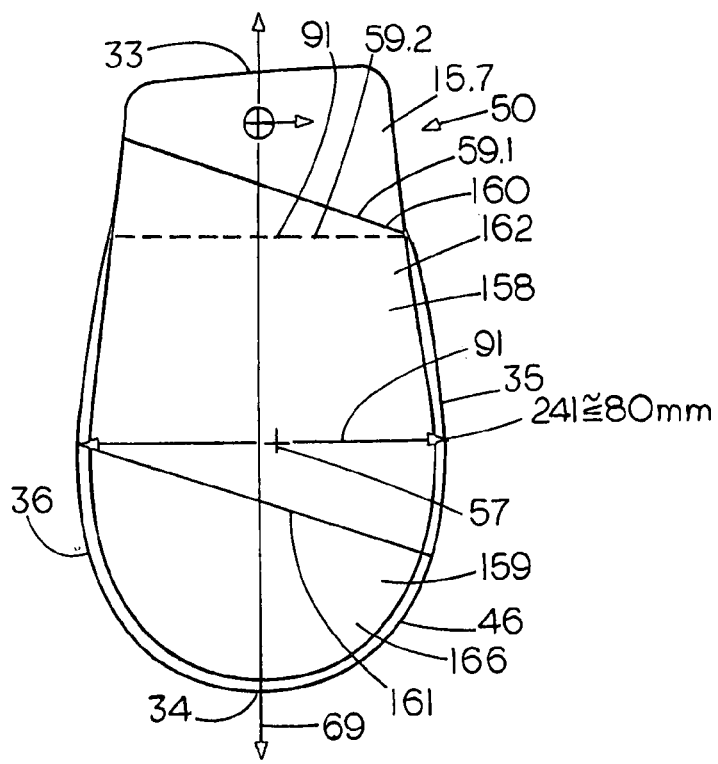

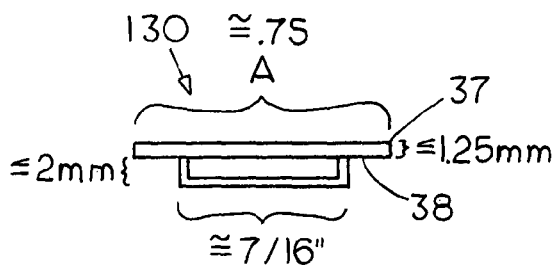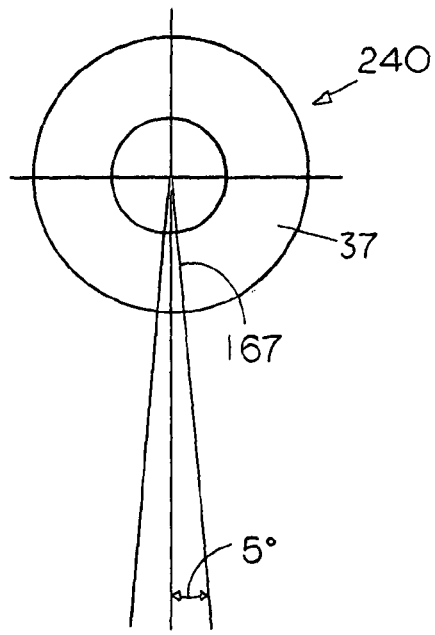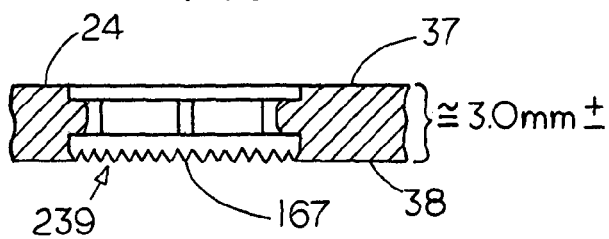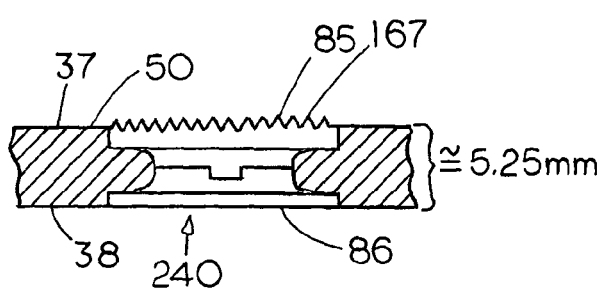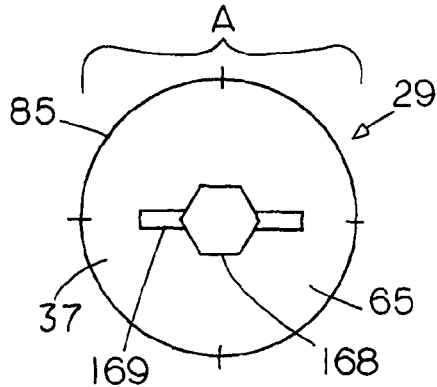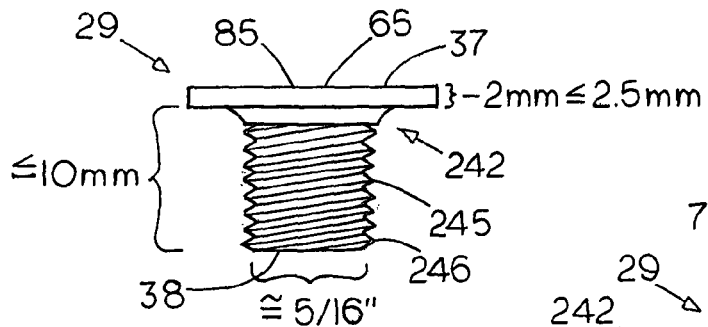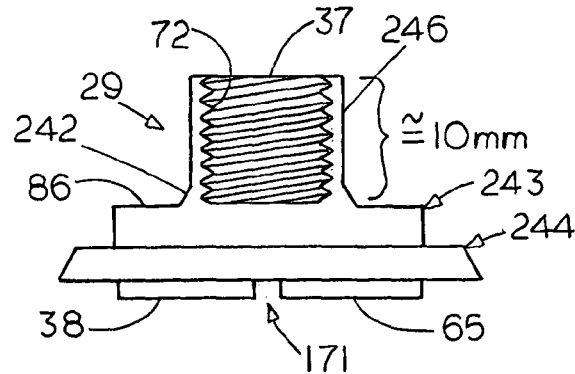

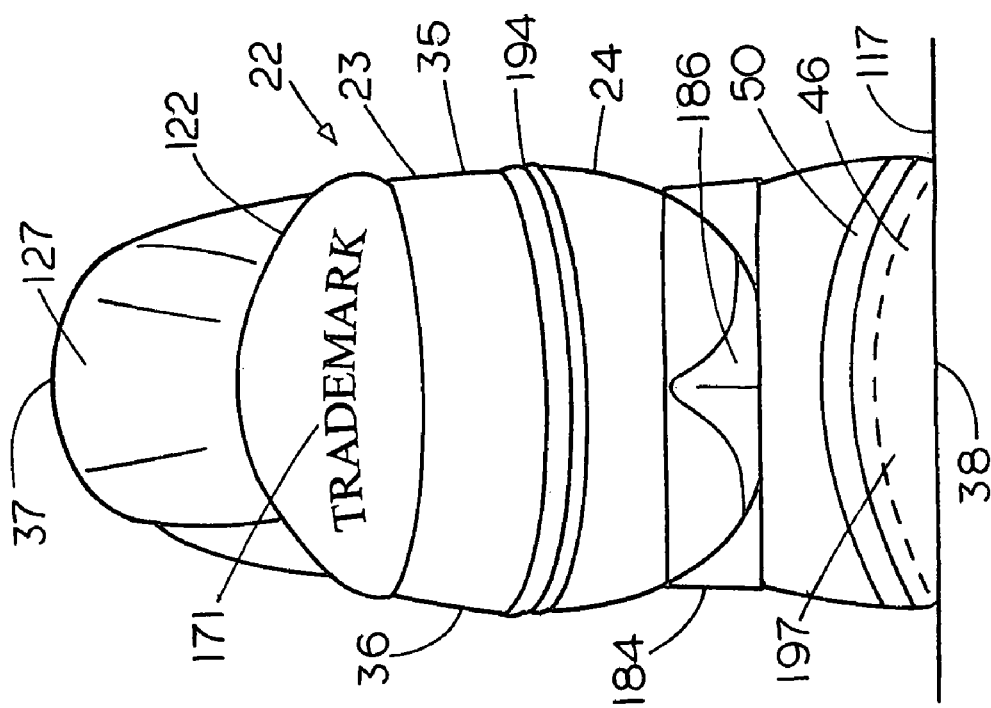
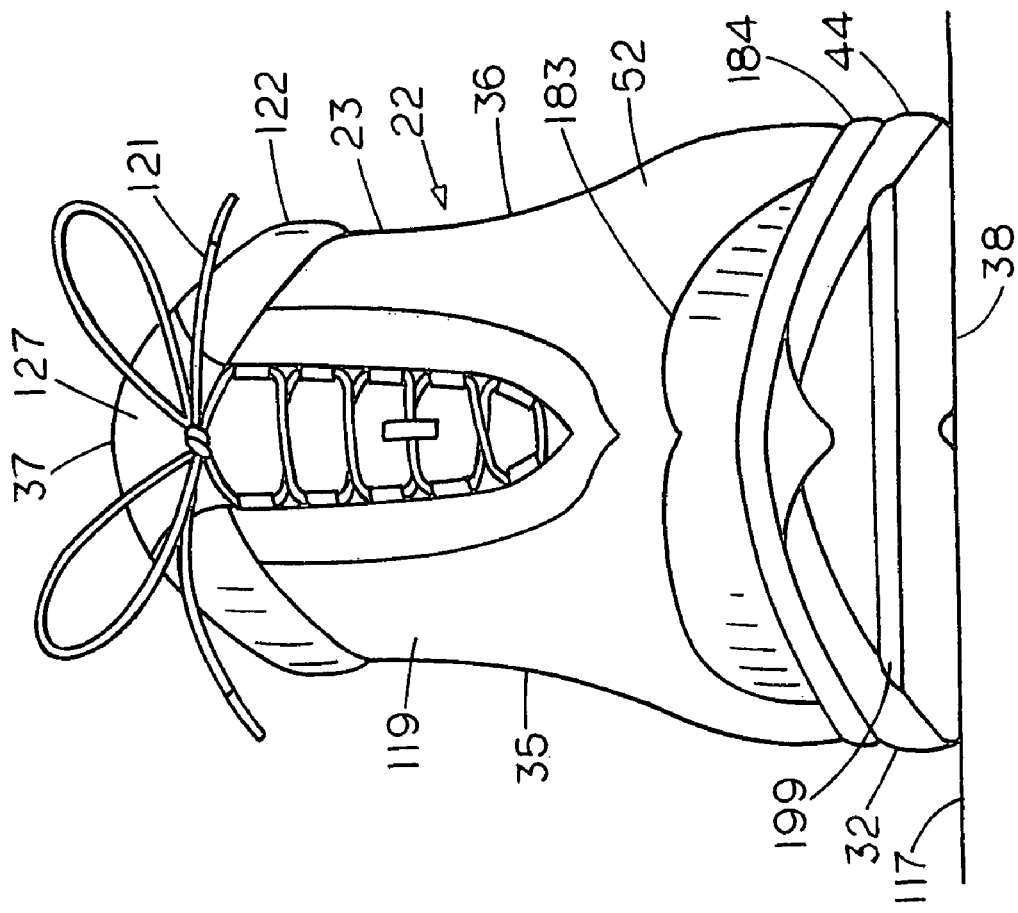

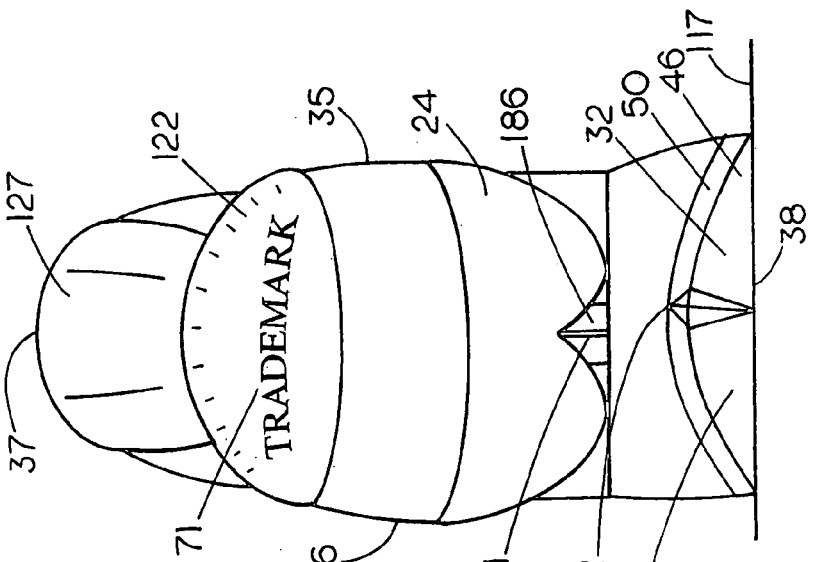
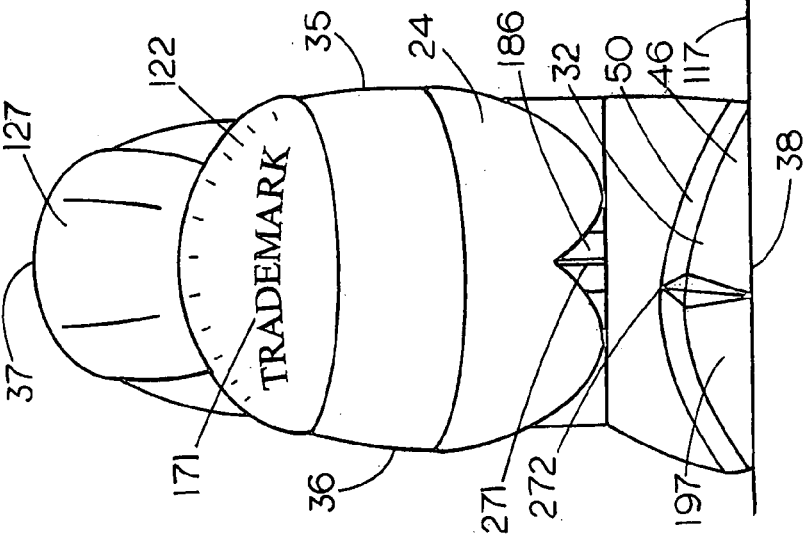
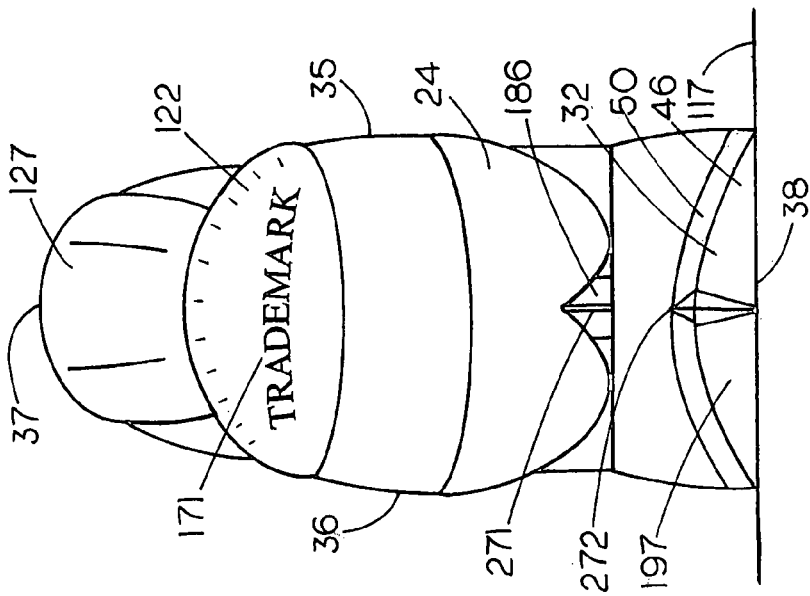

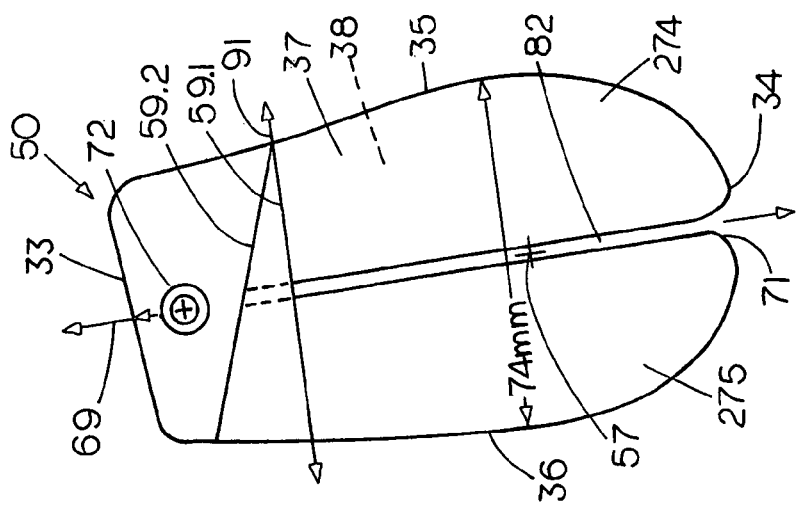
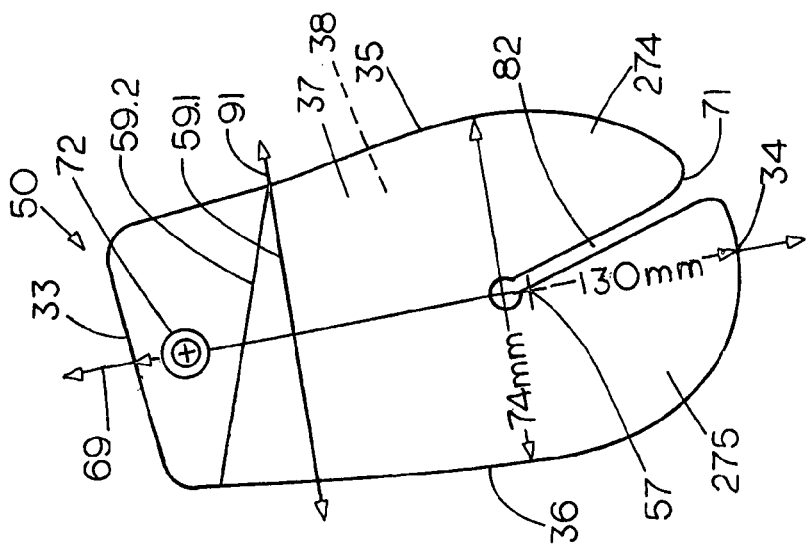
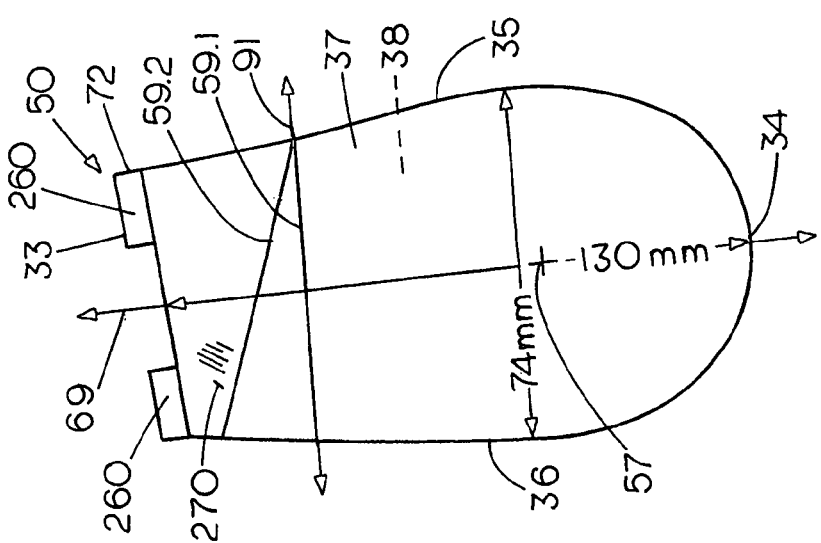

CUSTOM ARTICLE OF FOOTWEAR

CROSS REFERENCE TO RELATED APPLICATIONS

The present patent application is a continuation-in-part of my pending U.S. patent application Ser. No. 11/519,166, filed Sep. 11, 2006; which is a continuation-in-part of my U.S. patent application Ser. No. 10/279,626, filed Oct. 24, 2002, now U.S. Pat. No. 7,107,235; which in turn is a continuation-in-part of my patent application Ser. No. 10/152,402, filed May 21, 2002, now U.S. Pat. No. 7,016,867, which claimed priority under 35 U.S.C. §119 (e) of each of the following U.S. provisional patent applications: Ser. No. 60/360,784, filed Mar. 1, 2002; Ser. No. 60/345,951, filed Dec. 29, 2001; and Ser. No. 60/292,644, filed May 21, 2001, and which patent application Ser. No. 10/152,402 is a continuation-in-part of my U.S. patent application Ser. No. 09/573,121, filed May 17, 2000, now U.S. Pat. No. 6,601,042, which is a continuation-in-part of my U.S. patent application Ser. No. 09/523,341, filed Mar. 10, 2000, now U.S. Pat. No. 6,449,878. Priority for this present application is hereby claimed under 35 U.S.C. §120 based on the above identified U.S. patent applications, and priority for this present application is hereby claimed under 35 U.S.C. §119(e) based on the above identified U.S. provisional patent applications. All of the patent applications and patents recited in this paragraph, as well as the Applicant's U.S. Pat. No. 6,948,264, U.S. Pat. No. 6,939,502, and U.S. Pat. No. 7,175,187, are hereby incorporated by reference herein.

INCORPORATION BY REFERENCE

Published patents and patent applications regarding various structures, devices and means for securing various components of an article of footwear in functional relation include, e.g., U.S. Pat. No. 997,657, U.S. Pat. No. 1,219,507, U.S. Pat. No. 2,183,277, U.S. Pat. No. 2,200,080, U.S. Pat. No. 2,220,534, U.S. Pat. No. 2,552,943, U.S. Pat. No. 2,588,061, U.S. Pat. No. 2,640,283, U.S. Pat. No. 2,873,540, U.S. Pat. No. 3,012,340, U.S. Pat. No. 3,373,510, U.S. Pat. No. 3,538,628, U.S. Pat. No. 3,818,617, U.S. Pat. No. 3,846,919, U.S. Pat. No. 3,878,626, U.S. Pat. No. 3,906,646, U.S. Pat. No. 3,982,336, U.S. Pat. No. 4,103,440, U.S. Pat. No. 4,107,857, U.S. Pat. No. 4,132,016, U.S. Pat. No. 4,262,434, U.S. Pat. No. 4,267,650, U.S. Pat. No. 4,279,083, U.S. Pat. No. 4,300,294, U.S. Pat. No. 4,317,294, U.S. Pat. No. 4,351,120, U.S. Pat. No. 4,377,042, U.S. Pat. No. 4,420,894, U.S. Pat. No. 4,535,554, U.S. Pat. No. 4,538,368, U.S. Pat. No. 4,606,139, U.S. Pat. No. 4,747,220, U.S. Pat. No. 4,807,372, U.S. Pat. No. 4,825,563, U.S. Pat. No. 4,850,122, U.S. Pat. No. 4,887,369, U.S. Pat. No. 5,042,175, U.S. Pat. No. 5,083,385, U.S. Pat. No. 5,317,822, U.S. Pat. No. 5,339,544, U.S. Pat. No. 5,367,791, U.S. Pat. No. 5,381,610, U.S. Pat. No. 5,410,821, U.S. Pat. No. 5,533,280, U.S. Pat. No. 5,542,198, U.S. Pat. No. 5,615,497, U.S. Pat. No. 5,628,129, U.S. Pat. No. 5,661,915, U.S. Pat. No. 5,644,857, U.S. Pat. No. 5,657,558, U.S. Pat. No. 5,661,915, U.S. Pat. No. 5,678,327, U.S. Pat. No. 5,692,319, U.S. Pat. No. 5,729,916, U.S. Pat. No. 5,799,417, U.S. Pat. No. 5,822,888, U.S. Pat. No. 5,826,352, U.S. Pat. No. 5,896,608, U.S. Pat. No. 5,991,950, U.S. Pat. No. 6,023,857, U.S. Pat. No. 6,023,859, U.S. Pat. No. 6,145,221, U.S. Pat. No. 6,151,805, U.S. Pat. No. 6,247,249 B1, U.S. Pat. No. 6,282,814 B1, U.S. Pat. No. 6,324,772 B1, U.S. Pat. No. 6,332,281 B1, U.S. Pat. No. 6,349,486 B1, U.S. Pat. No. 6,684,532, U.S. Pat. No. 6,915,596, U.S. Pat. No. 6,931,766, U.S. Pat. No. 7,013,583, U.S. Pat. No. 7,076,890, U.S. Pat. No. 7,114,269, U.S. Pat. No. 7,140,129, U.S. 2005/0268491, U.S. 2006/0101671, U.S. 2006/0213088, U.S. 2006/0283050, and patent applications WO 97/46127 and WO 02/13641 A1, all of these patents and patent applications hereby being incorporated by reference herein.

Published patents and patent applications regarding the possible use of spring elements in articles of footwear, include e.g., U.S. Pat. No. 357,062, U.S. Pat. No. 968,020, U.S. Pat. No. 1,088,328, U.S. Pat. No. 1,107,894, U.S. Pat. No. 1,113,266, U.S. Pat. No. 1,127,456, U.S. Pat. No. 1,352,865, U.S. Pat. No. 1,370,212, U.S. Pat. No. 1,625,048, U.S. Pat. No. 2,444,865, U.S. Pat. No. 2,447,603, U.S. Pat. No. 2,456,102, U.S. Pat. No. 2,508,318, U.S. Pat. No. 3,333,353, U.S. Pat. No. 4,429,474, U.S. Pat. No. 4,492,046, U.S. Pat. No. 4,314,413, U.S. Pat. No. 4,486,964, U.S. Pat. No. 4,492,046, U.S. Pat. No. 4,506,460, U.S. Pat. No. 4,566,206, U.S. Pat. No. 4,638,575, U.S. Pat. No. 4,771,554, U.S. Pat. No. 4,854,057, U.S. Pat. No. 4,878,300, U.S. Pat. No. 4,942,677, U.S. Pat. No. 5,042,175, U.S. Pat. No. 5,052,130, U.S. Pat. No. 5,060,401, U.S. Pat. No. 5,138,776, U.S. Pat. No. 5,159,767, U.S. Pat. No. 5,187,883, U.S. Pat. No. 5,203,095, U.S. Pat. No. 5,224,278, U.S. Pat. No. 5,279,051, U.S. Pat. No. 5,337,492, U.S. Pat. No. 5,343,637, U.S. Pat. No. 5,343,639, U.S. Pat. No. 5,353,523,U.S. Pat. No. 5,367,790, U.S. Pat. No. 5,381,608, U.S. Pat. No. 5,396,718, U.S. Pat. No. 5,437,110, U.S. Pat. No. 5,461,800, U.S. Pat. No. 5,469,638, U.S. Pat. No. 5,511,324, U.S. Pat. No. 5,517,769, U.S. Pat. No. 5,528,842, U.S. Pat. No. 5,544,431, U.S. Pat. No. 5,596,819, U.S. Pat. No. 5,636,456, U.S. Pat. No. 5,647,145, U.S. Pat. No. 5,649,374, U.S. Pat. No. 5,678,327, U.S. Pat. No. 5,701,686, U.S. Pat. No. 5,706,589, U.S. Pat. No. 5,729,916, U.S. Pat. No. 5,761,831, U.S. Pat. No. 5,822,886, U.S. Pat. No. 5,826,350, U.S. Pat. No. 5,832,629, U.S. Pat. No. 5,860,226, U.S. Pat. No. 5,875,567, U.S. Pat. No. 5,896,679, U.S. Pat. No. 5,937,544, U.S. Pat. No. 5,974,695, U.S. Pat. No. 5,940,994, U.S. Pat. No. 6,006,449, U.S. Pat. No. 6,029,374, U.S. Pat. No. 6,195,915, U.S. Pat. No. 6,195,916, U.S. Pat. No. 6,216,365, U.S. Pat. No. 6,247,249 B1, U.S. Pat. No. 6,282,814 B1, U.S. Pat. No. 6,327,795, U.S. Pat. No. 6,330,757, U.S. Pat. No. 6,324,772 B1, U.S. Pat. No. 6,341,432, U.S. Pat. No. 6,393,731 B1, U.S. Pat. No. 6,416,610, U.S. Pat. No. 6,487,796, U.S. Pat. No. 6,457,261, U.S. Pat. No. 6,546,648, U.S. Pat. No. 6,557,271, U.S. Pat. No. 6,568,102, U.S. Pat. No. 6,598,320, U.S. Pat. No. 6,622,401, U.S. Pat. No. 6,665,957, U.S. Pat. No. 6,694,642, U.S. Pat. No. 6,711,834, U.S. Pat. No. 6,722,058, U.S. Pat. No. 6,749,187, U.S. Pat. No. 6,751,891, U.S. Pat. No. 6,763,611, U.S. Pat. No. 6,807,753, U.S. Pat. No. 6,829,848, U.S. Pat. No. 6,842,999, U.S. Pat. No. 6,851,204, U.S. Pat. No. 6,860,034, U.S. Pat. No. 6,865,824, U.S. Pat. No. 6,880,267, U.S. Pat. No. 6,886,274, U.S. Pat. No. 6,898,870, U.S. Pat. No. 6,920,705, U.S. Pat. No. 6,925,732, U.S. Pat. No. 6,928,756, U.S. Pat. No. 6,944,972, U.S. Pat. No. 6,948,262, U.S. Pat. No. 6,964,119, U.S. Pat. No. 6,964,120, U.S. Pat. No. 6,968,636, U.S. Pat. No. 6,983,553, U.S. Pat. No. 7,013,581, U.S. Pat. No. 7,082,698, U.S. Pat. No. 7,100,308, U.S. Pat. No. 7,100,309, U.S. D434,548, U.S. D450,437, U.S. D462,830, U.S. D472,696, U.S. D483,936, U.S. D474,332, U.S. 2004/0040180, U.S. 2005/0166422, U.S. 2006/0010715, U.S. 2006/0059713, U.S. 2006/0112592, U.S. 2006/0130365, U.S. 2006/0213082, U.S. 2007/0011920, French Patent 472,735, Italian Patent 633,409, European Patent Applications EP 0 890 321 A2, EP 1 048 233 A2, EP 1 033 087 A1, EP 1 025 770 A2, EP 1 240 838 A1, and PCT Patent Application WO 98/07341, all of these patents and patent applications hereby being incorporated by reference herein.

Published patents and patent applications regarding the conduct of Internet or retail business include: U.S. Pat. No. 5,897,622 granted to Blinn et al.; U.S. Pat. No. 5,930,769 granted to Rose; U.S. Pat. No. 5,983,200 granted to Slotznick; U.S. Pat. No. 5,983,201 granted to Fay; U.S. Pat. No. 6,206,750 B1 granted to Barad et al.; U.S. Pat. No. 5,206,804 granted to Theis et al.; PCT patent application WO 98/18386 by Rami; U.S. Pat. No. 5,123,169, U.S. Pat. No. 5,128,880, U.S. Pat. No. 5,195,030, U.S. Pat. No. 5,216,594, U.S. Pat. No. 5,231,723, U.S. Pat. No. 5,237,520, and U.S. Pat. No. 5,339,252 by granted to White or White et al.; U.S. Pat. No. 4,267,728; U.S. Pat. No. 4,598,376; U.S. Pat. No. 4,604,807; U.S. Pat. No. 4,736,203; U.S. Pat. No. 4,800,657; U.S. Pat. No. 4,813,436; U.S. Pat. No. 5,063,603; U.S. Pat. No. 5,164,793; U.S. Pat. No. 5,311,357; U.S. Pat. No. 5,351,303; U.S. Pat. No. 5,483,601; U.S. Pat. No. 5,500,802; U.S. Pat. No. 6,879,945, U.S. Pat. No. 7,089,152, U.S. 2006/0129416, U.S. patent application Ser. No. 09/716,321 by Christopher Cook entitled "System and Method for Sizing Footwear over a Computer Network," assigned to Nike, Inc. which was made of public record in connection with U.S. patent application Ser. No. 10/675,237 that was published as US 2005/0071242, entitled "Method and System for Custom-Manufacturing Footwear," by Mark Allen and John Tawney, assigned to Nike, Inc.; U.S. patent application Ser. No. 10/099,685 published as US 2004/0024645, entitled "Custom Fit Sale of Footwear" by Daniel Potter and Allan Schrock; WO 90/05345; and WO 94/20020. All of the patents and patent applications recited in this paragraph being hereby incorporated by reference herein.

Published patents and patent applications regarding the making of uppers for articles of footwear include: U.S. Pat. No. 5,595,005, U.S. Pat. No. 5,604,997, U.S. Pat. No. 5,724,753, U.S. Pat. No. 5,729,918, U.S. Pat. No. 5,785,909, U.S. Pat. No. 5,881,413, U.S. Pat. No. 5,885,500, U.S. Pat. No. 5,909,719, U.S. Pat. No. 6,024,712, U.S. Pat. No. 6,154,983, U.S. Pat. No. 6,237,251, U.S. Pat. No. 6,256,824, U.S. Pat. No. 6,295,679, U.S. Pat. No. 6,299,962, U.S. Pat. No. 6,308,438, U.S. Pat. No. 6,533,885, U.S. Pat. No. 6,986,269, U.S. D374,553, and patent applications WO 02/13641 A1, WO 02/23641 A1, U.S. 2005/0193592, U.S. 2006/0048413, U.S. 2006/0059715, U.S. 2006/0130359, U.S. 2006/0276095, and U.S. 2007/0022627. And published patents and patent applications regarding three dimensional and/or circular knitting which could possibly be used for making uppers include: U.S. Pat. No. 1,741,340, U.S. Pat. No. 1,889,716, U.S. Pat. No. 2,102,368, U.S. Pat. No. 2,144,563, U.S. Pat. No. 2,333,373, U.S. Pat. No. 2,391,064, U.S. Pat. No. 2,687,528, U.S. Pat. No. 2,771,691, U.S. Pat. No. 2,790,975, U.S. Pat. No. 3,085,410, U.S. Pat. No. 3,102,271, U.S. Pat. No. 3,274,709, U.S. Pat. No. 3,796,067, U.S. Pat. No. 4,253,317, U.S. Pat. No. 4,263,793, U.S. Pat. No. 4,341,096, U.S. Pat. No. 4,520,635, U.S. Pat. No. 4,615,188, U.S. Pat. No. 4,651,354, U.S. Pat. No. 4,732,015, U.S. Pat. No. 4,898,007, U.S. Pat. No. 5,230,333, U.S. Pat. No. 5,771,495, U.S. Pat. No. 5,784,721, U.S. Pat. No. 5,829,057, U.S. Pat. No. 5,946,731, U.S. Pat. No. 6,021,527, U.S. Pat. No. 6,122,937, U.S. Pat. No. 6,154,983, U.S. Pat. No. 6,138,281, U.S. Pat. No. 6,139,929, U.S. Pat. No. 6,230,525, U.S. Pat. No. 6,247,182, U.S. Pat. No. 6,256,824, U.S. Pat. No. 6,286,151, U.S. Pat. No. 6,292,951, U.S. Pat. No. 6,306,483, U.S. Pat. No. 6,314,584, U.S. Pat. No. 6,324,874, U.S. Pat. No. 6,334,222, U.S. Pat. No. 6,336,227, U.S. Pat. No. 6,354,114, U.S. Pat. No. 6,393,620, U.S. Pat. No. 6,446,267, U.S. Pat. No. 6,451,144, U.S. Pat. No. 6,457,332, EP 0 593 394 A1, D401,758, D403,149, D461,045, U.S. Pat. No. 4,194,249, U.S. Pat. No. 4,255,949, U.S. Pat. No. 4,277,959, U.S. Pat. No. 4,373,361, U.S. Pat. No. 5,307,522, U.S. Pat. No. 5,335,517, U.S. Pat. No. 5,560,226, U.S. Pat. No. 5,595,005, U.S. Pat. No. 5,603,232, U.S. Pat. No. 5,724,753, U.S. Pat. No. 5,791,163, U.S. Pat. No. 5,881,413, U.S. Pat. No. 5,909,719, U.S. Pat. No. 6,308,438, WO 96/21366, and D374,553. All of the patents and patent applications recited in this paragraph are hereby incorporated by reference herein.

FIELD OF THE INVENTION

The present invention teaches customized articles of footwear including removable and replaceable components, methods of making the same, and also methods of conducting retail and Internet business.

BACKGROUND

Conventional articles of footwear cannot be substantially customized for use by the customer or wearer. For example, the physical and mechanical properties of conventional athletic footwear are substantially fixed and generally targeted to well serve the median or average 160 pound individual. However, the body weight or mass, walking or running speed, and characteristic running technique of different individuals having the same footwear size can vary greatly. As a result, the stiffness in compression of the foam material used in the midsole of athletic shoes can be too soft for individuals who employ more forceful movements or have greater body mass than an average wearer. At the same time, the stiffness provided by conventional athletic shoes can be too great for individuals who weight significantly less than an average wearer. As a result, wearer's having characteristics deviating significantly from the norm or average individual can experience inferior cushioning and stability. Accordingly, conventional articles of athletic footwear often fail to provide optimal performance characteristics for individual wearers.

Further, conventional athletic footwear often include an outsole made of thermoset rubber that is cemented by an adhesive to a midsole made of an ethylene vinyl acetate or polyurethane foam material which is in also affixed with adhesive to a textile upper constructed with the use of stitching and adhesives. Because of the difficulty, time, and expense associated with renewing any portion of conventional articles of footwear, the vast majority are simply discarded at the end of their service life. This service life of an article of footwear can be characterized as having a short duration when a wearer frequently engages in athletic activity such as distance running or tennis. In tennis, portions of the outsole can be substantially abraded within a few hours, and in distance running a foam midsole can take a compression set within one hundred miles of use. The resulting deformation of the midsole can degrade both cushioning and rearfoot stability, thus may contribute to the origin of athletic injuries. Accordingly, many competitive distance runners who routinely cover one hundred miles in a week's time will discard their athletic footwear after logging three hundred miles in order to avoid possible injury.

While the service life of conventional athletic footwear is relatively short, the price of athletic footwear has steadily increased over the last three decades, and some models now bear retail prices over one hundred and twenty dollars. Nevertheless, athletic footwear by and large continue to be disposable commodities and few are being recycled. Accordingly, both the manufacture and disposal of conventional athletic footwear is relatively inefficient and environmentally friendly. In contrast, the present invention teaches a custom article of footwear, a method of making the same, and also a method of conducting retail and Internet business.

SUMMARY OF THE INVENTION

The present invention may take the form of a method of making a custom article of footwear. The method may include the steps of providing a plurality of footwear components, and a plurality of variations of a plurality of the footwear components, a plurality of the footwear components including fastening means, selecting from the plurality of footwear components sufficient footwear components for making the custom article of footwear having an anterior side, a posterior side, a medial side, a lateral side, and comprising at least an upper, a sole, and cushioning means affixable together in functional relation by the fastening means, providing the selected sufficient footwear components to a physical location at which the custom article of footwear can be made, and securing a plurality of the selected sufficient footwear components in functional relation with the fastening means and completing the assembly for making the custom article of footwear.

The fastening means may comprise mechanical means, whereby a plurality of the selected sufficient footwear components are removable and replaceable. The fastening means may also or alternatively comprise self-adhesive means.

The article of footwear may further comprise an insole which can be removed and replaced as desired by a different footwear component. The different footwear components may comprise a footwear component selected from the group including an insole, an inner liner, a slipper, a shoe, a boot, an aquatic boot, a cold weather liner, a hot and humid weather liner, and a rock climbing shoe which can be inserted and fit within the custom article of footwear, whereby the effective size and function provided by the custom article of footwear can be selectively varied.

The article of footwear may further comprise closure means. The article of footwear may further comprise a heel counter. The cushioning means may comprise an elastomeric material. The cushioning means may comprise a fluid-filled bladder. The fluid-filled bladder may comprise a gas. The sufficient footwear components may comprise a central processing unit for adjusting the cushioning characteristics provided by the article of footwear. The cushioning means may comprise a spring. The spring may comprise a superior spring element extending between the posterior side and the anterior side for at least fifty percent of the length of the upper. The spring may comprise an inferior spring element. The article of footwear may comprise at least one cushioning element. The sole may further comprise a pocket, whereby a portion of the cushioning means may be inserted into the pocket and the sole is thereby at least partially removably affixed in functional relation to the cushioning means. The upper may have a superior side and inferior side, and the sole may be removably affixed in functional relation to the inferior side of the upper. The upper may have a superior side and an inferior side, and the inferior side may comprise a plurality of openings, the sole may comprise an outsole including a plurality of traction members, at least one of the traction members comprising an undercut, whereby the plurality of traction members substantially project through the plurality of openings on the inferior side of the upper, and the outsole can then be removably affixed in functional relation to the upper by mechanical means comprising the undercut.

The present invention may take the form of a method of making an article of footwear, and the step of securing a plurality of the selected sufficient footwear components in functional relation with fastening means can be completed in less than five minutes.

The present invention may take the form of a method of making an article of footwear, whereby the step of providing a plurality of footwear components, and a plurality of variations of a plurality of the footwear components, comprises providing alternative footwear options selected from the group including alternative footwear product categories, alternative footwear models, alternative footwear skus, alternative footwear colors, alternative footwear materials, alternative footwear components, alternative footwear options using images generated using a computer database, alternative footwear options using at least one actual footwear component, and alternative footwear options using at least one custom article of footwear, and the step of selecting from the plurality of footwear components sufficient footwear components for making the custom article of footwear comprises providing a capability to the individual selected from the group including providing a data input capability, providing a search capability, providing a selection capability, providing a purchase capability, and the step of providing the selected sufficient footwear components to a physical location at which the custom article of footwear can be made comprises a physical location selected from the group including a company headquarters, a retail store, a sales office, a service center, a medical office, a factory, a vending machine, a warehouse and distribution center, and a private residence.

The present invention may take the form of a method of making a custom article of footwear. The method may include the steps of selecting a first footwear component from a plurality of uppers, selecting a second footwear component from a plurality of soles, selecting a third footwear component from a plurality of cushioning means, and operatively associating at least the first, second and third footwear components to form a custom article of footwear, wherein at least two of the first, second and third footwear components are operatively associated with each other by releasably securing them to each other with at least one fastener.

The present invention may take the form of a method of making an article of footwear having an anterior side, a posterior side, a medial side, a lateral side, and comprising at least an upper, a sole, and cushioning means affixable together in functional relation. The method may include the steps of providing a plurality of footwear components, and a plurality of variations of a plurality of the footwear components, a plurality of the footwear components including fastening means, selecting from the plurality of footwear components at least one footwear component for use in making the custom article of footwear, and providing the at least one footwear component to an address selected by the individual, whereby a plurality of footwear components comprising sufficient footwear components for making the custom article of footwear including the selected at least one footwear component are secured in functional relation with the fastening means and the assembly for making the custom article of footwear is completed.

The present invention may take the form of a method of conducting business including making and selling a custom article of footwear. The method may include the steps of providing a plurality of footwear components, and a plurality of variations of a plurality of the footwear components, a plurality of the footwear components including fastening means, selecting from the plurality of footwear components sufficient footwear components for making the custom article of footwear having an anterior side, a posterior side, a medial side, a lateral side, and comprising at least an upper, a sole, and cushioning means affixable together in functional relation by the fastening means, providing the sufficient footwear components to a physical location at which the custom article of footwear can be made, securing a plurality of the sufficient footwear components in functional relation with the fastening means and completing the assembly for making the custom article of footwear, and providing the custom article of footwear to a customer. Further, the footwear components may comprise options selected from the group of footwear components including uppers, soles, cushioning means, mechanical fasteners, mechanical fasteners having male and female parts, insoles, heel counters, closure means, laces, straps, toe counters, tongues, springs, superior spring elements, anterior and inferior spring elements, intermediate anterior spring elements, lasting boards, superior anterior spring elements, inferior anterior spring elements, posterior spring elements, inferior spring elements, spring guards, anterior spacers, posterior spacers, fluid-filled bladders, midsoles, outsoles, anterior outsole elements, middle outsole elements, posterior outsole elements, stabilizers, cushioning elements, traction members, spikes, cleats, bushings, wear prevention inserts, foam cushioning elements, stability elements, gaskets, intelligent cushioning devices, pins, exoskeletons, heel counter inserts, inferior spring element inserts, and cushioning inserts.

The present invention may take the form of a method of conducting business with the use of a vending device including making and selling a custom article of footwear having an anterior side, a posterior side, a medial side, a lateral side, and including at least an upper, a sole, and cushioning means affixable together in functional relation. The method may include the steps of providing a plurality of footwear components, and a plurality of variations of a plurality of the footwear components, a plurality of the footwear components including fastening means, selecting from the plurality of footwear components at least one footwear component for use in making the custom article of footwear, and providing the at least one footwear component to a physical location, whereby a plurality of footwear components comprising sufficient footwear components for making the custom article of footwear including the at least one footwear component are secured in functional relation with the fastening means and the assembly for making the custom article of footwear is completed.

The present invention may take the form of a custom article of footwear. The article of footwear can comprise an upper, a spring releasably secured to the upper, and a sole releasably secured to the spring. The article of footwear can include a mechanical fastener. Further, the article of footwear can include a cushioning element.

The present invention may take the form of a custom article of footwear comprising removable and replaceable components. The removable and replaceable components can comprise an upper, a sole, cushioning means, and a single mechanical fastener, whereby the upper, sole, cushioning means are secured in functional relation by the mechanical fastener. Further, the removable and replaceable footwear components can comprise options selected from the group of footwear components including uppers, soles, cushioning means, mechanical fasteners, mechanical fasteners having male and female parts, insoles, heel counters, closure means, laces, straps, toe counters, tongues, springs, superior spring elements, anterior and inferior spring elements, intermediate anterior spring elements, lasting boards, superior anterior spring elements, inferior anterior spring elements, posterior spring elements, inferior spring elements, spring guards, anterior spacers, posterior spacers, fluid-filled bladders, midsoles, outsoles, anterior outsole elements, middle outsole elements, posterior outsole elements, stabilizers, cushioning elements, traction members, spikes, cleats, bushings, wear prevention inserts, foam cushioning elements, stability elements, gaskets, intelligent cushioning devices, pins, exoskeletons, heel counter inserts, inferior spring element inserts, and cushioning inserts.

BRIEF DESCRIPTION OF THE DRAWING FIGURES

FIG. 3 is a bottom view showing a shoe upper and also the approximate position of an embodiment of an external heel counter mounted on the footwear last shown in FIG. 1.

FIG. 4 is a lateral side view showing an embodiment of a thermoplastic exoskeleton in place on the mounted shoe upper shown in FIG. 2.

FIG. 10 is a bottom view of an embodiment of an inferior spring element showing a longitudinal axis, and also a transverse axis.

FIG. 11 is a bottom view of the inferior spring element shown in FIG. 10 including an embodiment of a posterior outsole element.

FIG. 12 is a side cross-sectional view of an embodiment of a spacer for use with a superior spring element or heel counter.

FIG. 13 is a side cross-sectional view of an embodiment of a heel counter insert for use with the external heel counter.

FIG. 14 is a side cross-sectional view of an embodiment of a inferior spring element insert for use with an inferior spring element.

FIG. 15 is a top view of an embodiment of an inferior spring element insert showing a plurality of splines.

FIG. 16 is a top view of an embodiment of the male part of a fastener.

FIG. 17 is a side view of an embodiment of the male part of a fastener.

FIG. 18 is a side view of an embodiment of the female part of a fastener.

FIG. 19 is a front view of the embodiment of an article of footwear shown in FIGS. 5 and 6.

FIG. 20 is a rear view of the embodiment of an article of footwear shown in FIGS. 5, 6 and 19.

Figure 6:
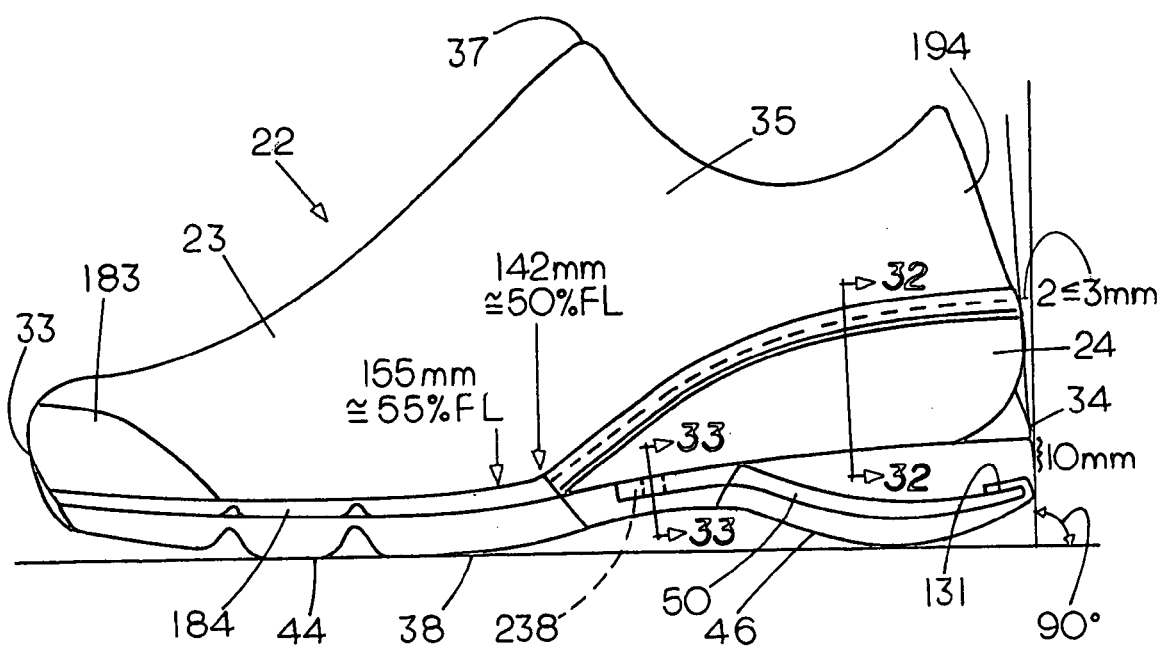
FIG. 6 is a medial side view of the embodiment of an article of footwear shown in FIG. 5.
Figure 33:
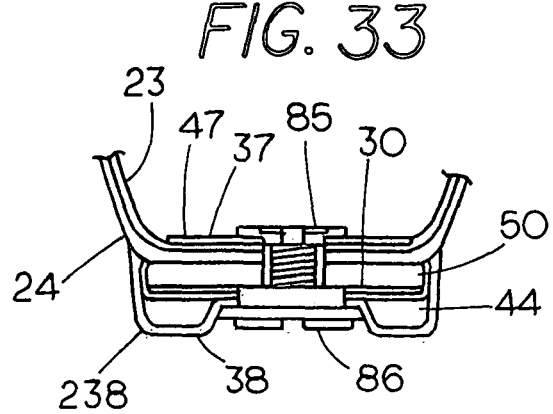

FIG. 33 is a cross-sectional view of the superior spring element, external heel counter, pocket extension portion of the external heel counter, inferior spring element, backing of anterior outsole element, anterior outsole element, backing of posterior outsole element, and the complementary male and female fastener portions of the embodiment of an article of footwear shown in FIG. 6, taken along like 33-33.

Figure 34:
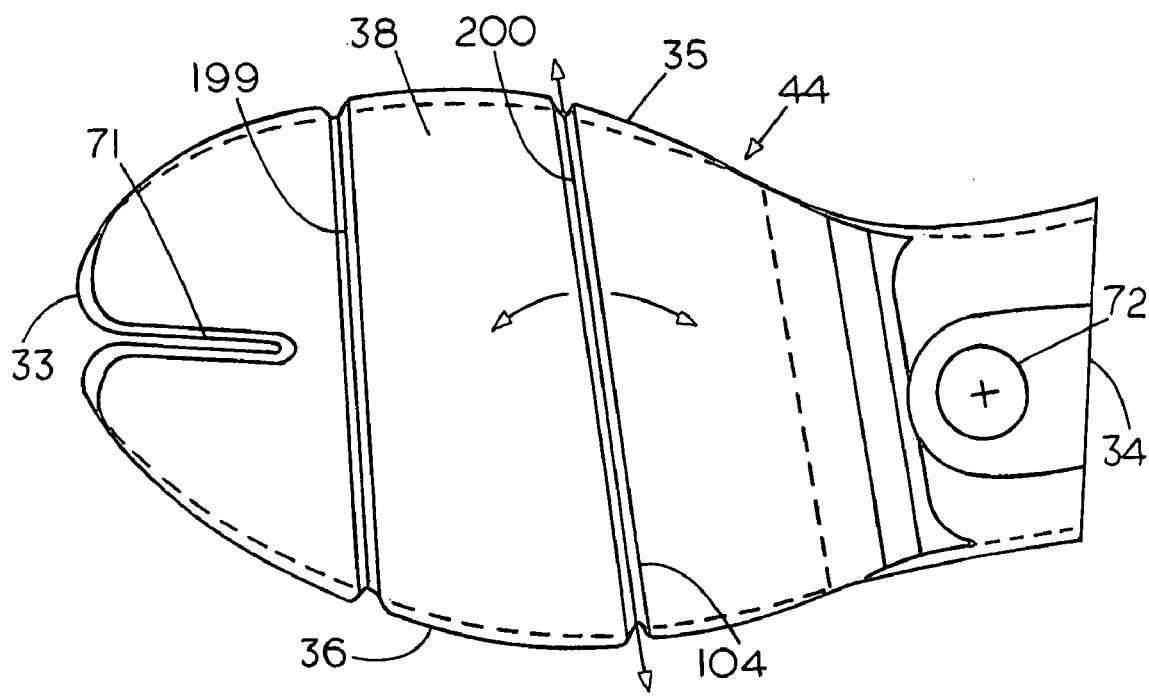

FIG. 34 is a bottom view of an embodiment of an anterior outsole element.

Figure 35:
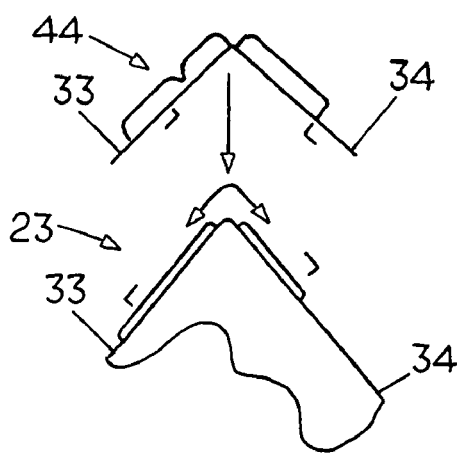

FIG. 35 is a perspective view showing a shoe upper of an article of footwear and also an embodiment of an anterior outsole element which is folded in the area of the MPJ's.

Figure 36:
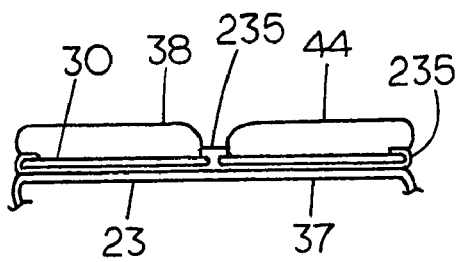

FIG. 36 is a cross-sectional view showing portions of an embodiment of an anterior outsole element, exoskeleton, and shoe upper which are affixed in functional relation, taken along a line which is generally consistent with line 36-36, as shown in FIG. 3.

Figure 37:
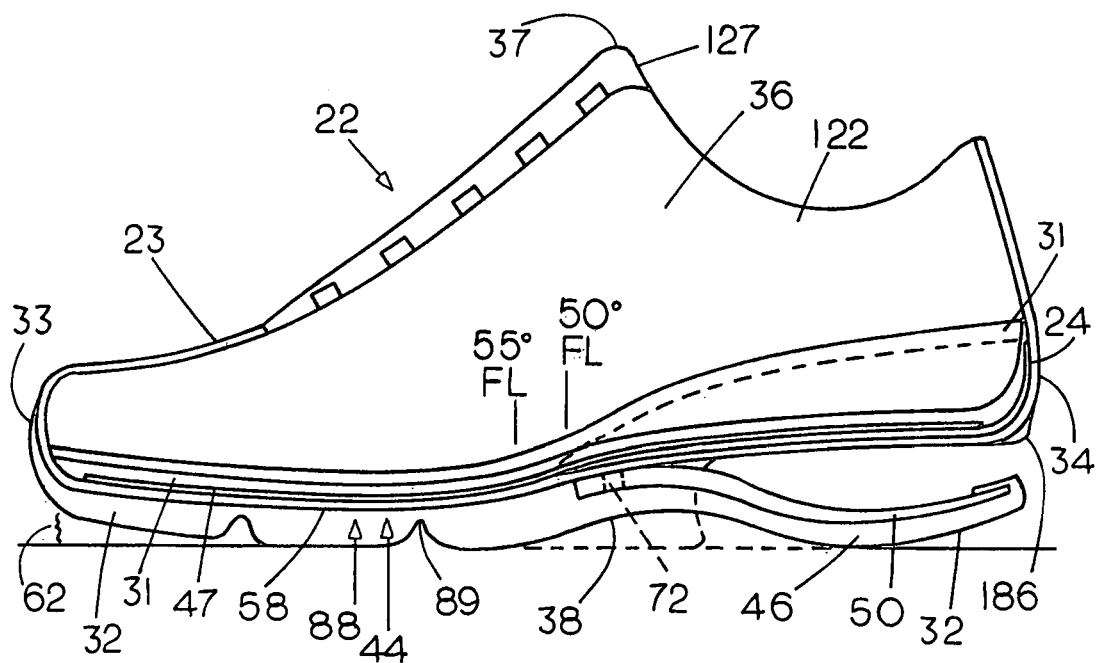

FIG. 37 is a lateral side cross-sectional view showing an embodiment of an article of footwear including an internal heel counter.

Figure 38:
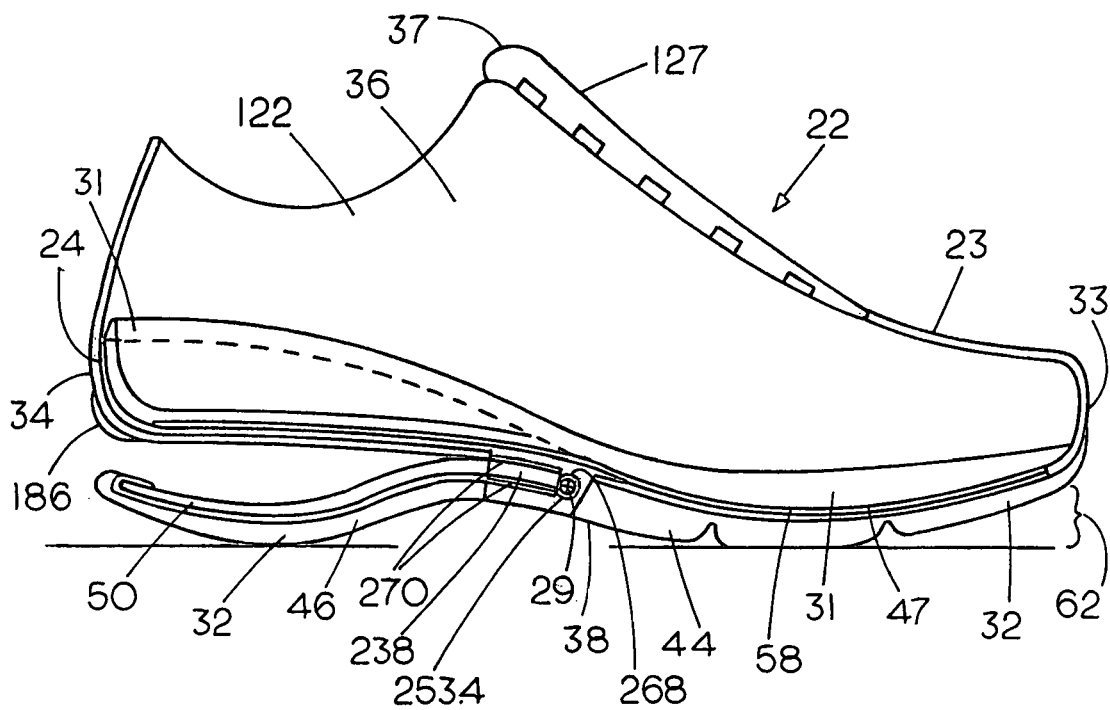

FIG. 38 is a lateral side cross-sectional view showing an embodiment of article of footwear including an internal heel counter including a heel counter locking pin guide.

Figure 39:
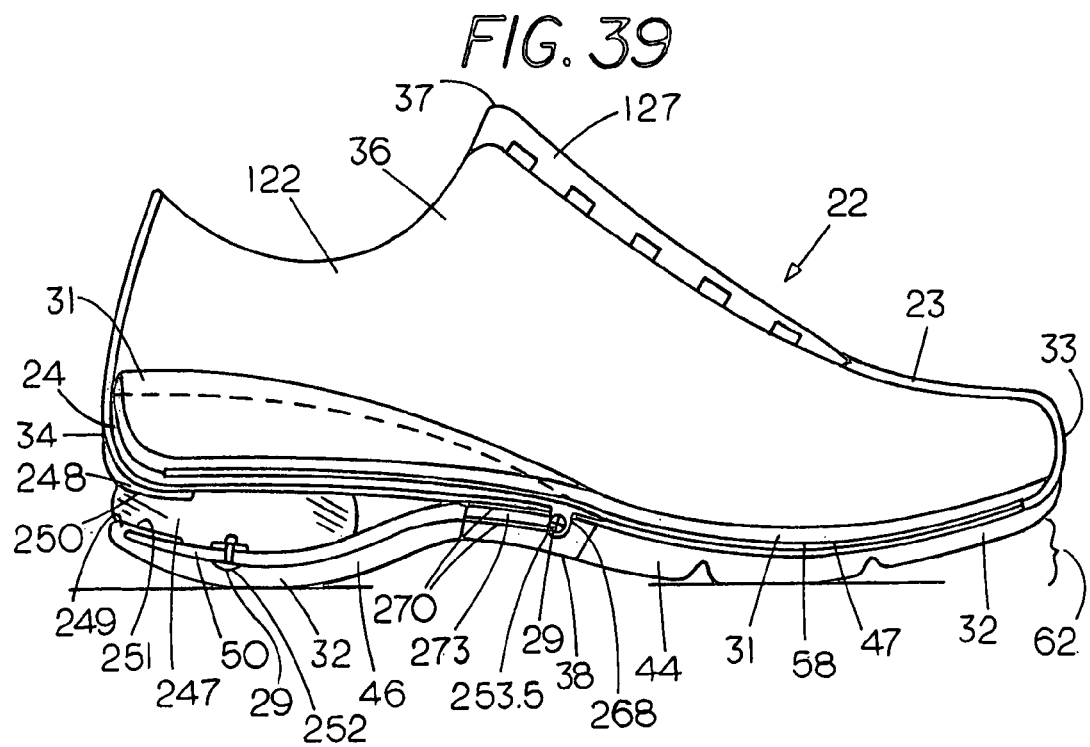

FIG. 39 is a lateral side cross-sectional view showing an embodiment of an article of footwear including a cushioning insert.

Figure 40:
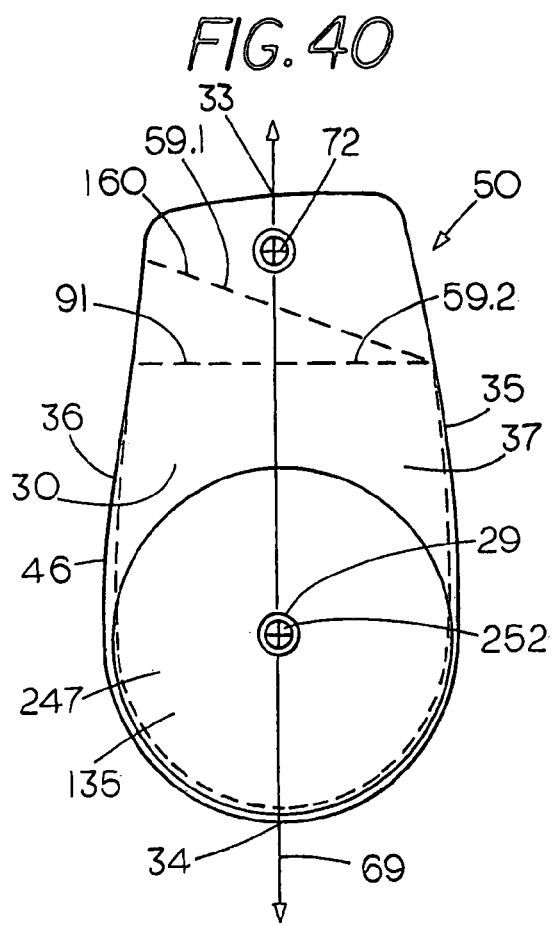

FIG. 40 is a top view of an embodiment of an inferior spring element including a cushioning insert.

Figure 41:
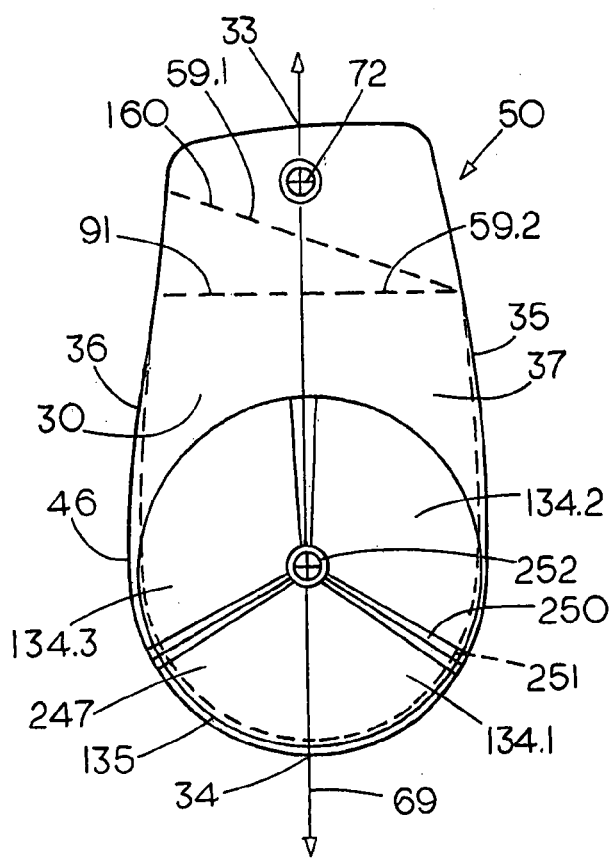

FIG. 41 is a top view of an embodiment of an inferior spring element including a cushioning insert including foam materials.

Figure 42:
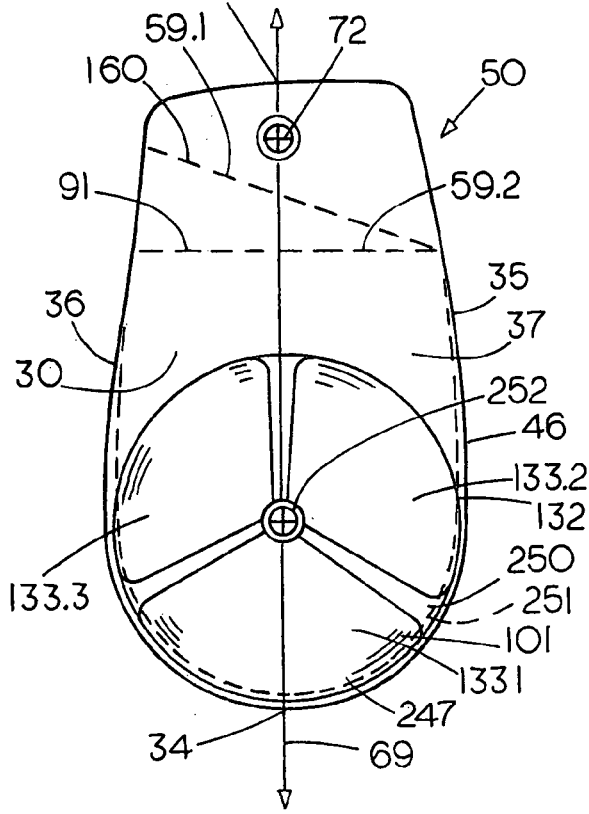

FIG. 42 is a top view of an inferior spring element including a cushioning insert including a fluid-filled bladder with three different chambers.

Figure 43:
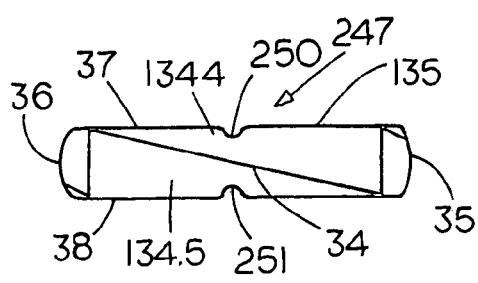

FIG. 43 is a posterior view of an alternate embodiment of a cushioning insert including two different overlapping foam materials.

Figure 44:
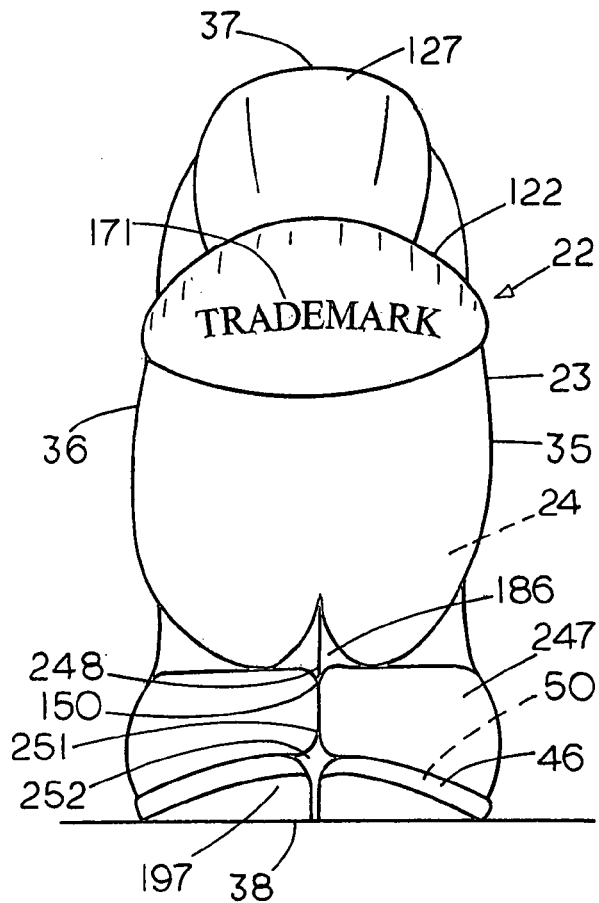

FIG. 44 is a posterior view of an embodiment of an article of footwear similar to that shown in FIG. 39.

Figure 45:
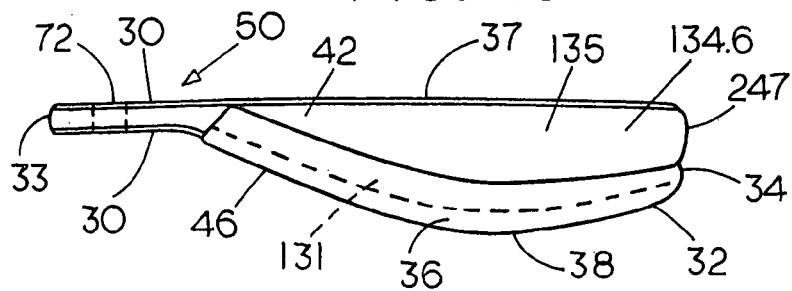

FIG. 45 is a lateral view of an embodiment of an inferior spring element positioned in functional relation to a posterior outsole element and foam cushioning element having low stiffness in compression.

Figure 46:
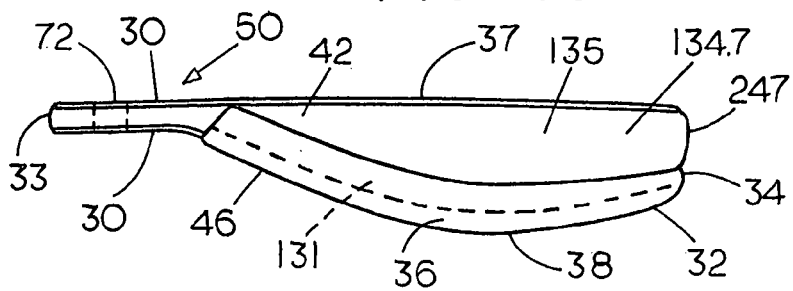

FIG. 46 is a lateral view of an embodiment of an inferior spring element positioned in functional relation to a posterior outsole element and foam cushioning element having medium stiffness in compression.

Figure 47:
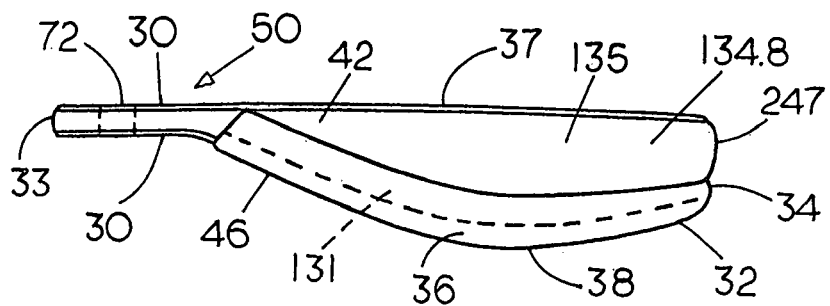

FIG. 47 is a lateral view of an embodiment of an inferior spring element positioned in functional relation to a posterior outsole element and foam cushioning element having high stiffness in compression.

Figure 48:
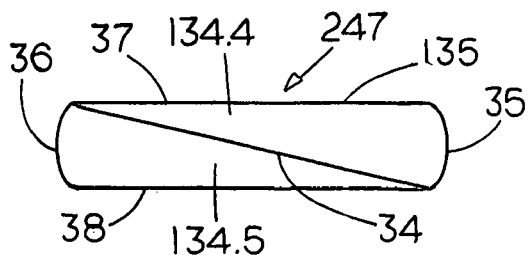

FIG. 48 is a posterior view of an embodiment of a cushioning insert including a foam cushioning element including two overlapping parts having different stiffness in compression.

Figure 49:
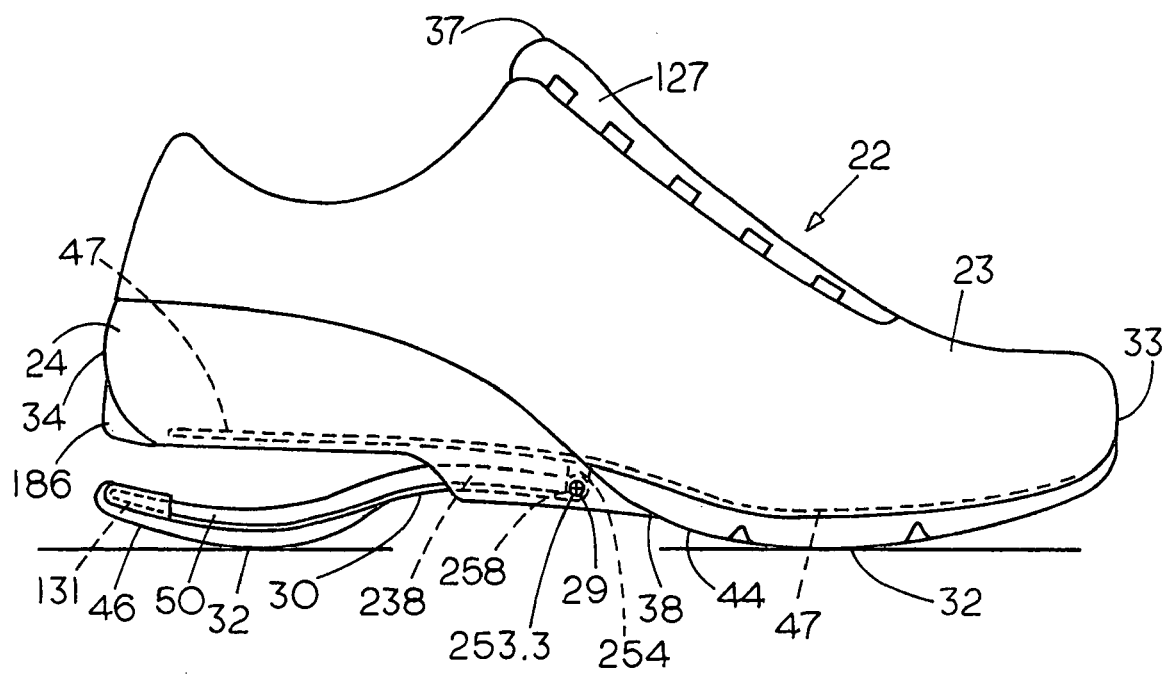

FIG. 49 is a side view showing an embodiment of a locking pin for securing a heel counter, inferior spring element, superior spring element, upper, and posterior outsole element of an article of footwear in functional relation.

Figure 50:
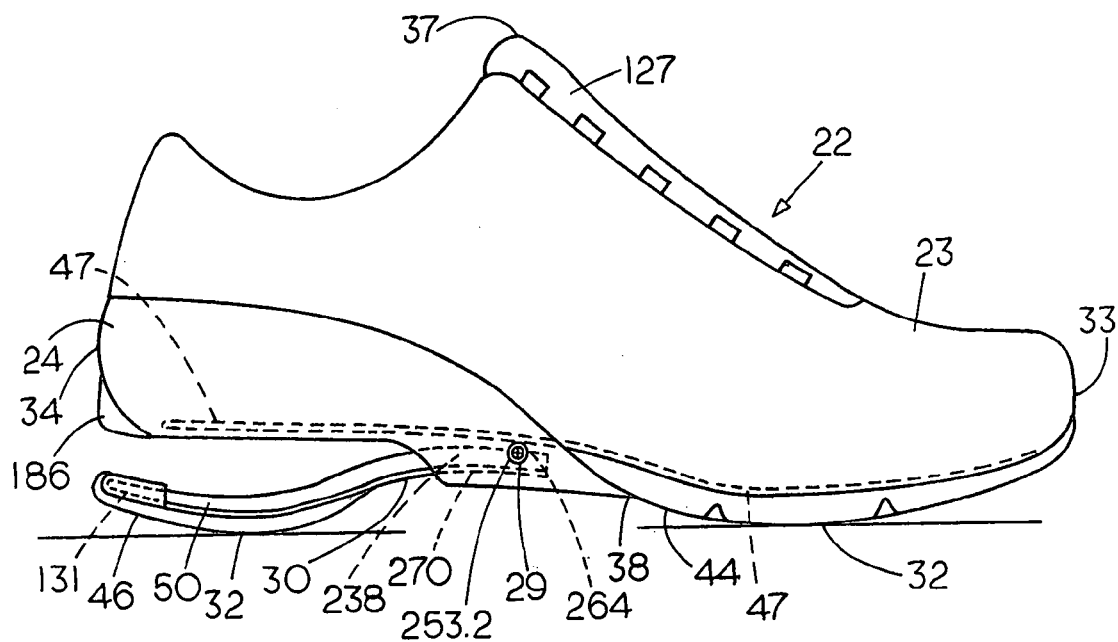

FIG. 50 is a side view showing an embodiment of a locking pin for securing a heel counter, inferior spring element, and posterior outsole element of an article of footwear in functional relation.

Figure 51:
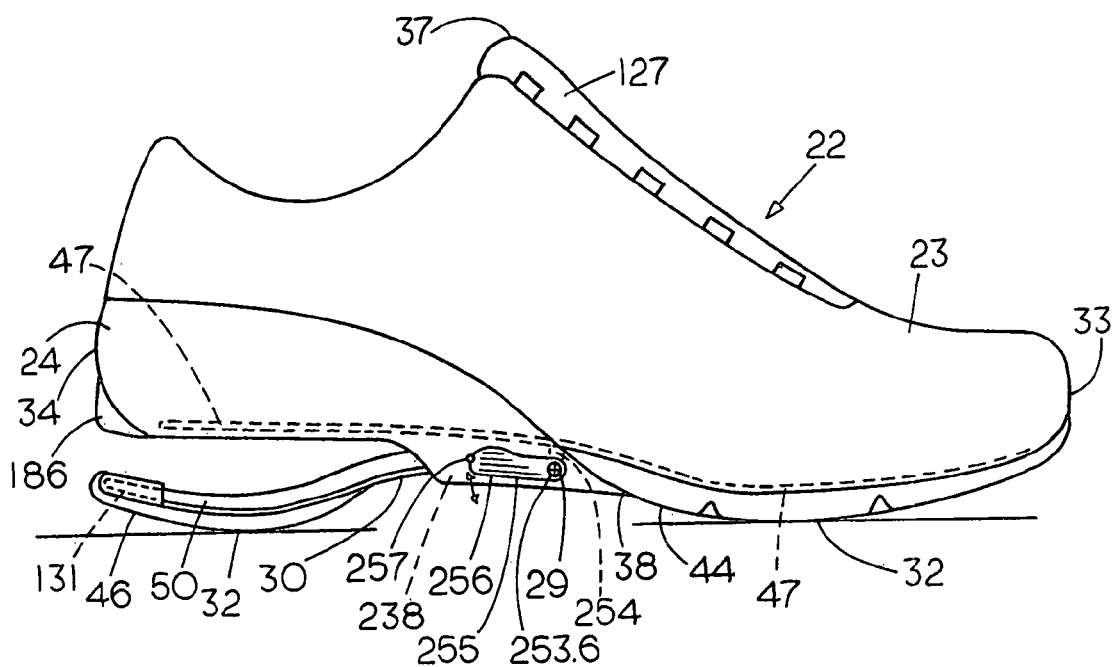

FIG. 51 is a side view showing an embodiment of a locking pin including a locking pin arm for securing a heel counter, inferior spring element, superior spring element, upper, and posterior outsole element of an article of footwear in functional relation.

Figure 52:
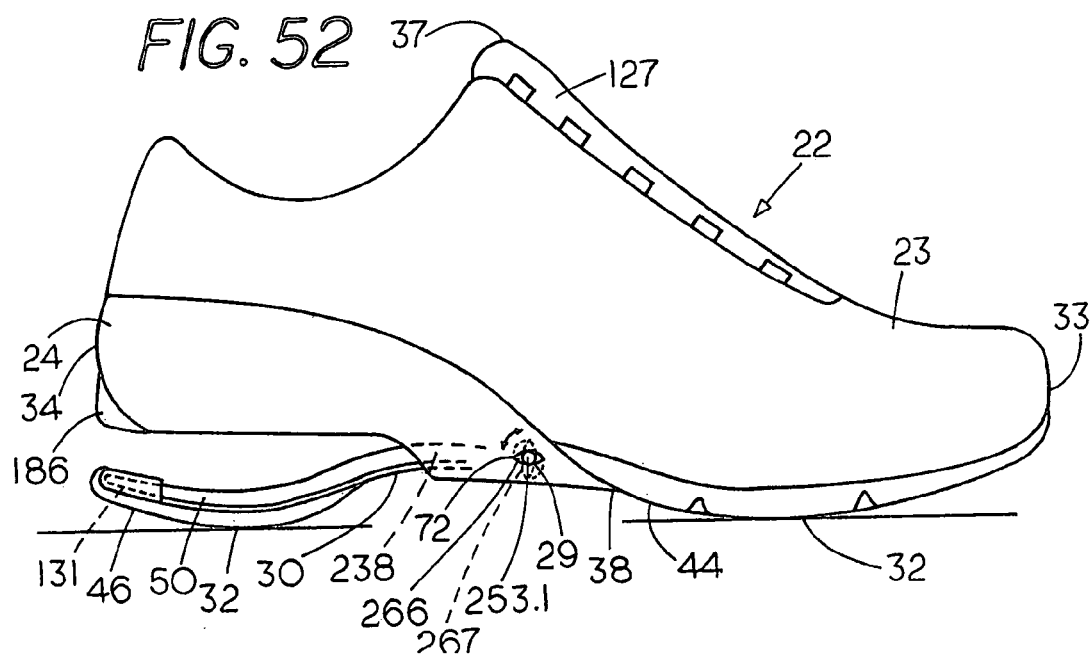

FIG. 52 is a side view showing an embodiment of a quarter turn locking pin for securing a heel counter, inferior spring element, superior spring element, upper, and posterior outsole element of an article of footwear in functional relation.

Figure 53:
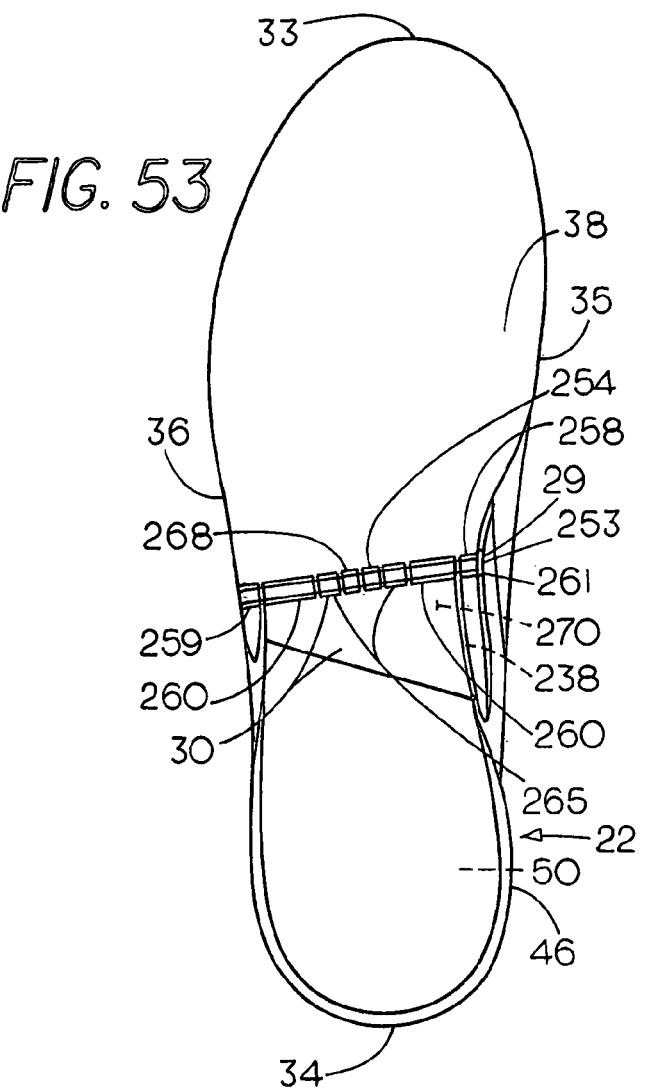

FIG. 53 is an inferior view of an embodiment of an article of footwear having the heel counter pocket broken away to show a locking pin secured in functional relation to an inferior spring element and upper.

Figure 54:
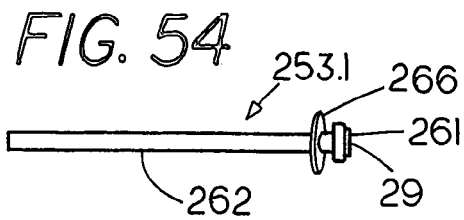

FIG. 54 is a perspective view of an embodiment of a quarter turn locking pin.

Figure 55:
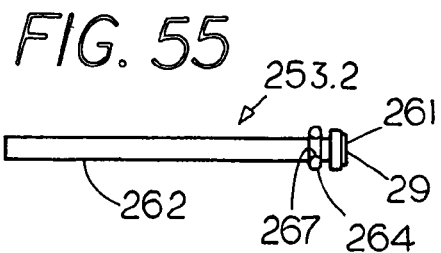

FIG. 55 is a perspective view of an embodiment of a locking pin including an O ring.

Figure 56:
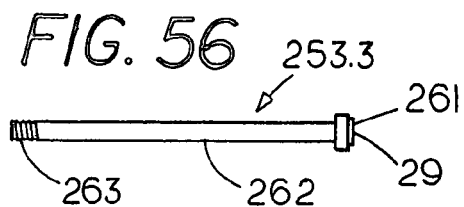

FIG. 56 is a perspective view of an embodiment of a locking pin including a threaded portion on the end opposite the head.

Figure 57:
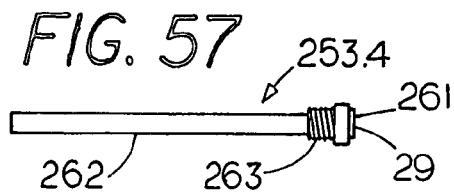

FIG. 57 is a perspective view of an embodiment of a locking pin including a threaded portion near the head.

Figure 58:
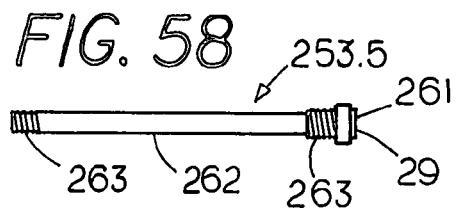

FIG. 58 is a perspective view of an embodiment of a locking pin including threaded portions near the head and also on the end opposite the head.

Figure 59:
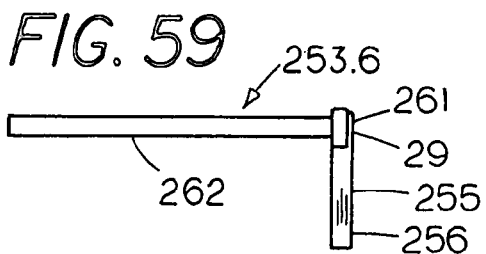

FIG. 59 is a perspective view of an embodiment of a locking pin having a locking pin arm.

FIG. 60 is a posterior view of an embodiment of an article of footwear having an inferior spring element in a centered position.

FIG. 61 is a posterior view of an embodiment of an article of footwear having an inferior spring element orientated approximately 5 degrees towards the lateral side.

FIG. 62 is a posterior view of an embodiment of article of footwear having an inferior spring element orientated approximately 5 degrees towards the medial side.

FIG. 63 is a top view of an embodiment of an inferior spring element including a casing including at least one inferior spring element locking pin guide.

FIG. 64 is a top view of an embodiment of an inferior spring element including medial and lateral forks which are defined by a slit extending from the medial and posterior side.

FIG. 65 is a top view of an embodiment of an inferior spring element including medial and lateral forks which are defined by a slit extending from the posterior side.

Figure 66:
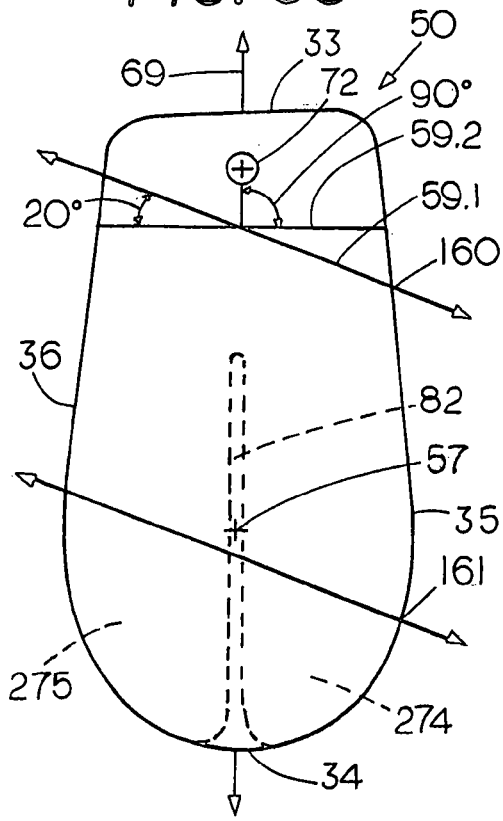

FIG. 66 is a top view of an embodiment of an inferior spring element showing the possible inclusion of a slit in dashed phantom lines.

Figure 67:
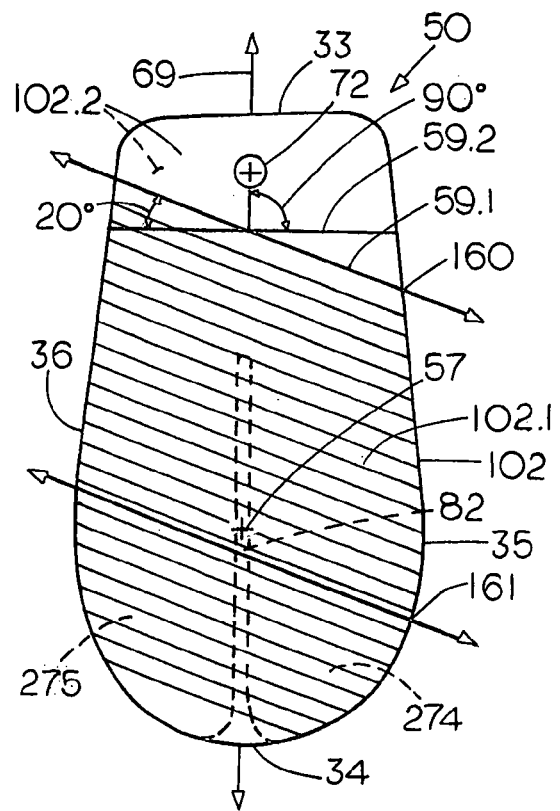

FIG. 67 is a top x-ray view of an embodiment of inferior spring element showing the possible inclusion of a slit in dashed phantom lines, and also the beginning of tapering posterior of the anterior tangent point.

Figure 68:
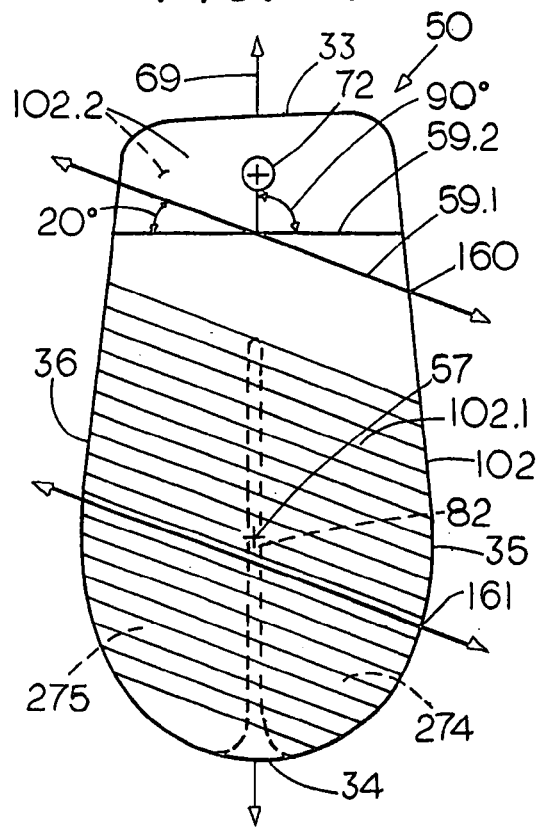

FIG. 68 is a top x-ray view of an embodiment of inferior spring element showing the possible inclusion of a slit in dashed phantom lines, and also the beginning of tapering at about three quarters of the distance between the posterior tangent point and the anterior tangent point.

Figure 69:
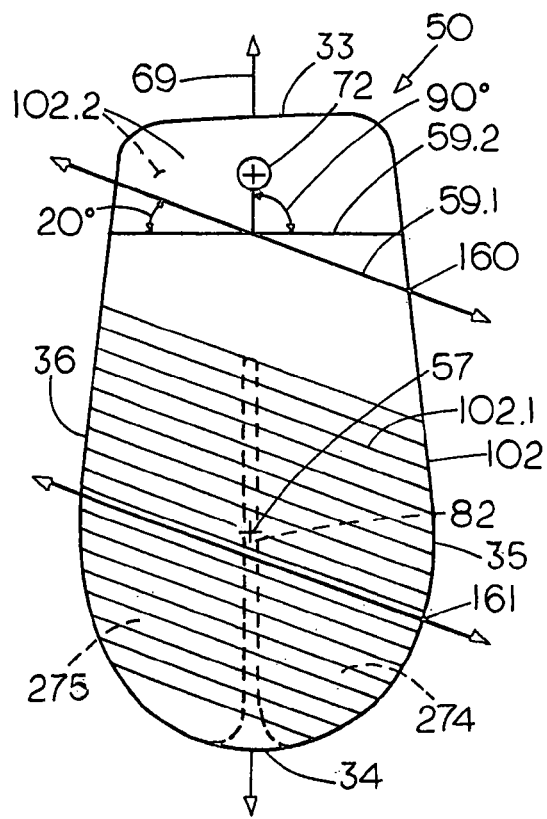

FIG. 69 is a top x-ray view of an embodiment of an inferior spring element showing the possible inclusion of a slit in dashed phantom lines, and also the beginning of tapering at about two thirds of the distance between the posterior tangent point and the anterior tangent point.

Figure 70:
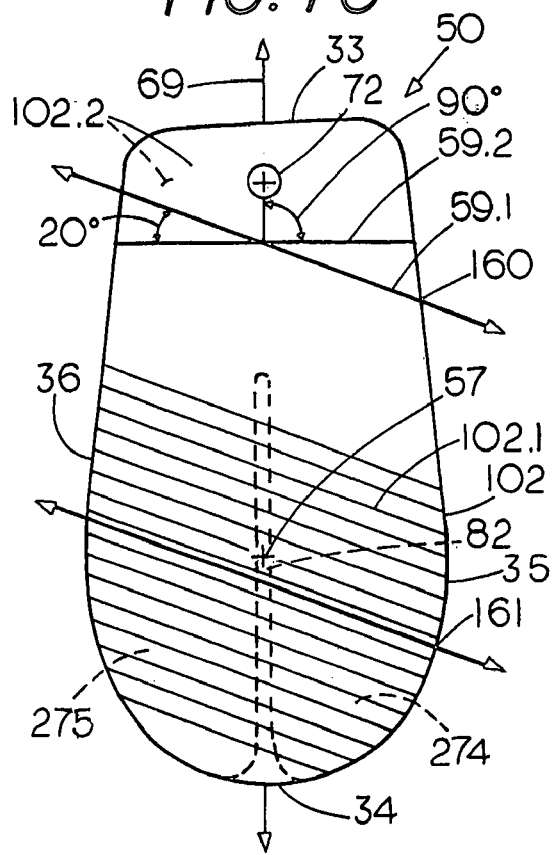

FIG. 70 is a top x-ray view of an embodiment of an inferior spring element showing the possible inclusion of a slit in dashed phantom lines, and also the beginning of tapering at about one half of the distance between the posterior tangent point and the anterior tangent point.

Figure 71:
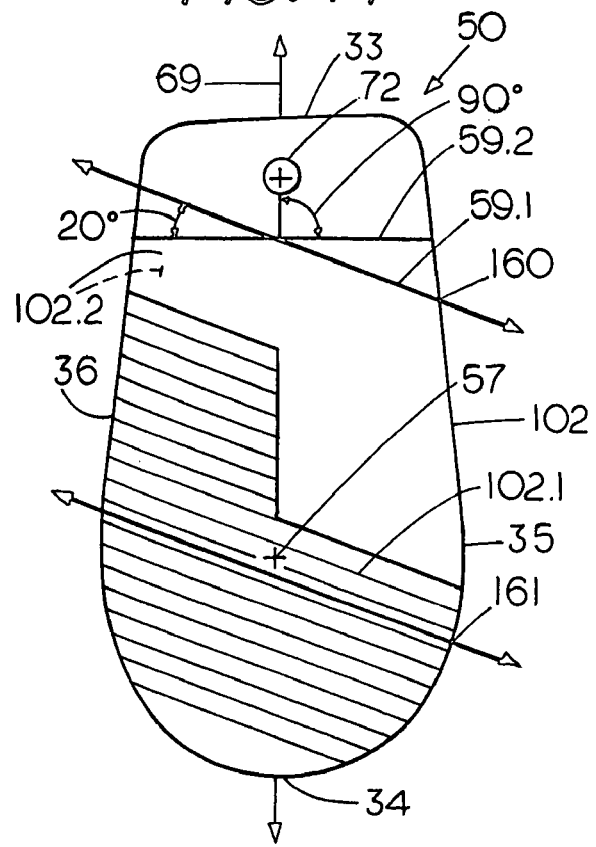

FIG. 71 is a top x-ray view of an embodiment of an inferior spring element showing the beginning of tapering at about three quarters of the distance between the posterior tangent point and the anterior tangent point on the lateral side, but less than half of the distance between the posterior tangent point and the anterior tangent point on the medial side.

Figure 72:
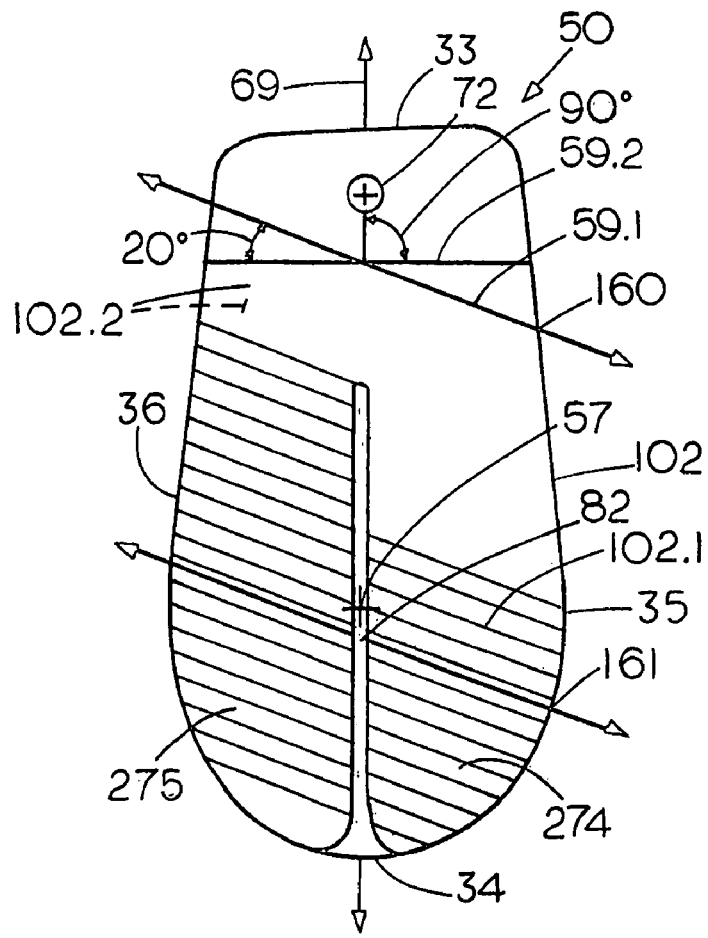

FIG. 72 is a top x-ray view of an embodiment of an inferior spring element including a slit showing the beginning of tapering at about three quarters of the distance between the posterior tangent point and the anterior tangent point on the lateral side, but less than half of the distance between the posterior tangent point and the anterior tangent point on the medial side.

Figure 73:
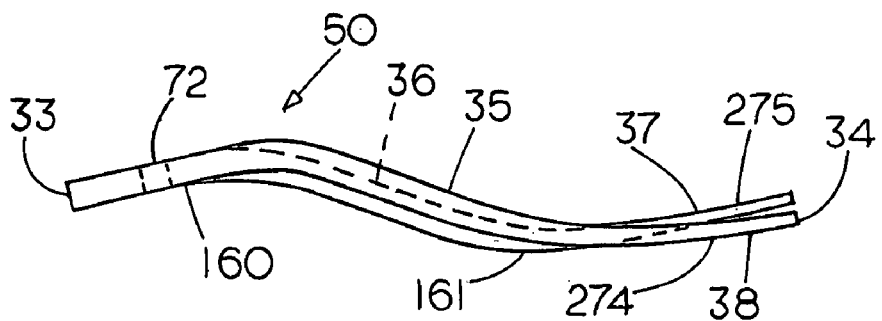

FIG. 73 is a medial side view of an embodiment of an inferior spring element including medial and lateral forks defined by a slit extending from the posterior side which is generally similar to that shown in FIG. 72, but further including asymmetry in the configuration and curvature as between the medial fork and the lateral fork.

DETAILED DESCRIPTION

An article of footwear of the present invention may include a spring element which can provide improved cushioning, stability, and running economy. Unlike the conventional foam materials presently being used by the footwear industry, a spring element of the present invention is not subject to substantial compression set degradation and can provide a relatively long service life. The components of the article of footwear including the upper, insole, spring element, and sole can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be customized by an individual wearer, or otherwise configured for a select target population in order to optimize desired performance criteria. Moreover, the present invention teaches a method of making an article of footwear, and also a method of doing both retail and Internet business including making and selling a custom article of footwear.

Conventional athletic footwear often include an outsole made of a thermoset rubber compound which is affixed by adhesive to a midsole made of ethylene vinyl acetate or polyurethane foam material which is in turn affixed with an adhesive to an upper which is constructed with the use of stitching and adhesives. Because of the difficulty, time, and expense associated with renewing any portion of conventional articles of footwear, the vast majority are discarded at the end of their service life. This service life can be characterized as having a short duration when a wearer frequently engages in athletic activity such as distance running or tennis. In tennis, portions of the outsole can be substantially abraded within a few hours, and in distance running the foam midsole can take a compression set within one hundred miles of use. The resulting deformation of the foam midsole can degrade cushioning and footwear stability, thus contribute to the origin of athletic injuries. Accordingly, many competitive distance runners who routinely cover one hundred miles in a week's time will discard their athletic footwear after logging three hundred miles in order to avoid possible injury.

Even though the service life of conventional athletic footwear is relatively short, the price of athletic footwear has steadily increased over the last three decades, and some models now bear retail prices over one hundred and twenty dollars. However, some of this increase in retail prices has been design and fashion driven as opposed to reflecting actual value added. In any case, conventional athletic footwear largely remain disposable commodities and few are being recycled. As a result, both the making and disposal of conventional athletic footwear is relatively inefficient and environmentally unfriendly. In contrast with conventional athletic footwear, the present invention teaches an article of footwear that can include a spring element which does not take a compression set or similarly degrade, thus the physical and mechanical properties afforded by a custom article of footwear can remain substantially the same over a useful service life which can be several times longer than that of conventional articles of footwear. The present invention teaches an article of footwear which represents an investment, as opposed to a disposable commodity. Like an automobile, the custom article of footwear of the present invention may include components which can be easily renewed and replaced, but also components which can be varied and customized, as desired.

Conventional athletic footwear cannot be substantially customized for use by the customer or wearer. The physical and mechanical properties of conventional athletic footwear are substantially fixed and generally targeted to well serve the median or average 160 pound individual. However, the body weight or mass, walking or running speed, and characteristic running technique of different individuals having the same footwear size can vary greatly. As a result, the stiffness in compression of the foam material used in the midsole of athletic shoes can be too soft for individuals who employ more forceful movements or have greater body mass than an average wearer. At the same time, the stiffness provided by conventional athletic shoes can be too great for individuals who weight significantly less than an average wearer. As a result, those wearers having characteristics deviating significantly from the norm or average individual can experience inferior cushioning and stability. Accordingly, conventional articles of athletic footwear often fail to provide optimal performance characteristics for individual users.

In contrast, the present invention permits a wearer to customize an article of footwear. For example, the length, width, girth, and configuration of the upper, as provided by various last options, or by two or three dimensional modeling and footwear design equipment including computer software and data storage and retrieval systems, or by two or three dimensional measurement devices such as scanners, as well as the type of footwear construction and design of the upper can be selected by the customer or wearer. Further, the physical and mechanical properties of the article of footwear can be selected and changed as desired in order to optimize desired performance characteristics given various selected performance criteria or environmental conditions. For example, the configuration and geometry of the article of footwear, and the stiffness of the spring elements can be customized, as desired. In addition, the ability to easily remove, renew, and recycle the outsole portions of a custom article of footwear according to the present invention can render the use of softer materials having enhanced shock and vibration dampening characteristics, but perhaps diminished wear properties viable from a practical standpoint. Moreover, the outsole portion of a custom article of footwear can be selected from a variety of options with regards to configuration, materials, and function.

The physical and mechanical properties associated with an article of footwear of the present invention can provide enhanced cushioning, stability, and running economy relative to conventional articles of footwear. The spring to dampening ratio of conventional articles of footwear is commonly in the range between 40-60 percent, whereas the article of footwear of the present invention can provide a higher spring to dampening ratio, thus greater mechanical efficiency and running economy. In this regard, the article of footwear can include a spring element that underlies the forefoot area which can store energy during the latter portion of the stance phase and early portion of the propulsive phase of the running cycle and then release this energy during the latter portion of the propulsive phase, thus facilitating improved running economy. It is believed the resulting improvement in running performance can approximate one second over four hundred meters when running at four minutes/mile pace.

The article of footwear of the present invention can provide differential stiffness in the rearfoot area so as to reduce both the rate and magnitude of pronation, or alternately, the rate and magnitude of supination experienced by an individual wearer, thus avoid conditions which can be associated with injury. Likewise, the article of footwear can provide differential stiffness in the midfoot and forefoot areas so as to reduce both the rate and magnitude of inward and/or outward rotation of the foot, thus avoid conditions which can be associated with injury. The spring elements can also provide a stable platform which can prevent or reduce the amount of deformation caused by point loads, thus avoid conditions which can be associated with injury.

The use of relatively soft outsole materials having improved shock and vibration dampening characteristics can enhance cushioning effects. Further, in conventional articles of footwear, the shock and vibration generated during rearfoot impact is commonly transmitted most rapidly to a wearer through that portion of the outsole and midsole which has greatest stiffness, and this is normally a portion of the sole which is proximate the heel of the wearer that undergoes the greatest deflection and deformation. However, in the present invention a void space can exist beneath the heel of a wearer and the ground engaging portion of the outsole. Some of the shock and vibration generated during the rearfoot impact of an outsole with the ground support surface must then travel a greater distance through the outsole and inferior spring element in order to be transmitted to the shoe upper and wearer. In addition, in the present invention, a posterior spacer which can serve as a shock and vibration isolator, and also vibration decay time modifiers can be used to decrease the magnitude of the shock and vibration transmitted to the wearer of an article of footwear.

There are many published examples of attempts to introduce functional spring elements into articles of footwear, but relatively few of these attempts have resulted in functional articles of footwear which have met with commercial success. The limitations of some of the prior art has concerned the difficulty of meeting the potentially competing criteria associated with cushioning and footwear stability. In other cases, the manufacturing costs of making prior art articles of footwear including spring elements have been prohibitive. Articles of footwear including discrete foam cushioning elements which have been commercialized include the Nike "SHOX," the Adidas "a3" which is believed to be taught in European Patent Application EP 1 240 838 A1, the Avia "ECS Cushioning" and Avia "ECS Stability," and also the Dada "SoleSonic Force."

The spring element and various other novel structures taught in the present invention can be used in a wide assortment of articles of footwear including but not limited to those used for running, walking, basketball, tennis, volleyball, cross-training, baseball, football, golf, soccer, cycling, sandals, hiking boots, and army boots. The present invention teaches an article of footwear which can provide a wearer with improved cushioning and stability, running economy, and an extended service life while reducing the risks of injury normally associated with footwear degradation. An article of footwear according to the present invention can provide a wearer with the ability to customize the fit, but also the physical and mechanical properties and performance of the article of footwear. Moreover, the article of footwear is economical and environmentally friendly to both manufacture and recycle.

The present invention also teaches articles of footwear including means for adjusting the provided foot shape, length, width, and girth. For example, spring elements, anterior outsole elements, stability elements, and uppers having different configurations, and also alternate positions for selectively affixing various portions of an upper can be used to adjust and customize the fit of an article of footwear for an individual wearer. The upper can also include elastic or elongation means for adjusting the width, girth, and foot shape. And three dimensional and/or circular knitting could possibly be used for making uppers. The components of the article of footwear possibly including but not limited to the upper, insole, means for cushioning, more simply recited herein as cushioning means, and a sole can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be configured and customized for a wearer or a select target population in order to optimize performance criteria, as desired.

Moreover, the present invention teaches a method of making articles of footwear, and way of doing both retail and Internet business. For example, the anatomical features, configuration, and dimensions of a given wearer's foot and any other special needs, requirements, or preferences can be recorded by direct communication, observation, and measurement in a retail or medical setting, or alternately, by a wearer or other individual within their home or other remote site, and this data can be used to generate information and intelligence relating to making a custom article of footwear. Conventional measuring or reproduction means such as rulers, measuring tapes, Brannock devices, two or three dimensional scanners, pressure sensors, infrared thermography, stereolithography, photographs, photocopies, FAX, e-mail, cameras, images, tracings, video, television, computers and computer screens, software, data storage and retrieval systems, templates, molds, models, and patterns can be used to help determine and make selections relating to an individual's foot shape, length, width, girth, and the like.

Teachings which have been published or that otherwise constitute public information regarding the conduct of Internet or retail business include the press release by Nike, Inc. dated Nov. 22, 1999 and the Internet website www.nike.com, and in particular, the section associated with the Nike iD program; the Internet website www.customatix.com; the Internet website www.adidas.com, and in particular, click on "products," then click on "mass customization," and see everything related to the "MI Adidas" initiative; the Internet website www.copycaps.com; the publication in the Oakland Tribune on Dec. 18, 1996 relating to the Internet Mall website; the publication "The Florsheim Shoe Company—Express Shop," Harvard Business School, Copyright 1988 by the President and Fellows of Harvard College; the publication "Custom Fit Footwear," from www.digitoe.com, 1984-Present, Digitoe, Inc.; the publication "6 Steps to Ordering Shoe Lasts & Footwear From Digitoe®," June, 1998, Digitoe, Inc.; the newspaper article "Nike Will Let Buyers Help Design Shoes," by Andy Dworkin in "The Oregonian," business section, Oct. 21, 1999; the article "NGAGE Digital Sizing System," Nike World Record, February-March, 1997; the article by Tim Wilson entitled "Custom Manufacturing— Nike Model Shows Web's Limitations," Internetweek; Manhasset; Dec. 6, 1999, Issue 792; and, the article "Customizing For the Masses," by Krysten A. Crawford, Forbes Magazine, Oct. 16, 2000, page 168.

Given the provision of an adequate and ready stock of the various components anticipated for use in making the custom articles of footwear, and the information and intelligence created from the data relating to an individual wearer or target population, a worker and/or automated system can assemble and make a customized article of footwear within five minutes. In fact, it is possible to assemble a custom article of footwear according to the present invention in less than one minute using a single fastener. This can be accomplished at the point of purchase or service center which can be located in a retail store, medical facility, or remote manufacturing environment. Accordingly, similar to the rapid delivery eyewear service centers and retail stores which presently exist, a customer can now also be provided with a custom article of footwear within minutes. Alternatively, if and when an individual's data is received from a remote site at the Website or other address of a company which practices the present invention, and transmitted to a manufacturing or assembly center, a custom article of footwear can be made and possibly delivered to an individual's home or other designated address by same day or overnight service, as desired. Further, an individual can purchase individual components for adding, changing, or renewing parts of a custom article of footwear. Moreover, a vending device can be used to obtain a custom article of footwear or select components thereof.

Figure 1:
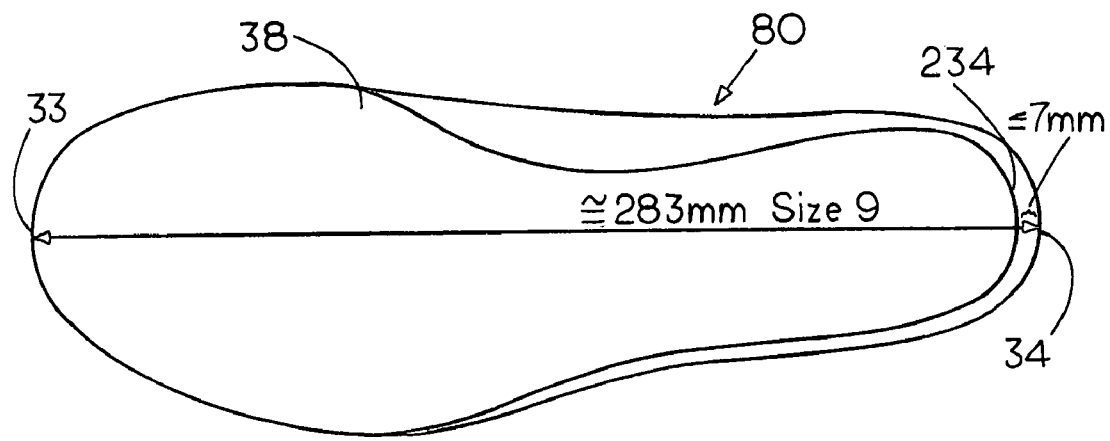
FIG. 1 is a bottom view of an embodiment of a last for an article of footwear.

FIG. 1 is a bottom view showing the inferior side 38 of an illustrative men's size 9 footwear last 80 which is generally similar to those lasts used by many companies in the athletic footwear industry. As shown, the last measures approximately 283 mm from the anterior side 33 to the posterior side 34. However, note that the bottom net 234 of this particular last 80 is about 2 mm posterior of the anterior side 33 of the last 80, and also about 7 mm anterior of the posterior side 34 of the last 80. The foregoing example and drawings of a footwear last are merely illustrative and not intended to limit the last configuration to any particular type and shape.

Figure 2:
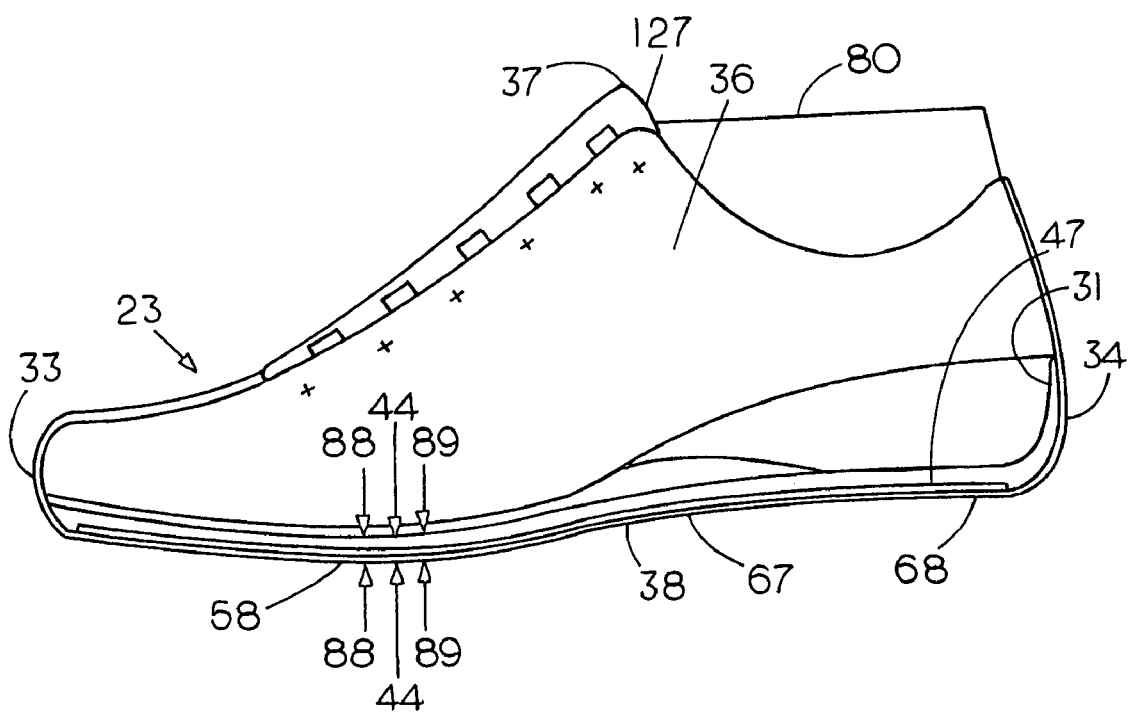
FIG. 2 is a lateral side and partial cross-sectional view showing an embodiment of a shoe upper mounted on the footwear last shown in FIG. 1, and also an insole, and superior spring element positioned within the shoe upper.

FIG. 2 is a lateral side 36 and partial cross-sectional view showing a shoe upper 23 mounted on the last 80 shown in FIG. 1, and also an insole 31, and superior spring element 47 positioned within the shoe upper 23. Most running and walking footwear lasts are configured so as to have the heel elevated 12 mm when properly treaded. The tread point 44 in the forefoot area 58 would then fall approximately between the position of the Medial Metatarsal-Phalangeal Joint 88 associated with the first or big toe, hereinafter MMPJ, and the Lateral Metatarsal-Phalangeal Joint 89 associated with the fifth or small toe, hereinafter LMPJ. The position of the MMPJ is normally located at about 69% of foot length, and the LMPJ is normally found at about 63% of foot length, that is, when measured from the back of the last 80. Given a last length of 283 mm, the MMPJ would then be located at about 195 mm, and the LMPJ at about 178 mm.

As shown, the insole 31 may be approximately 5 mm thick and can be made of a high quality EVA or polyurethane material such as PORON®. The insole 31 can provide conformance in the midfoot area 67 of the arches, but also extend behind and cup the rearfoot area 68. This can serve to protect the wearer's heel from impact with the heel counter 24. Moreover, the anterior-posterior load or impact to an individual's heel during running can be in the range of 1.25-1.75 body weights. This may contribute to injury and so proper cushioning of the wearer's heel can be beneficial. The examples and drawings of an insole provided are merely illustrative and not intended to limit the insole to any particular configuration or dimensions.

As shown, the superior spring element 47 may extend between a position approximately 5-10 mm posterior of the anterior side of the bottom net 234 of the last 80 in the forefoot area 58, and a position approximately consistent with the bottom net 234 of the last 80 in the rearfoot area 68. When made from a unidirectional carbon fiber composite material, the thickness of the superior spring element 47 may be in the range between 1.0-1.25 mm. However, it may be advantageous to make the superior spring element 47 of a less expensive unidirectional fiberglass material such as E or S glass having a thickness between 1.25-2.0 mm. Further, many customers who only intend to use the article of footwear for easy walking or running at a pace over 7:30 minutes/mile may possibly not want to use a superior spring element 47 having substantial spring characteristics. Instead, they could be provided with a thermoplastic moderator plate which resembles a removable lasting board 79. A moderator plate or lasting board 79 can serve to spread the loads being placed upon the midsole and outsole out over a greater area which can positively affect the cushioning characteristics and delay degradation of the sole 32, but also increase the exhibited stiffness found at the perimeter of the sole 32 thereby enhancing stability. See the discussion regarding the soft edge phenomenon associated with some athletic footwear in U.S. Pat. No. 5,921,004.

FIG. 3 is a bottom view showing the inferior side 38 of a shoe upper 23 and also the approximate position of an external heel counter 24 mounted on the last 80 shown in FIG. 1. The position of the weight bearing center of the heel 57 is indicated as being approximately 45 mm anterior of the posterior side 34 of the last 80. Notice the different relative positions of the posterior side of the bottom net 234 of the last 80, the posterior side of the last 80, the posterior side of the external heel counter 24, and also the posterior side of the posterior outsole element 46. Also indicated on the medial side 35 are positions associated with approximately 50%/142 mm, 55%/155 mm, 57.5%/162.5 mm, and 60%/169 mm of foot length/283 mm. Anticipating that the superior spring element 47 may not be inserted and used by some customers it can then be advantageous to hold back the anteriormost position of the heel counter 24 so that it would not project anterior of a point on the medial side 35 approximately 55%/155 mm of foot length and extending on a diagonal line parallel to that drawn between the MMPJ and LMPJ towards the lateral side to a point that is approximately consistent with 50%/142 mm of foot length. This can provide enough clearance for deflection of the ball of a wearer's foot relative to the sole 32 without introducing the possibly that their foot could impact or be impinged upon the leading edge of the heel counter 24. Also shown are portions of the exoskeleton 235 including mechanical means for attaching the anterior outsole element 44.

FIG. 4 is a lateral side 36 view showing an exoskeleton 235 made of a plastic material in place on the mounted shoe upper 23. The exoskeleton 235 may include a heel counter channel 194 for accommodating the edges of the heel counter 24, and also a male projection 236 at the back of the rearfoot area 68 for mating or mechanically interlocking with the external heel counter 24. As a result, there can be a positive mechanical connection between the shoe upper 23 and external heel counter 24 which provides stability and also makes for a clean looking product. The exoskeleton 235 may include a toe counter 183, and in particular, mechanical means for being affixed and secured to a complementary anterior outsole element 44. Flex notches 71 may be provided in the exoskeleton 235 in the forefoot area 58 consistent with the position of the MMPJ 80 and LMPJ 89 and line of flexion 104 generally consistent with the MPJs, and possible flex groove 200, and also another set of flex notches 71 corresponding to an anterior line of flexion, and possible flex groove 199.

Figure 5:
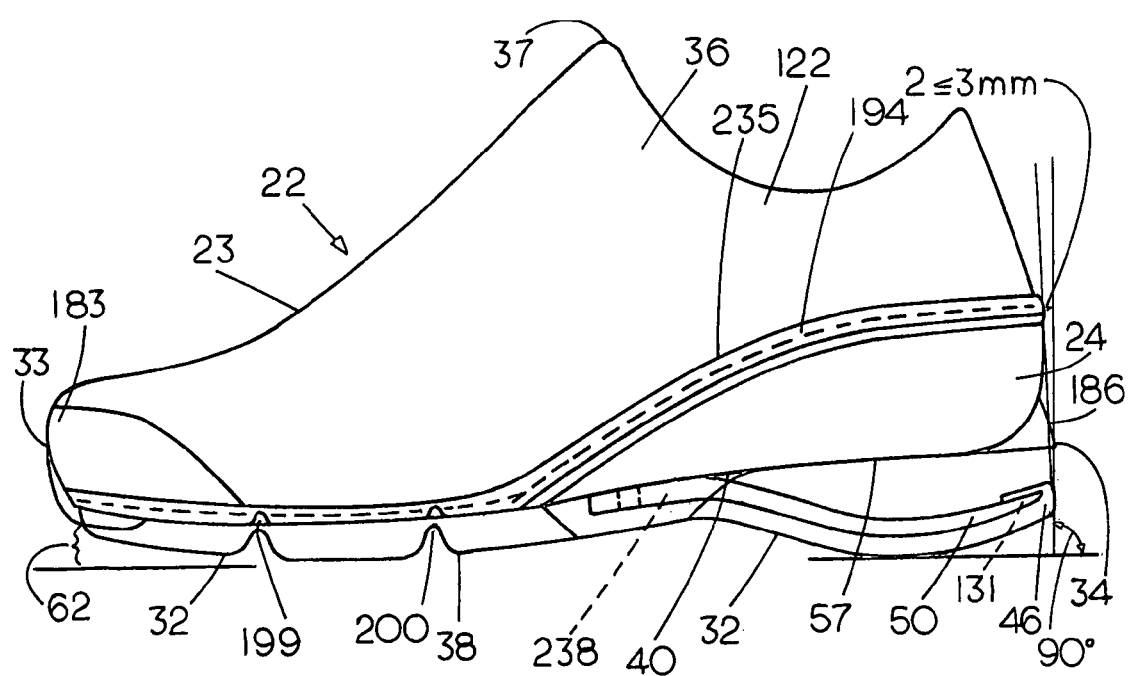
FIG. 5 is a lateral side view showing an embodiment including the external heel counter, inferior spring element, anterior outsole element and posterior outsole element secured to the shoe upper including the exoskeleton shown in FIG. 4.
Figure 24:
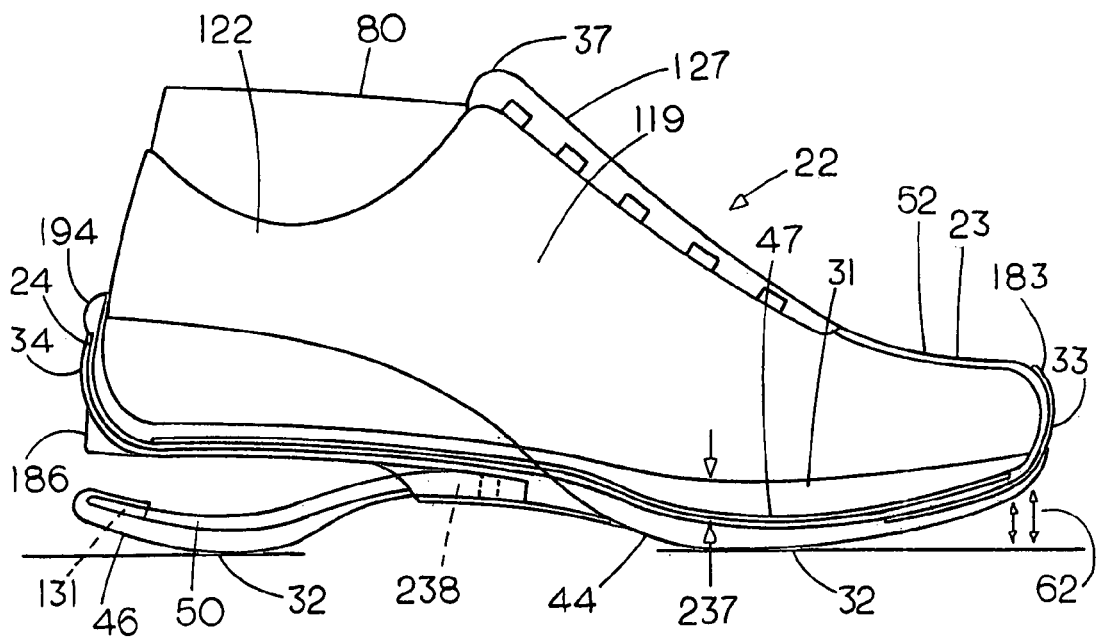
FIG. 24 is a lateral side and partial cross-sectional view of an alternate article of footwear having the bottom net last configuration shown in FIGS. 22-23.

FIG. 5 is a lateral side 36 view of an article of footwear 22 showing the external heel counter 24, inferior spring element 50, anterior outsole element 44 and posterior outsole element 46 secured to the shoe upper 23 including the exoskeleton 235 shown in FIG. 4. The heel counter 24 may extend for at least thirty percent of the length of the shoe upper 23. As shown in FIG. 5, the heel counter 24 extends approximately fifty percent of the length of the shoe upper 23, but alternatively the heel counter 24 may extend in the range approximately between 30-60 percent of the length of the shoe upper 23. As shown, the inferior spring element 50 can deflect at least 10 mm before engaging the bump stop 186 located at the posterior side of the external heel counter 24, and the posterior side of the shoe upper 23 is slightly anterior of the posterior side of the bump stop 186 and posterior outsole element 46. For an average runner having a body weight of approximately 160 pounds, it can be advantageous that the article of footwear 22 including an insole 31, inferior spring element 50, and posterior outsole element 46 provide deflection in the range between 10-20 mm, and that the inferior spring element 50 provide at least approximately 10-12 mm of deflection. The footwear last 80 shown in FIGS. 1-4 also provides for approximately 10 mm of toe spring 62 in the article of footwear 22 shown in FIG. 5, and this represents the minimum amount of toe spring 62 normally required for walking and running applications. A discussion of toe spring can be found in the book entitled "Distance Running," by Robert M. Lyden, Chapter 9: Injuries and Athletic Shoes," and in particular, see "Toe Spring," pages 292-293, and "Straight Versus Curved Lasts," pages 296-297. Further, see the discussion of human anatomy, biomechanics and toe spring provided in U.S. Pat. No. 5,384,973. In brief, the faster that an individual having both sound structure and biomechanics runs, then the more there is a tendency for the strike index, loading, and duration of the ground support phase to move anterior from the rearfoot area into the midfoot and forefoot. As a result, shoes which are intended for long slow distance work are often relatively straight lasted and include little toe spring. However, shoes which are intended for road racing can be more curve lasted and include greater toe spring, and track spikes intended for the sprint events can have even more. Accordingly, the question of "how much toe spring" depends upon the selected activity and specific application. Anticipating that customers would probably use a custom article of footwear for a wide range of activities and different running speeds, it may be advantageous to alternatively use a last which would provide toe spring 62 in the range of 15-25 mm, as shown in FIG. 24.

FIG. 6 is a medial side 35 view of the article of footwear 22 shown in FIG. 5. Notice the asymmetry and difference in the length of the external heel counter 24 and inferior spring element 50 on the medial side 35 versus the lateral side 36. The shorter lever arm effectively provided on the medial side 35 can have the practical effect of making that side in the range between 1-2.5 times more stiff than the lateral side 36 when the article of footwear 22 is being loaded during running. This can enable the article of footwear 22 to exhibit superior rearfoot stability as concerns pronation relative to conventional athletic footwear.

Figure 7:
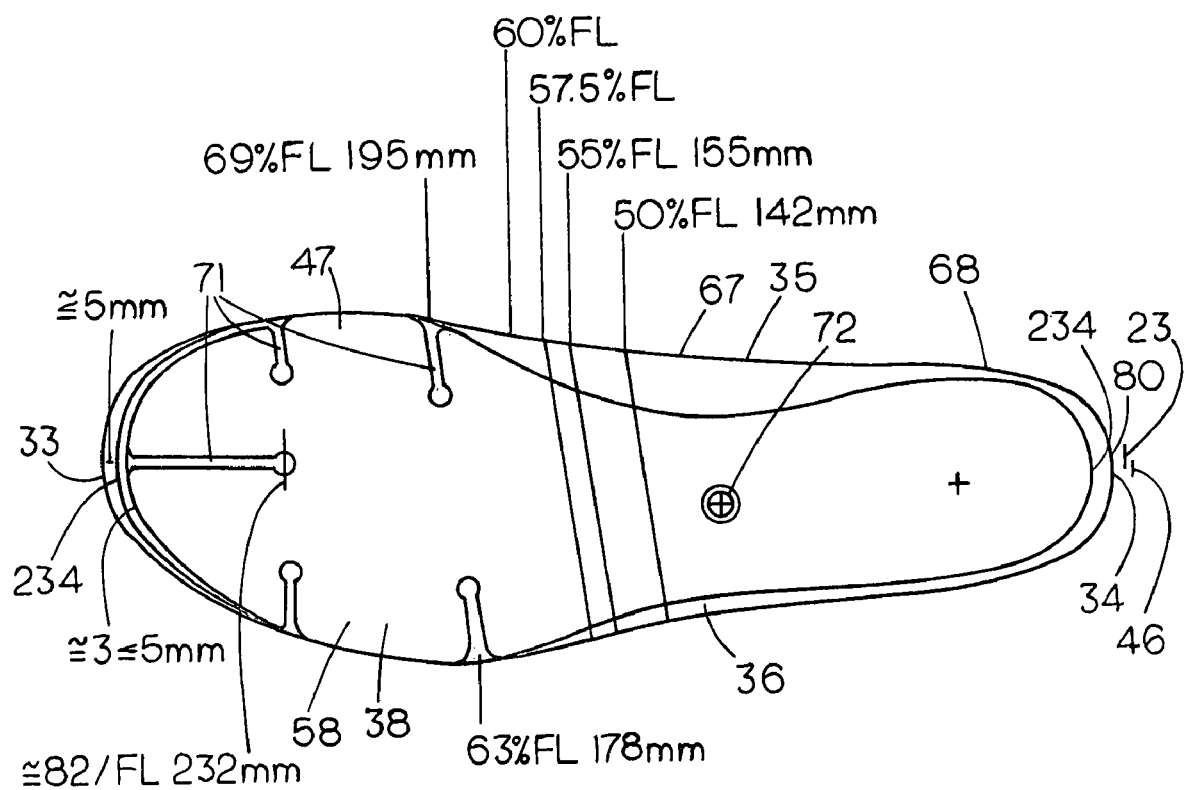
FIG. 7 is a bottom view showing an embodiment of a superior spring element.

FIG. 7 is a bottom view showing the inferior side 38 of a superior spring element 47 that can extend from a position consistent with the posterior side of the bottom net 234 of the last 80 to a position approximately 5 mm posterior of the anterior side of the bottom net 234 of the last 80. This may help to accommodate for the effective shortening of the upper 23 when the forefoot area 58 is being substantially flexed about the metatarsal-phalangeal joints. Alternatively, the shoe upper 23 can be made sufficiently resilient or otherwise capable of withstanding frequent elongation and recovery. Further, the position of one longitudinal flex notch 71 and two pairs of lateral flex notches 71 are shown, that is, if and when the inclusion of such in the superior spring element 47 would be deemed possibly advantageous for use in a particular footwear application. A superior spring element 47 made of fiberglass or carbon fiber material in a uniform construction and without the presence of flex notches will normally be a somewhat stiffer on the medial side 35 relative to the lateral side 36 when bending is attempted along a transverse axis consistent with the metatarsal-phalangeal joints. Also shown is an opening 72 for accommodating a fastener 29.

Figure 8:
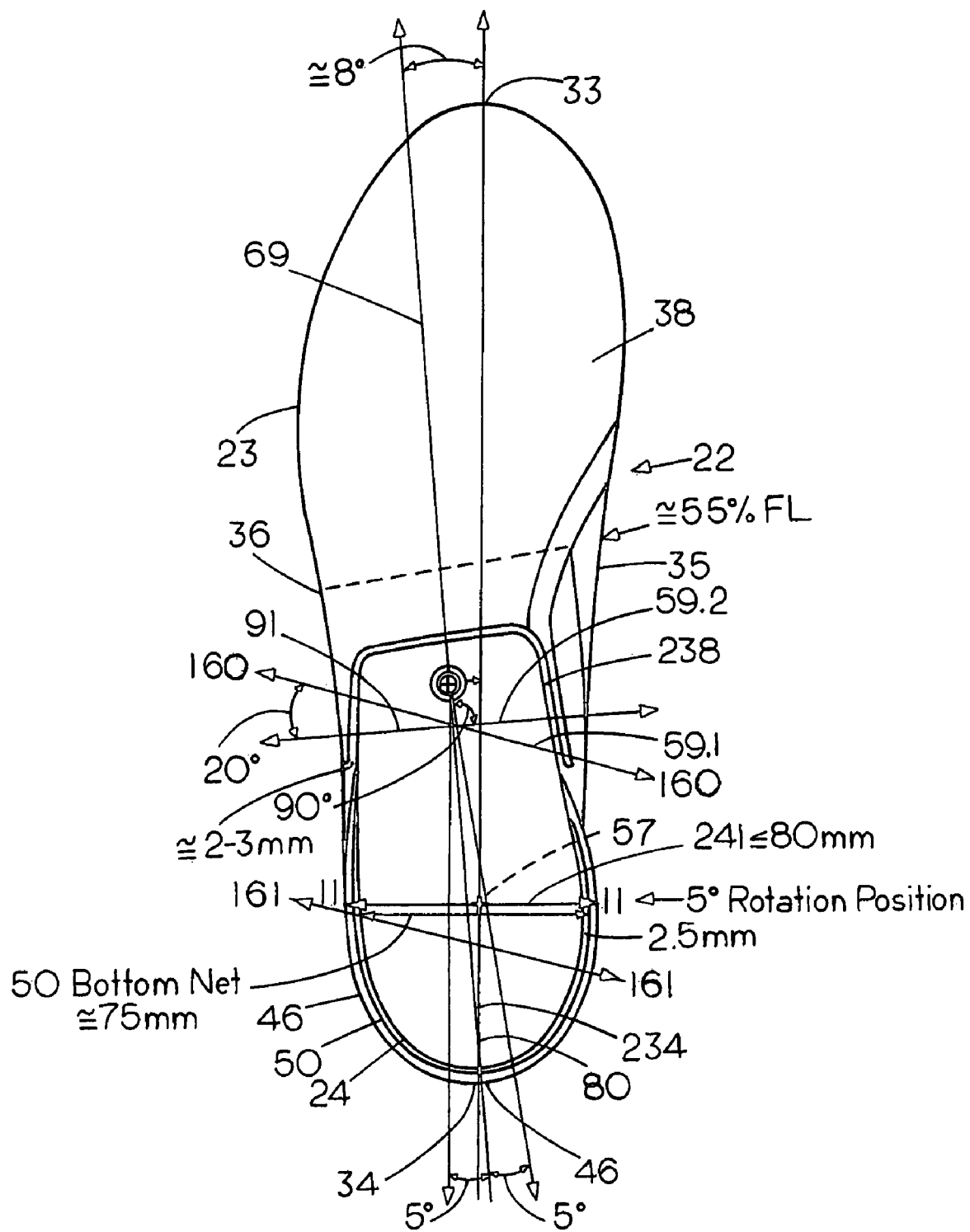
FIG. 8 is a bottom view showing the configuration and position of an embodiment of an inferior spring element relative to the last and shoe upper.

FIG. 8 is a bottom view showing the inferior side 38 of an article of footwear 22, and in particular, the dimensions and position of the inferior spring element 50 relative to the last 80 and shoe upper 23. As shown, the longitudinal axis 69 of the inferior spring element 50 is consistent with a line approximately bisecting the rearfoot 68 and midfoot 67 portions of the bottom net 234 of the last 80, and a transverse axis 91 is one that is perpendicular to the longitudinal axis 69. Given the curvature of this particular last 80, the longitudinal axis 69 of the inferior spring element 50 is deviated approximately 8 degrees from a line drawn from the anterior end 33 to the posterior end 34 of the last consistent with its overall maximum length measurement. As shown, the inferior spring element 50 is approximately 130 mm in length and has a maximum width of approximately 75 mm in the area generally underlying the weight bearing center of a wearer's heel 57. In this embodiment, the anterior tangent point 160 is consistent with flexural axis 59.1, and also the posterior tangent point 161 associated with curvature of the inferior spring element 50 are deviated approximately 20 degrees from a transverse axis 91, that is, a line drawn perpendicular to the longitudinal axis 69. In an alternative embodiment, the anterior tangent point 160 could be consistent with flexural axis 59.2 and the transverse axis 91, and the posterior tangent point 161 could also be consistent with the transverse axis 91, or other orientation. Further, the practical effect of rotating the orientation of the inferior spring element 50 less than or equal to approximately 5 degrees towards the medial side 35 or lateral side 36 is shown to result in an approximately 3-5 mm or something less than one quarter inch change in the position of the inferior spring element 50 in the area generally underlying the weight bearing center of the wearer's heel 57. However, this amount of variation can be associated with significant differences in the actual and perceived stability of an article of footwear for individual's having different walking and running techniques, and can therefore accommodate for a wide range of potential wearer's who would be classified as being supinators, neutral, and pronators. As shown, approximately 2-3 mm of clearance is required to accommodate for rotation of the inferior spring element 50 relative to the pocket 238 associated with the external heel counter 24. Alternatively, it can be advantageous for the pocket 238 affixed to the external heel counter 24 to be made of a resilient elastomeric material which is capable of such deformation as to accommodate the desired variations. The practical effect of rotating the inferior spring element 50 is somewhat like having the ability to change the shape and curvature of a footwear last in that the configuration and performance of the resulting article of footwear can be substantially adapted for providing a custom article of footwear. Shown are the posterior side of the bottom net 234 of the last 80, the posterior side of the last 80, the posterior side of the heel counter 24, the posterior side of the inferior spring element 50, and also the posterior side of the posterior outsole element 46. The presence of approximately 2.5 mm of the posterior outsole element 46 on both sides of the inferior spring element 50, that is, when these components are secured in functional relation, then results in an outsole net 241 having a width of approximately 80 mm in the area generally underlying the weight bearing center of a wearer's heel 57.

Figure 9:
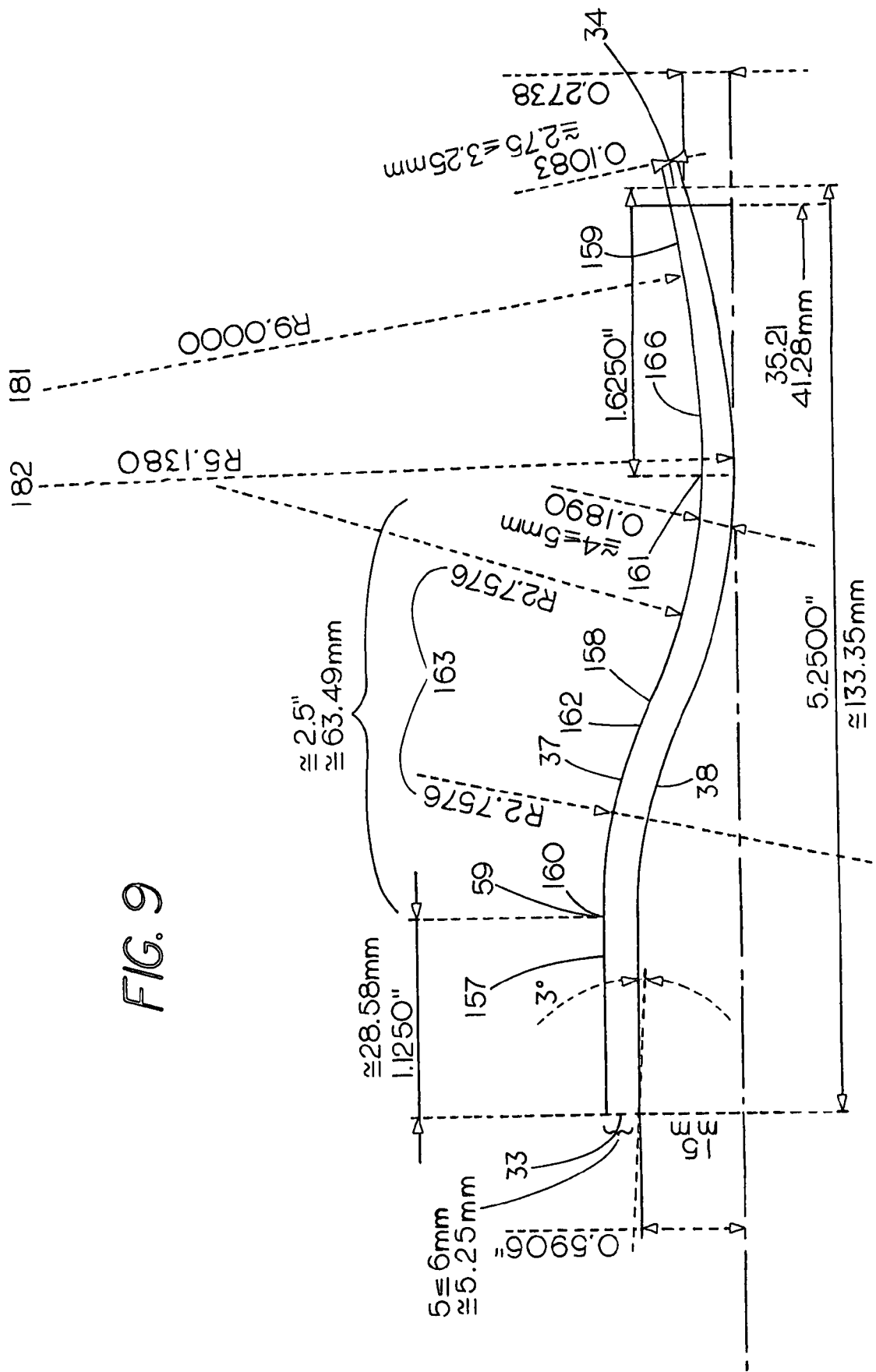
FIG. 9 is a side view drawing of the embodiment of an inferior spring element shown in FIG. 8.

FIG. 9 is a lateral side 36 view two dimensional engineering drawing of the inferior spring element 50 shown in FIG. 8. Shown are the major dimensions of the component in both inch and millimeter units of measurement, and also the various radius of curvature of the component. The overall longitudinal length of the inferior spring element 50 is 130 mm. The approximate length of the anterior portion 157 of the inferior spring element 50 between the anterior side 33 of the inferior spring element 50 and the anterior tangent point 160 is 28.58 mm. Between the anterior tangent point 160 and the posterior tangent point 161 the approximate length of the middle portion 158 of the inferior spring element 50 is 63.49 mm. The approximate length of the inferior spring element 50 between the posterior tangent point 161 and the posterior side 34 of the inferior spring element 50 is in the range between 35.21-41.28 mm. The latter measurement and range can directly affect the configuration of the inferior spring element 50, and in particular, how much heel spring and curvature is present at the posterior side 34. The anterior portion 157 of the inferior spring element 150 may be 5.25 mm thick in order to accommodate wearers having a body weight approximately between 100-225 pounds. It may be advantageous for durability reasons to not significantly reduce the thickness of the inferior spring element 50 in the area anterior of the first indication of radius "R2.7556." The inferior spring element 50 may be tapered and reduced in thickness towards the posterior side 34 where for the sake of robustness the minimum thickness can be held in the range of 2.75-3.25 mm. In FIG. 9, the particular inferior spring element 50 shown would possibly be suitable for individuals having a body weight between 150-200 pounds depending upon their biomechanics, running technique and running speed. As shown in FIG. 9, between the anterior tangent point 160 and posterior tangent point 161 the radius of curvature may be calculated using the top side of the component as a guide to produce the most symmetrical curvature possible given the relative positions of the anterior and posterior tangent points in three dimensional space, that is, a fitted radius of curvature 163. The examples and drawings of an inferior spring element provided are merely illustrative and not intended to limit the inferior spring element to any particular configuration or dimensions.

FIG. 10 is a bottom view showing the inferior side 38 of an inferior spring element 50 showing the longitudinal axis 69, and also the transverse axis 91 and flexural axis 59.1 deviated at approximately 20 degrees from the transverse axis 91, that is, a line drawn perpendicular to the longitudinal axis 69. The anterior tangent point 160 and posterior tangent point 161 which are both associated with the curvature of the inferior spring element 50 are also shown deviated at approximately 20 degrees. In an alternative embodiment, the flexural axis 59.2 could be consistent with the transverse axis 91, and the anterior tangent point 160 and posterior tangent point 161 could also be consistent with the transverse axis 91, or other orientation. Again, the examples and drawings of an inferior spring element provided are merely illustrative and not intended to limit the inferior spring element to any particular configuration or dimensions.

As shown in FIG. 10, the overall longitudinal length of the inferior spring element 50 can be 130 mm. The approximate length of the anterior portion 157 of the inferior spring element 50 between the anterior side 33 of the inferior spring element 50 and the anterior tangent point 160 can be 28.58 mm. Between the anterior tangent point 160 and the posterior tangent point 161 the approximate length of the middle portion 158 of the inferior spring element 50 can be 63.49 mm. The approximate length of the inferior spring element 50 between the posterior tangent point 161 and the posterior side 34 of the inferior spring element 50 can be in the range between 35.21-41.28 mm.

FIG. 11 is a bottom view showing the inferior side 38 of the inferior spring element 50 shown in FIG. 10 including a posterior outsole element 46 affixed thereto. Again, the width of the outsole net 241 can be approximately 80 mm in the area adjacent to the approximate position of the weight bearing center of a wearer's heel 57. This drawing figure does not include cosmetic or other possible functional design aspects associated with the posterior outsole element 46.

FIG. 12 is a side cross-sectional view of a spacer or wear prevention insert 130 for use with the superior spring element 47 or heel counter 24. The wear prevention insert 130 can serve to protect the glass, carbon fiber, thermoplastic, or glass filled thermoplastic part(s), and depending upon its desired characteristics can be made of metal such as aluminum or stainless steel, or a plastic material. In particular, the spacer or wear prevention insert 130 can be made to serve as a lock washer.

FIG. 13 is a side cross-sectional view of a heel counter insert 239 for use with the external heel counter 24. As shown, the thickness of the external heel counter 24 can be approximately 3 mm in the area about the heel counter insert 239. The heel counter insert 239 can be inserted into an injection mold and then be substantially encapsulated by a glass filled thermoplastic material forming the heel counter 24. The heel counter insert 239 can include a plurality of splines 167 on its inferior side 38 for accommodating rotation of the inferior spring element 50 relative to the external heel counter 24 at increments which are less than or equal to 5 degrees.

FIG. 14 is a side cross-sectional view of an inferior spring element insert 240 for use with an inferior spring element 50. As shown, the thickness of the inferior spring element 50 can be approximately 5.25 mm in the area about the inferior spring element insert 240. It is possible that the inferior spring element insert 240 can be inserted into an injection or compression mold and then be substantially encapsulated by a carbon fiber composite material. In this case, the inferior spring element insert 240 may be made as a one-part component. As shown, the inferior spring element insert 240 can alternatively be made as a two-part component including male 85 and female parts 86. This can facilitate fitting the component in functional relation to the carbon fiber composite material and mold during the manufacturing process. The inferior spring element insert 240 can include a plurality of splines 167 on its superior side 37 for accommodating rotation of the inferior spring element 50 relative to the external heel counter 24 at increments which are less than or equal to 5 degrees.

FIG. 15 is a top view of the inferior spring element insert 240 showing a plurality of splines 167 which can enable incremental changes in the relative position of the inferior spring element 50 and external heel counter 24 which are less than or equal to 5 degrees. A bottom view of the heel counter insert 240 can have substantially the same appearance, but the male portions 85 and female portions 86 of the splines 167 are then offset by the desired increment and amount less than or equal to 5 degrees.

FIG. 16 is a top view showing the superior side 37 of the male part 85 of fastener 29. The diameter "A" may be in the range between 0.75 (¾ths)-0.8710 (⅞ths) inches. For information purposes: 20 mm equals 0.787 inch; 21 mm equals 0.8265 inch; and 22 mm equals 0.8660 inch. The head 65 of the male fastener 29 can include a slot 169 for receiving a screwdriver and also another receptacle 169 for receiving an alternative tool such as a star drive or Allen wrench, and so on. The slot 169 can also be made wide enough to receive a penny having a thickness of about 1.5 mm; a quarter having a thickness of about 1.76 mm; a nickel having a thickness of about 1.93 mm; or a Euro having a thickness about 2.4 mm. The size of the Allen drive receptacle 168 can be approximately 3/16 inch or 5 mm.

FIG. 17 is a side view of the male part 85 of the fastener 29. The head 65 can have a thickness in the range between 2-2.25 mm and for the sake of robustness it can be advantageous for it to include a tapered and reinforced shoulder 242 where it merges with the shaft 245. The length of the shaft 245 can be less than or equal to approximately 10 mm, and the width of the shaft 245 can be approximately 5/16 inch or the metric equivalent. The threads 246 can be coated with a material which serves to prevent the male part 85 of the fastener 29 from becoming loose during use.

FIG. 18 is a side view of the female part 86 of the fastener 29. The head 65 can include a first flange 243 having a thickness in the range between 2-2.5 mm for bearing upon the inferior spring element 50 and for the sake of robustness it can be advantageous for it to include a tapered and reinforced shoulder 242 where it merges with the threaded column 246. Further, the head 65 can include a second flange 244 for bearing upon the backing portions 30 of the posterior outsole element 46, anterior outsole element 44, and heel counter pocket 238. Accordingly, substantially all of the major components of the article of footwear can be secured in functional relation. The length of the threaded opening 72 can be less than or equal to approximately 10 mm, and the width of the threaded opening 72 can be made so as to accommodate a male part 85 having a diameter of 5/16 inch or the metric equivalent. Again, the threads 246 can be coated with a material which serves to prevent the male part 85 of the fastener 29 from becoming loose during use. The product trademark indicia 171 can be present and visible on the bottom side of the female part 86 of the fastener 29.

FIG. 19 is a front view showing the anterior side 33 of the article of footwear 22 shown in FIGS. 5 and 6.

FIG. 20 is a rear view showing the posterior side 34 of the article of footwear 22 shown in FIGS. 5, 6 and 19. As shown, the inferior spring element 50 and posterior outsole element 46 are asymmetrical between the medial side 35 and lateral side 36. In particular, these components exhibit greater curvature about the lateral posterior side than on the medial posterior side. This configuration may serve to accommodate the wearer's anatomy and biomechanics at footstrike and guide the foot towards a neutral position during the early braking portion of the ground support phase.

Figure 21:
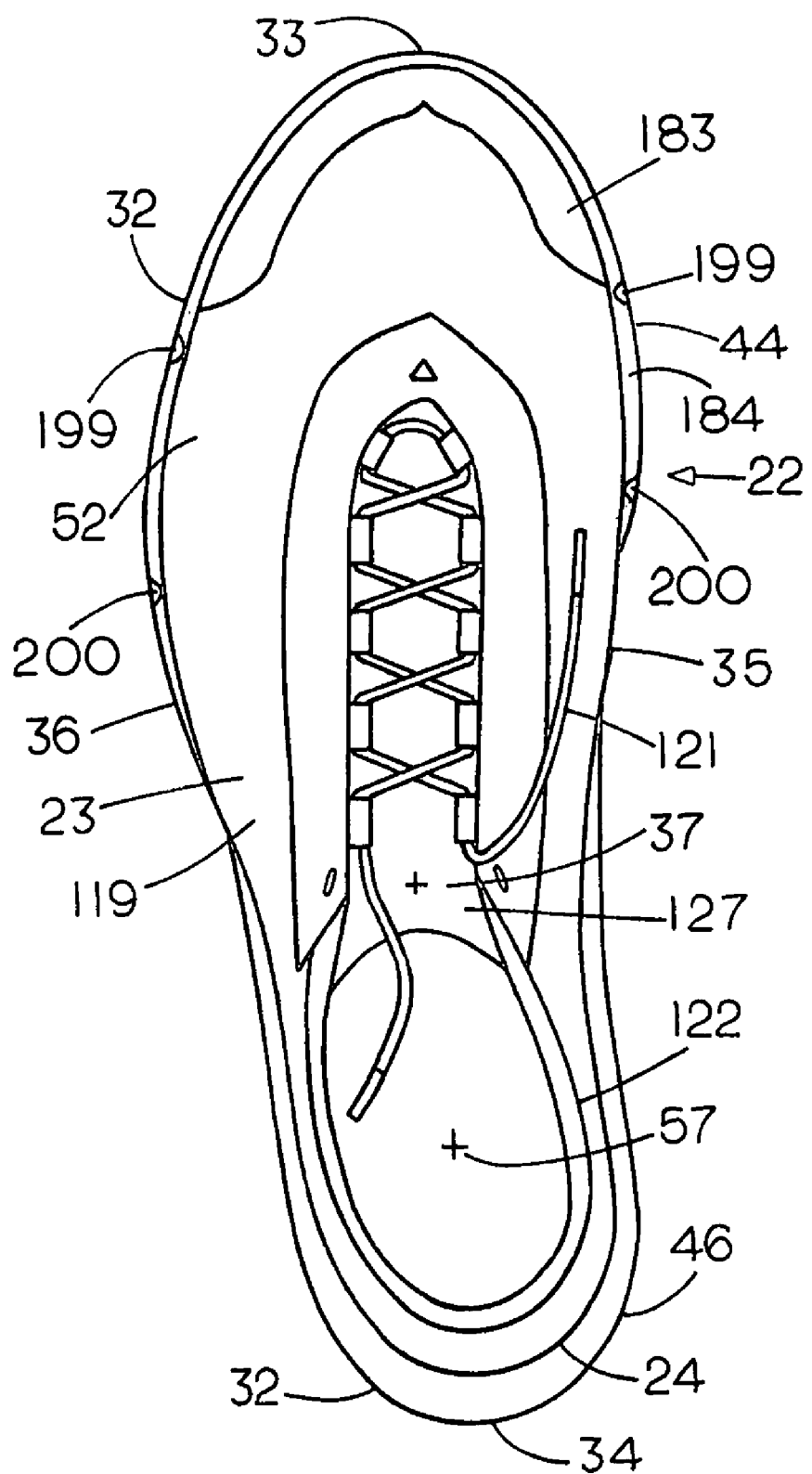
FIG. 21 is a top view of the embodiment of an article of footwear shown in FIGS. 5, 6, 19 and 20.

FIG. 21 is a top view showing the superior side 37 of the article of footwear 22 shown in FIGS. 5, 6, 19 and 20. This drawing figure does not include cosmetic and other functional aspects with respect to the design of the upper 23.

Figure 22:
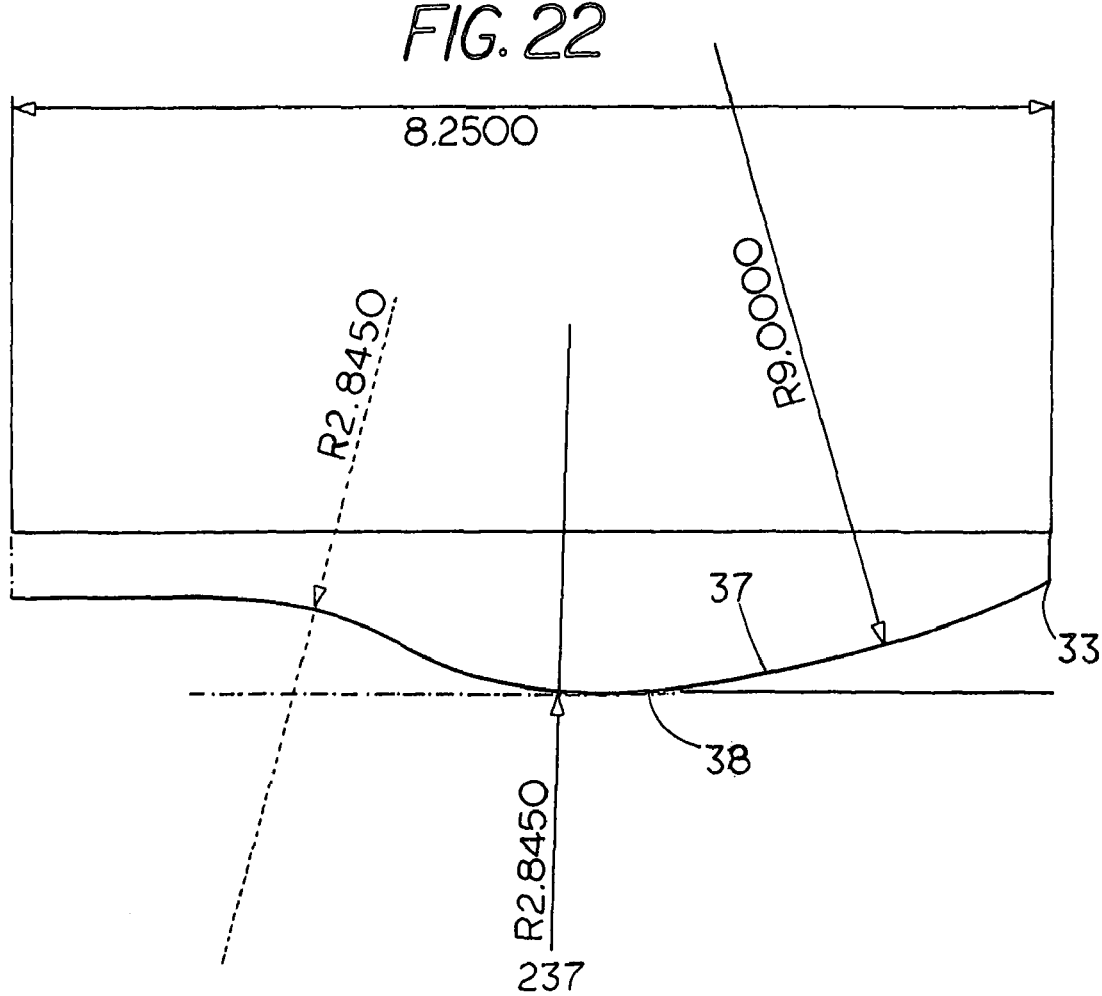
FIG. 22 is a side view drawing showing an alternate configuration of the forefoot area of an alternative footwear last, and also that of a possible corresponding superior spring element.

FIG. 22 is a side view two dimensional engineering drawing showing an alternative configuration of the forefoot area 58 of an alternative footwear last 80, and also that of a possible corresponding superior spring element 47. This configuration may be advantageous for making an overlasted shoe upper 23 whereby a insole 31 and/or midsole having greater thickness in the forefoot area 58 than what is shown in FIG. 2 can be used within an article of footwear 22. In some footwear categories and applications, this alternative configuration may be advantageous for use. For example, this configuration can be used in basketball shoes in order to provide maximum protection and cushioning to the wearer and also enhance the mechanical advantage and stability characteristics imparted by the superior spring element 47.

Figure 23:
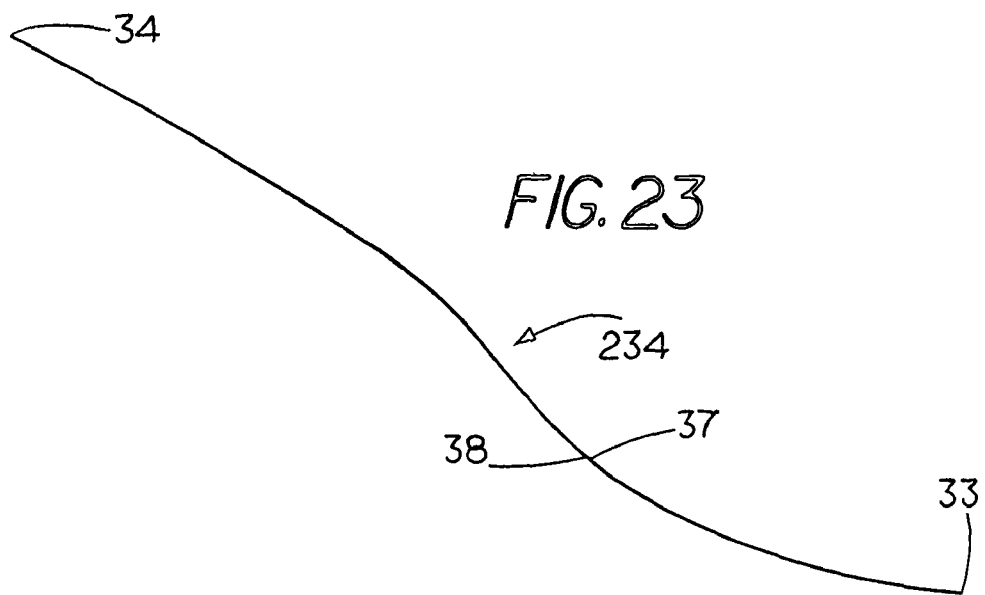
FIG. 23 is a side view drawing similar to FIG. 22, but showing the entire length of the configuration of an alternative embodiment of a superior spring element which is consistent with the bottom net of the alternate footwear last.

FIG. 23 is a side view drawing similar to FIG. 22, but showing the entire length of the configuration which is consistent with the bottom net 234 of an alternative footwear last 80.

FIG. 24 is a lateral side 36 and partial cross-sectional view showing an alternative article of footwear 22 including the bottom net 234 and last 80 configuration shown in FIGS. 22-23. The insole 31 and/or midsole can then be substantially contained inside of the shoe upper 23 and the anterior outsole element 44 can be affixed closer to the shoe upper 23. As shown, this configuration can also provide between 15-20 mm of toe spring.

Figure 25:
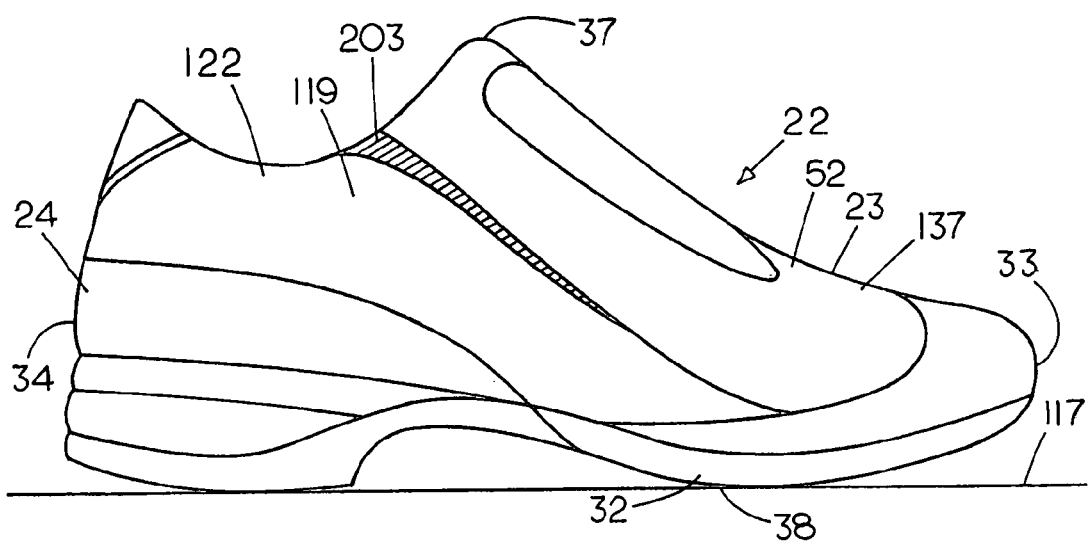
FIG. 25 is a lateral side view of an embodiment of a women's walking and aerobic shoe having an elastic closure system.

FIG. 25 is a lateral side 36 view showing a concept women's walking and aerobic shoe having a closure system including elastic 203.

Figure 26:
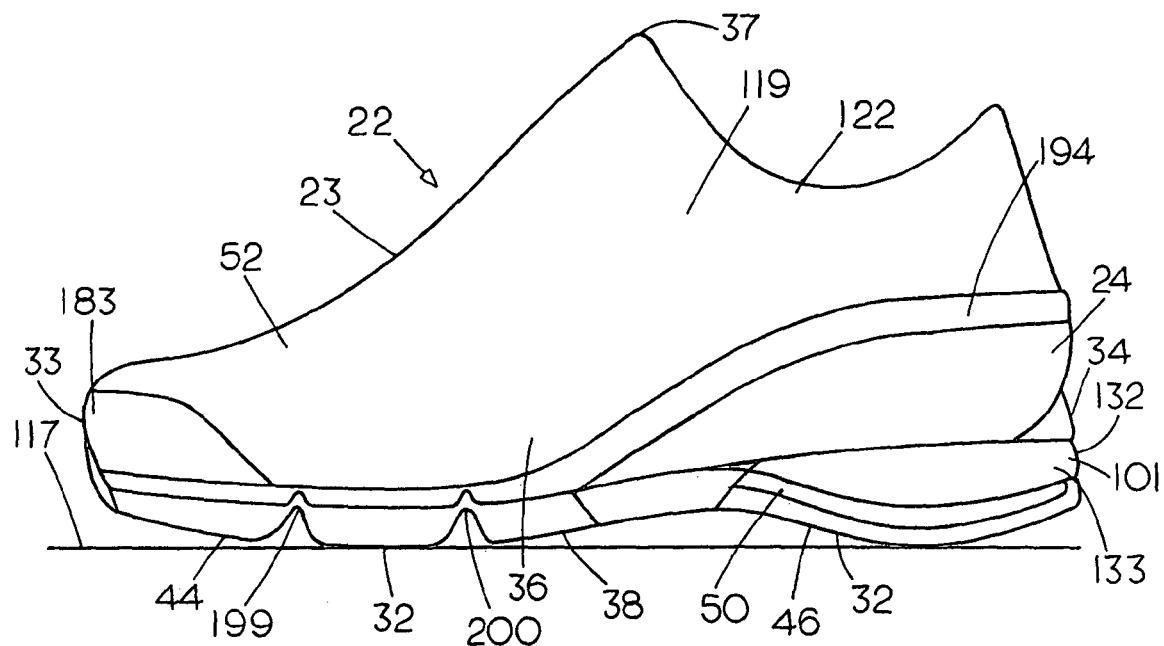
FIG. 26 is a medial side view of an embodiment of an article of footwear similar to that shown in FIG. 5 having a fluid-filled bladder positioned substantially between the inferior spring element and external heel counter.

FIG. 26 is a medial side 35 view showing an article of footwear 22 similar to that shown in FIG. 5 including a fluid-filled bladder 101 positioned substantially between the inferior spring element 50 and external heel counter 24. The bladder 101 includes a wall 132 and at least one chamber 133 which can include a gas and/or liquid matter.

Figure 27:
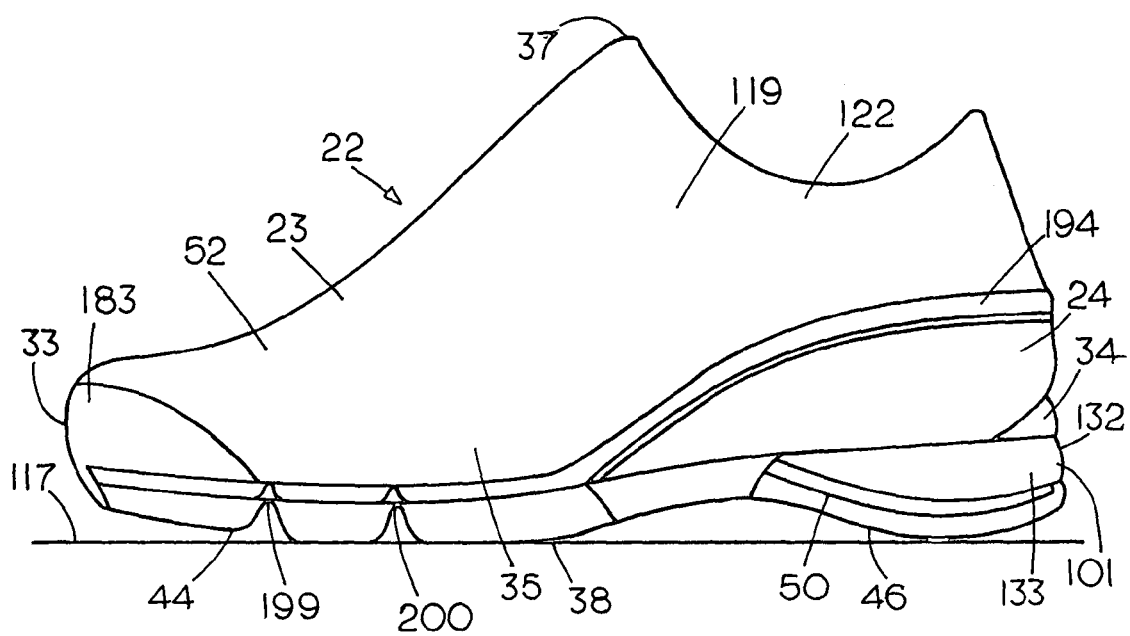
FIG. 27 is a lateral side view of an embodiment of an article of footwear similar to that shown in FIG. 5 having a fluid-filled bladder positioned substantially between the inferior spring element and external heel counter.

FIG. 27 is a lateral side 36 view of the article of footwear shown in FIG. 5 including a fluid-filled bladder 101 positioned substantially between the inferior spring element 50 and external heel counter 24.

Figure 28:
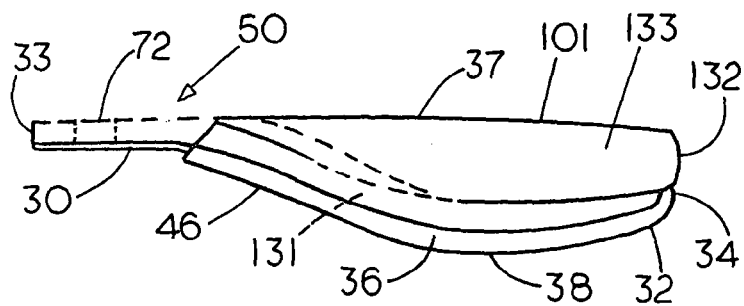
FIG. 28 is a lateral side view of the fluid-filled bladder shown in FIG. 26 for possible use between an inferior spring element and external heel counter.

FIG. 28 is a lateral side 36 view of the fluid-filled bladder 101 shown in FIG. 26 for possible use between the inferior spring element 50 and external heel counter 24. Again, the inferior spring element 50 may be inserted into a pocket 131 in the posterior outsole element 46. The fluid-filled bladder 101 may be permanently affixed to the posterior outsole element 46 and/or inferior spring element 50, or be removable and replaceable. The bladder 101 may be made of a blow molded thermoplastic polyurethane material and have a thickness of 20-30 mils. The posterior outsole element 46 may be 5-6 mm in thickness, and be affixed to a relatively thin plastic backing 30 having a thickness which may be between 0.75-1.5 mm. The backing 30 may extend to the anterior side 33 of the inferior spring element 50 and include an opening 72 for being secured with the fastener 29. In this regard, the backing 30 may then extend on the inferior side 38 of the inferior spring element 50 and/or the superior side 37. The bladder 101 may be affixed in functional relation to the posterior outsole element 46 and/or backing 30 by adhesive or mechanical means. For example, the bladder 101 may include a thin layer of plastic film anteriorly to the front of the inferior spring element 50 and include an opening 72 for being secured with the fastener 29. In addition, or alternatively, the bladder 101 may be cupped about a portion of its perimeter or otherwise contained by an extension of the backing 101 and/or posterior outsole element 46.

Figure 29:
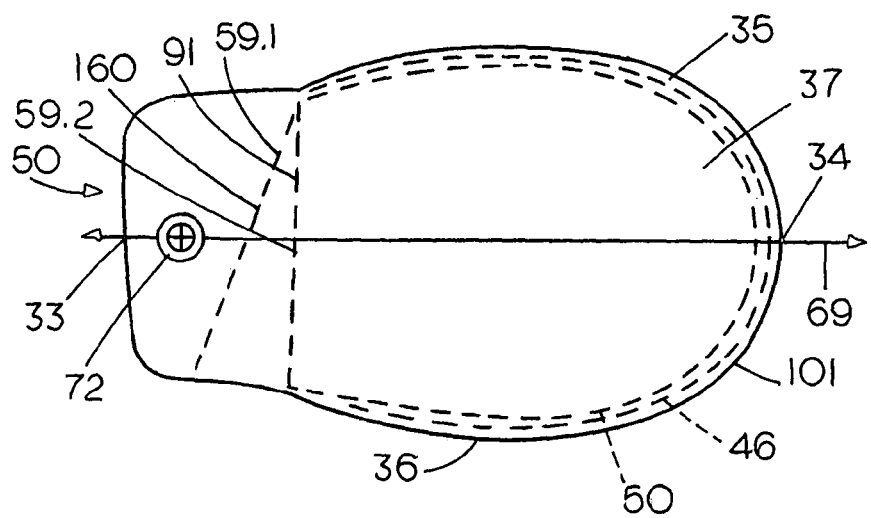
FIG. 29 is a top view of an embodiment of an inferior spring element including a posterior outsole element and bladder.

FIG. 29 is a top view showing the superior side 37 of an inferior spring element 50 including a posterior outsole element 46 and bladder 101. It may be advantageous for the side portion of the bladder 101 to not extend more than a few millimeters beyond the perimeter defined by the bottom net of the posterior outsole element 46 when it is fully loaded during use. Shown is the longitudinal axis 69, transverse axis 91, and flexural axis 59.1 which is deviated 20 degrees from the transverse axis 91. Also shown, is an alternative flexural axis 59.2 which is consistent with the transverse axis 91.

Figure 30:
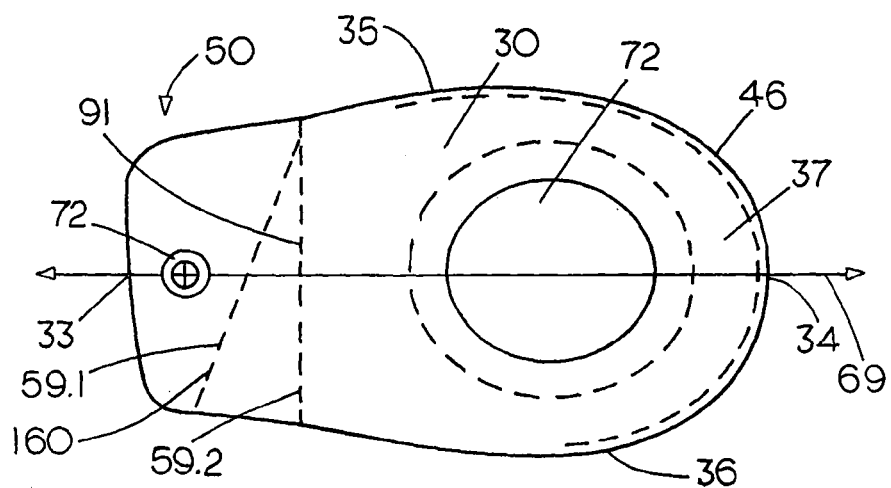
FIG. 30 is a top view of an embodiment of an inferior spring element including a posterior outsole element.

FIG. 30 is a top view showing the superior side 37 of an inferior spring element 50 including a posterior outsole element 46 having a thin backing 30 on the superior side 37. As shown, the backing 30 may include an opening 72 for receiving a cushioning insert 247 including additional means for cushioning, or more simply recited herein, cushioning means. For example, the cushioning insert 247 can consist of a foam cushioning element 135 and/or a fluid-filled bladder 101. The cushioning insert 247 can be permanently affixed in functional relation to the posterior outsole element 46 or inferior spring element 50, or alternatively be removable and replaceable. The use of a removable cushioning insert 247 can provide a wearer with a further ability to customize the structure, function and performance of the article of footwear 22. Shown are the longitudinal axis 69, transverse axis 91, and flexural axis 59.1 which is shown deviated 20 degrees from the transverse axis 91. Also shown, is an alternative flexural axis 59.2 which is consistent with the transverse axis 91.

Figure 31:
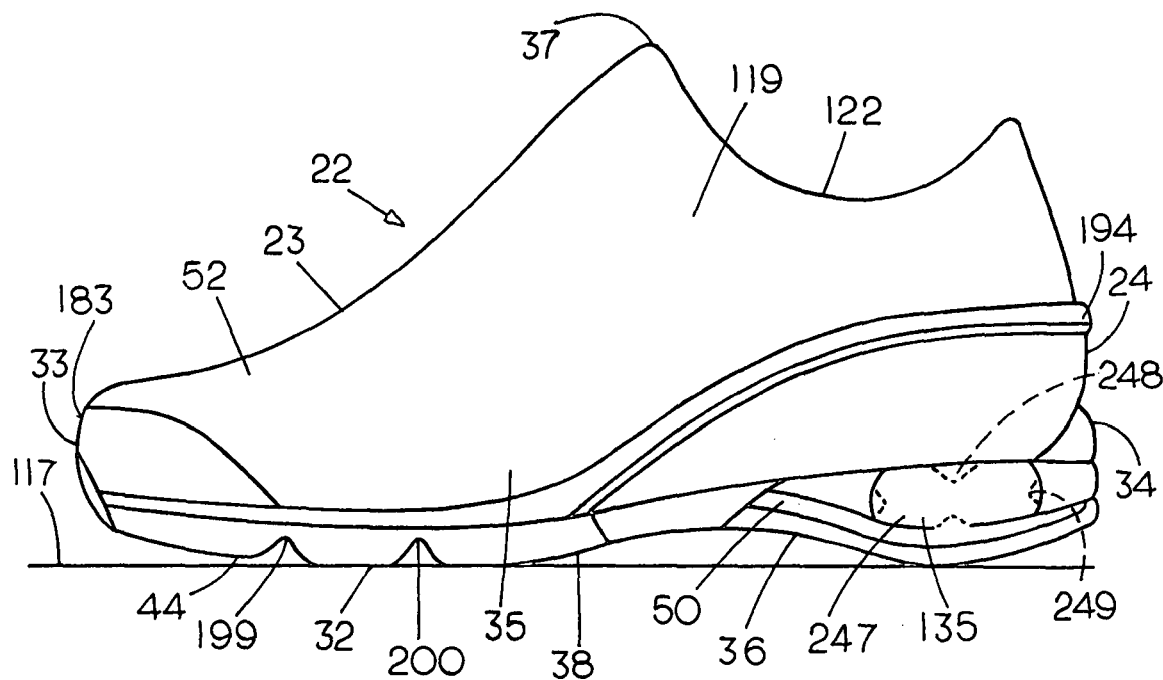
FIG. 31 is a medial side view of an embodiment of an article of footwear including a cushioning insert for providing additional cushioning means as discussed in connection with FIG. 30.

FIG. 31 is a medial side 35 view of an article of footwear 22 including a cushioning insert 247 consisting of additional cushioning means as discussed in connection with FIG. 30. A cushioning insert 247 can include mechanical means for enabling the component to be removably secured in functional relation to the article of footwear 22. As shown, the cushioning insert 247 can include one or more female mating structure 249 for coupling with one or more corresponding male mating structures 248 provided by one or more components of an article of footwear 22, and vice-versa.

Figure 32:
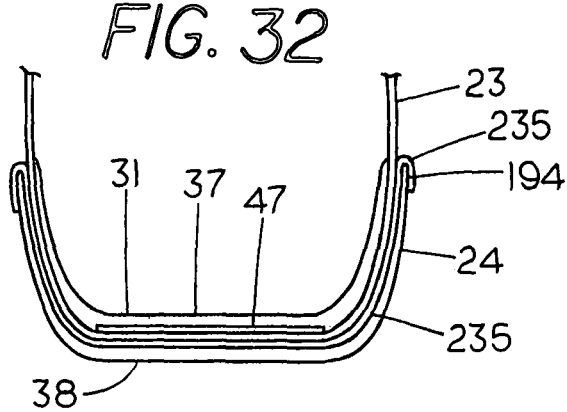
FIG. 32 is a cross-sectional view of the shoe upper, insole, exoskeleton and external heel counter of the embodiment of an article of footwear shown in FIG. 6, taken along line 32-32.

FIG. 32 is a cross-sectional view of the shoe upper 23, insole 31, exoskeleton 235 and external heel counter 24 of the article of footwear 22 shown in FIG. 6, taken along line 32-32. As shown, the external heel counter 24 fits within the heel counter channel 194 of the exoskeleton 235 which is affixed to the shoe upper 22, and the insole 31 extends upwards encompassing the wearer's heel and protecting it from the external heel counter 24.

FIG. 33 is a cross-sectional view of the superior spring element 47, external heel counter 24, external heel counter pocket 238, inferior spring element 50, backing portion 30 of the anterior outsole element 44, backing portion 30 of posterior outsole element 46, and the complementary male 85 and female 86 portions of the fastener 29 of the article of footwear 22 shown in FIG. 6, taken along like 33-33. As shown, the superior spring element 47 may have a thickness between approximately 1-2 mm, the external heel counter 24 may have thickness of approximately 3 mm, the inferior spring element 50 may have a thickness of approximately 5.25 mm, the backing 30 for the anterior outsole element 44 and also that for the posterior outsole element 46 may have a thickness approximately between 0.75-1.5 mm, and the external heel counter pocket 238 may have a thickness approximately between 1.5-2.5 mm. Again, the foregoing example is merely illustrative and is not intended to limit the footwear components to particular dimensions.

FIG. 34 is a bottom view showing the inferior side 38 of an anterior outsole element 44 showing a line for folding the part which is consistent with the approximate position of a wearer's MPJ's 104 and hence a corresponding line of flexion provided by the article of footwear 22. Shown is anterior phalangeal-phalangeal flex groove 199 and also MPJ flex groove 200. Also shown is a notch 71 for locating and securing the anterior side 33 of the anterior outsole element 44 in functional relation to the exoskeleton 235 and shoe upper 23, and an opening 72 near the posterior side 34 for accommodating the fastener 29.

FIG. 35 is a perspective view showing the upper 23 of an article of footwear 22 and also an anterior outsole element 44 being folded in the area of the MPJ's 104. The anterior outsole element 44 may then be inserted and mechanically engaged in functional relation with the exoskeleton 235 and upper 23.

FIG. 36 is a cross-sectional view showing portions of the anterior outsole element 44, exoskeleton 235 and upper 23 affixed in functional relation, taken along a line which is generally consistent with line 36-36, as shown in FIG. 3. As shown, the male portions of the anterior outsole element 44 may be inserted in a tongue and groove manner into the female grooves provided by the exoskeleton 235.

FIG. 37 is a lateral side 36 cross-sectional view showing an article of footwear 22 having an internal heel counter 24. As shown, the internal heel counter 24 may be inserted into the upper 23, and if desired, a lasting board 79 or superior spring element 47 can also be inserted. The inferior spring element 50 including a posterior outsole element 46 or sole 32 can then be secured in functional relation to the aforementioned components with the use of means for fastening, or more simply recited herein, fastening means, such as the components shown in FIGS. 12-18, and 33, and the like. Alternatively, the inferior spring element 50 and other footwear components may be secured with the use of fastening means such as the components shown in FIGS. 53-59, and the like. As shown in FIG. 37, the article of footwear 22 may include an insole 31 having a thickness of approximately 4-6 mm in the forefoot area 58, and may also include approximately 10 mm of toe spring 62.

FIG. 38 is a lateral side 36 cross-sectional view showing an article of footwear 22 having an internal heel counter 24 including a heel counter locking pin guide 268. In this embodiment, the heel counter 24 also includes an integral heel counter pocket 238 for receiving the anterior side of the inferior spring element 50. As shown in FIG. 53, the heel counter locking pin guide 268 can be mechanically engaged by insertion of a locking pin 253, and thereby be removably secured. As shown in FIG. 38, the article of footwear 22 includes an insole 31 having a thickness of approximately 7-10 mm in the forefoot area 58, and also includes approximately 15-25 mm of toe spring 62. The inferior spring element 50 including a posterior outsole element 46 or sole 32 may be secured with the use of fastening means such as the components shown in FIGS. 12-18, and 33, and the like. Alternatively, the inferior spring element 50 and other footwear components may be secured with the use of fastening means such as the components shown in FIGS. 53-59, and the like.

FIG. 39 is a lateral side cross-sectional view showing an article of footwear 22 including a cushioning insert 247. The cushioning insert 247 may consist of a foam cushioning element 135, or a fluid-filled bladder 101, or other cushioning means. As shown, the cushioning insert 247 may be secured in functional relation to the inferior spring element 50 with a fastener consisting of a snap-fit rivet 252. The cushioning insert 247 may be rotated clockwise or counter-clockwise about the snap-fit rivet 252, and may include a superior lock groove 250 and inferior lock groove 251 for mechanically engaging a superior lock rib 248 near the upper 23 and inferior lock rib 249 near the inferior spring element 50, posterior outsole element 46 or sole 32. The inferior spring element 50 including a posterior outsole element 46 or sole 32 may be secured with the use of fastening means such as the components shown in FIGS. 12-18, and 33, and the like. Alternatively, the inferior spring element 50 and other footwear components may be secured with the use of fastening means such as the components shown in FIGS. 53-59, and the like. As shown, the heel counter 24 includes a heel counter locking pin guide 268, but does not include a heel counter pocket 238 for receiving the anterior side of the inferior spring element 50. Instead, a sole pocket 273 which may be made of a robust metal, fiber composite, ceramic, or plastic material can be provided for this purpose.

FIG. 40 is a top view of an inferior spring element 50 including a cushioning insert 247. The cushioning insert 247 may be removably secured in position with the use of a fastener 29, such as a nut and bolt, or snap-fit rivet 252, and the like Accordingly, an individual may select from various cushioning inserts 247 exhibiting different stiffness in compression for possible use with an article of footwear 22.

FIG. 41 is a top view of an inferior spring element 50 including a cushioning insert 247 including a foam cushioning element 135 with three different areas including foam materials 134.1, 134.2 and 134.3 having different stiffness in compression. For example, foam material 134.1 can provide relatively low stiffness, whereas foam material 134.2 can provide medium stiffness, and foam material 134.3 relatively high stiffness in compression. Also shown in FIG. 41, are three superior lock grooves 250 and inferior lock grooves 251 on cushioning insert 247 which can be engaged by a superior lock rib 248 and inferior lock rib 149, as shown in FIG. 44. Accordingly, the cushioning insert 247 may be rotated clock-wise or counter-clockwise to select from the different cushioning options provided and then be secured in a desired position. Alternatively, a cushioning insert 247 could provide two or four different areas including different foam materials 134 having different stiffness in compression.

FIG. 42 is a top view of an inferior spring element 50 including a cushioning insert 247 consisting of a fluid-filled bladder 101 with three different areas including chambers 133.1, 133.2 and 133.3 having different stiffness in compression. Chamber 133.1 can provide relatively low stiffness, whereas chamber 133.2 can provide medium stiffness, and chamber 133.3 relatively high stiffness in compression. Also shown in FIG. 42, are three superior lock grooves 250 and inferior lock grooves 251 on cushioning insert 247 which can be engaged by a superior lock rib 248 and inferior lock rib 149, as shown in FIG. 44. Accordingly, the cushioning insert 247 may be rotated clock-wise or counter-clockwise to select from the different cushioning options provided and then be secured in a desired position.

FIG. 43 is a posterior view of an alternate cushioning insert 247 similar to that shown in FIG. 41, but further including two different overlapping foam materials 134.4 and 134.5 having different stiffness in compression. Also shown is a superior lock groove 250 and inferior lock groove 251 on cushioning insert 247 for being engaged with a superior lock rib 249 and inferior lock rib 249, as shown in FIG. 44. The superior part consisting of foam material 134.4 can exhibit less stiffness in compression relative to the inferior part consisting of foam material 134.5. Accordingly the cushioning insert 247 and foam cushioning element 135 can progressively exhibit greater stiffness in compression starting from the lateral side 36 and moving towards the medial side 35. This may possibly serve to enhance the stability of an article of footwear 22 as concerns rearfoot pronation. Further, each of the three different areas of the cushioning insert 247 could including two foam materials 134 having different stiffness in compression.

FIG. 44 is a posterior view of an article of footwear 22 similar to that shown in FIG. 39. A cushioning insert 247 which may possibly consist of a foam material 134 or fluid-filled bladder 101 is shown in position between the upper 23 and inferior spring element 50 of the article of footwear 22. Also shown is a superior lock rib 248 extending from the upper 23 for engaging a superior lock groove 250, and also an inferior lock rib 249 extending from the posterior outsole element 46 for engaging a corresponding inferior lock groove 251 on the cushioning insert 247. Accordingly, the cushioning insert 247 may be rotated clock-wise or counter-clockwise to select from the different cushioning options provided and be secured in a desired position.

FIG. 45 is a lateral view of an inferior spring element 50 positioned in functional relation to a posterior outsole element and also a cushioning insert 247 including a foam cushioning element 135 made of a foam material 134.6 having relatively low stiffness in compression. The cushioning insert 247 including a foam cushioning element 135 made of a foam material 134.6 having a relatively low stiffness in compression may be removed and replaced by a cushioning insert 247 including a foam cushioning element 135 made of a foam material 134.7 having a medium stiffness in compression as shown in FIG. 46, or alternatively a cushioning insert 247 including a foam cushioning element 135 made of a foam material 134.8 having a relatively high stiffness in compression as shown in FIG. 47 in order to customize the performance of an article of footwear 22.

FIG. 46 is a lateral view of an inferior spring element 50 positioned in functional relation to a posterior outsole element and also a cushioning insert 247 including a foam cushioning element 135 made of a foam material 134.7 having medium stiffness in compression. The cushioning insert 247 including a foam cushioning element 135 made of a foam material 134.7 having a medium stiffness in compression may be removed and replaced by a cushioning insert 247 including a foam cushioning element 135 made of a foam material 134.6 having a relatively low stiffness in compression as shown in FIG. 45, or alternatively a cushioning insert 247 including a foam cushioning element 135 made of a foam material 134.8 having a relatively high stiffness in compression as shown in FIG. 47 in order to customize the performance of an article of footwear 22.

FIG. 47 is a lateral view of an inferior spring element 50 positioned in functional relation to a posterior outsole element and also a cushioning insert 247 including a foam cushioning element 135 made of a foam material 134.8 having relatively high stiffness in compression. The cushioning insert 247 including a foam cushioning element 135 made of a foam material 134.8 having a relatively high stiffness in compression may be removed and replaced by a cushioning insert 247 including a foam cushioning element 135 made of a foam material 134.6 having a relatively low stiffness in compression as shown in FIG. 45, or alternatively a cushioning insert 247 including a foam cushioning element 135 made of a foam material 134.7 having a medium stiffness in compression as shown in FIG. 46 in order to customize the performance of an article of footwear 22. The three cushioning inserts 247 shown in FIGS. 45, 46, and 47 including foam materials 134.6, 134.7 and 134.8 can be color coded for identification purposes and to facilitate easy selection. Accordingly, it can be readily understood that making a single selection regarding an inferior spring element 50 in combination with the possibility of selecting one of three cushioning inserts 247 having different stiffness in compression can provide four options for customizing the performance of an article of footwear 22.

FIG. 48 is a posterior view of a cushioning insert 247 including a foam cushioning element 135 including two overlapping parts having different stiffness. The superior part including foam material 134.4 exhibits less stiffness in compression relative to the inferior part including foam material 134.5. Accordingly the cushioning insert 247 and foam cushioning element 135 can progressively exhibit greater stiffness in compression starting from the lateral side 36 and moving towards the medial side 35. This may possibly serve to enhance the stability of an article of footwear 22 as concerns rearfoot pronation.

FIG. 49 is a side view showing a locking pin 253.3 for possibly securing in functional relation and partial or complete combination a heel counter 24, inferior spring element 50, superior spring element 47, upper 23, and the posterior outsole element 46 or sole 32 of an article of footwear 22. As shown in FIGS. 56-58, a locking pin can include one or more threaded portions 263. The locking pin 253.3 can be secured in functional relation and partial or complete combination to a medial locking pin guide 258, a lateral locking pin guide 259, an inferior spring element locking pin guide 260, an outsole locking pin guide 265, and an extension and locking pin guide 254 for a superior spring element 47. The head 261 of the locking pin 253.3 can possibly include an appropriate structure for accommodating the use of a tool such as a flat or Phillips screwdriver, Allen, or star drive tool, and the like FIG. 50 is a side view showing a locking pin 253.2 including an O ring 264 for possibly securing in functional relation and partial or complete combination a heel counter 24, inferior spring element 50, and a posterior outsole element 46 or sole 32 of an article of footwear 22. The O ring may be made of a resilient elastomer and be affixed upon a recess forming an O ring seat 269 on the shaft 262 of locking pin 253.2. Another O ring seat 270 for mating with the outer diameter of the O ring 264 can be included in the heel counter 24 or portion of the sole 32 of an article of footwear 22. Accordingly, when the locking pin 253.2 is pushed into the recess or opening 72 associated with the medial locking pin guide 258, lateral locking pin guide 259, inferior spring element locking pin guide 260, and possible outsole locking pin guide 265, the O ring 264 can become compressed and thereby exert sufficient force and resistance to movement as to effectively secure the locking pin 253.2 in functional relation to the article of footwear 22.

FIG. 51 is a side view showing a locking pin 253.6 including a locking pin arm 255 having a locking pin grip 256 for possibly securing in functional relation and partial or complete combination a heel counter 24, inferior spring element 50, superior spring element 47, upper 23, and posterior outsole element 46 or sole 32 of an article of footwear 22. The locking pin 253.6 may be inserted and then rotated clockwise causing a portion of the locking pin arm 255 to be mechanically engaged by a locking tab 257 thereby securing the locking pin 253.6 in functional relation to the heel counter 24, as shown, or alternatively a portion of the sole 32 of an article of footwear 22.

FIG. 52 is a side view showing a quarter turn locking pin 253.1 for possibly securing in functional relation and partial or complete combination a heel counter 24, inferior spring element 50, superior spring element 47, upper 23, and posterior outsole element 46 of an article of footwear 22. The quarter turn locking pin 253.1 can be inserted into an opening 72 associated with the female receptacle 267 with the opposing quarter turn male parts 266 in a horizontal orientation, and then be rotated clockwise to a vertical orientation in order to secure it in functional relation to the corresponding female receptacle 267 provided within the heel counter 24, or alternatively, a portion of the sole 32 of the article of footwear 22.

FIG. 53 is an inferior view of an article of footwear 22 having portions broken away to illustrate the possibility of a locking pin 253 being secured in functional relation and partial or complete combination to a medial locking pin guide 258, a lateral locking pin guide 259, an inferior spring element locking pin guide 260, an outsole locking pin guide 265, an extension and locking pin guide 254 for a superior spring element 47, and also a locking pin guide for a heel counter 268. As shown, the inferior spring element locking pin guide can consist of an extension from a casing 270 which covers and at least partially envelops a portion of the superior side 37 and inferior side 38, and also possibly a portion of the medial side 35 and lateral side 36 proximate the anterior side 33 of the inferior spring element 50. The casing 270 can have precisely defined outer dimensions for fitting with close tolerances within a heel counter pocket 238, or alternatively, a like pocket provided within the sole 32 of an article of footwear 22. The head 261 of the locking pin 253 can possibly include an appropriate structure for accommodating the use of a tool such as a flat or Phillips screwdriver, Allen, or star drive tool, and the like.

FIG. 54 is a perspective view of a quarter turn locking pin 253.1. The quarter turn locking pin 253.1 can include a head 261, a shaft 262, and a male key portion 266. As shown in FIG. 52, the locking pin 253.1 may be inserted into an opening 72 associated with a quarter turn female receptacle 267 associated with a heel counter 24, and then be rotated approximately 90 degrees or quarter turn in order to secure the quarter turn locking pin 253.1 and other footwear components in functional relation to the shoe upper 23 of the article of footwear 22. The head 261 of the quarter turn locking pin 253.1 can include an appropriate structure for accommodating the use of a tool such as a flat or Phillips screwdriver, Allen, or star drive tool, and the like.

FIG. 55 is a perspective view of a locking pin 253.2 including an O ring 264. Again, the O ring can be made of a resilient elastomer and be affixed upon a recess forming an O ring seat 269 on the shaft 262 of locking pin 253.2. As shown in FIG. 50, another O ring seat 270 for mating with the outer diameter of the O ring 264 can be included in the heel counter 24. Accordingly, when the locking pin 253.2 is pushed into the opening 72 associated with the medial locking pin guide 258, lateral locking pin guide 259, inferior spring element locking pin guide 260, and possibly an outsole locking pin guide 265 and also the extension and locking pin guide 254 for a superior spring element 47, the O ring 264 can become compressed and thereby exert sufficient force and resistance to movement as to effectively secure the locking pin 253.2 in functional relation to the article of footwear 22.

FIG. 56 is a perspective view of a locking pin 253.3 including a threaded portion 263 on the end which is opposite the head 261. The outer diameter of the treaded portion 263 is equal to or less than the inner diameter of a medial locking pin guide 258, lateral locking pin guide 259, inferior spring element locking pin guide 260, outsole locking pin guide 265, and heel counter locking pin guide 268 so that it can easily pass through their corresponding openings 72. The head 261 of locking pin 253.3 can include an appropriate structure for accommodating the use of a tool such as a flat or Phillips screwdriver, Allen, or star drive tool, and the like.

FIG. 57 is a perspective view of a locking pin 253.4 including a threaded portion 263 near the head 261. The outer diameter of the treaded portion 263 is greater than the inner diameter of a medial locking pin guide 258, lateral locking pin guide 259, inferior spring element locking pin guide 260, outsole locking pin guide 265, and heel counter locking pin guide 268. The head 261 of locking pin 253.3 can include an appropriate structure for accommodating the use of a tool such as a flat or Phillips screwdriver, Allen, or star drive tool, and the like.

FIG. 58 is a perspective view of a locking pin 253.5 included two threaded portions 263 near the head 261 and also on the end opposite the head 261. The outer diameter of the treaded portion 263 present on the end opposite the head 261 is equal to or less than the inner diameter of a medial locking pin guide 258, lateral locking pin guide 259, inferior spring element locking pin guide 260, outsole locking pin guide 265, and heel counter locking pin guide 268 so that it can easily pass through their corresponding openings 72. However, the outer diameter of the treaded portion 263 is greater than the inner diameter of a medial locking pin guide 258, lateral locking pin guide 259, inferior spring element locking pin guide 260, outsole locking pin guide 265, and heel counter locking pin guide 268. The head 261 of locking pin 253.3 can include an appropriate structure for accommodating the use of a tool such as a flat or Phillips screwdriver, Allen, or star drive tool, and the like.

FIG. 59 is a perspective view of a locking pin 253.6 including a locking pin arm 255 having a locking pin grip 256. As shown in FIG. 51, the locking pin 253.6 may be inserted and then rotated clockwise causing a portion of the locking pin arm 255 to be mechanically engaged by locking tab 257 thereby securing the locking pin 253.6 in functional relation to as heel counter 24, as shown, or alternatively a portion of the sole 32 of an article of footwear 22.

FIG. 60 is a posterior view of an article of footwear 22 including an inferior spring element 50 in a centered position. As shown, a superior position indicator 271 can be provided on the bump stop 186 or upper 23, and an inferior position indicator 272 on the inferior spring element 50, posterior outsole element 46, or sole 32 of an article of footwear 22. The superior position indicator 271 may include a plurality of marks or like features indicating various possible orientations for the inferior spring element 50 relative to the upper 23 of the article of footwear 22. As shown in FIG. 60, the central mark is consistent with a neutral setting at 0 degrees. The left mark on the lateral side 36 is consistent with an orientation approximately less than or equal to 5 degrees, and could be advantageous for use by an individual who supinates too much. The right mark on the medial side 35 is consistent with an orientation approximately less than or equal to 5 degrees, and could be advantageous for use by an individual who pronates excessively.

FIG. 61 is a posterior view of an article of footwear 22 including an inferior spring element 50 orientated approximately less than or equal to 5 degrees towards the lateral side 36. Again, this setting and orientation could be appropriate for use by an individual who supinates excessively.

FIG. 62 is a posterior view of an article of footwear 22 including an inferior spring element 50 orientated approximately less than or equal to 5 degrees towards the medial side 35. Again, this setting and orientation could be appropriate for use by an individual who pronates excessively.

FIG. 63 is a top view of an inferior spring element 50 having a casing 270 including at least one inferior spring element locking pin guide 260. As shown in FIG. 63, the inferior spring element 50 can have the same width of approximately 74 mm near the weight bearing center of the heel 57, and the same overall length of approximately 130 mm as the inferior spring element 50 shown in FIG. 8. The inferior spring element 50 shown in FIG. 63 is also generally similar to that shown in FIG. 53. However, the length required to accommodate for the inferior spring element locking pin guide 260 was essentially added to that of the inferior spring element 50 shown in FIG. 8 in order to create the embodiment shown in FIG. 53, whereas the length required to accommodate the inferior spring element locking pin guide 260 was subtracted from the inferior spring element 50 shown in FIG. 8 in order to create the embodiment shown in FIG. 63. The inferior spring element 50 can include a casing 270 having at least one inferior spring element locking pin guide 260. The casing 270 can be made of a robust metal or a plastic material, and can extend about a portion of the superior side 37 and inferior side 38, and possibly also about a portion of the medial side 35 and lateral side 36 to partially envelop the anterior side of the inferior spring element 50.

FIG. 64 is a top view of an embodiment of inferior spring element 50 including a medial fork 274 and a lateral fork 275 which are defined by a slit 82 extending from the medial and posterior side 34. As shown, the slit 82 extends to a position which approximately coincides with that of the weight bearing center of a wearer's heel 57. This structure may serve to reduce the effective flexural stiffness of the inferior spring element 50 on the lateral and posterior sides during footstrike and the early portion of the ground support phase of the walking or running gait cycle. In some circumstances, this configuration may serve to enhance rearfoot stability by decreasing the amount and/or rate of pronation. Alternatively, it can be readily understood that an inferior spring element 50 similar to that shown in FIG. 64 could instead use the fastening means shown in FIG. 63 and have a casing 270 including at least one inferior spring element locking pin guide 260.

FIG. 65 is a top view of an embodiment inferior spring element 50 including a medial fork 274 and a lateral fork 275 which are defined by a slit 82 extending from the medial and posterior side 34. As shown, the slit 82 extends from the middle of the posterior side 34 to the position of the indicated transverse axis 91 and also possible transverse flexural axis 59.1. This notch 71 and slit 82 creating the medial fork 274 and lateral fork 275 structures may serve to reduce the effective flexural stiffness of the inferior spring element 50 on the lateral and posterior side during footstrike and the early portion of the ground support phase of the walking or running gait cycle. For some individuals, this configuration may serve to enhance rearfoot stability by decreasing the amount and/or rate of pronation. Alternatively, it can be readily understood that an inferior spring element 50 similar to that shown in FIG. 65 could instead use the fastening means shown in FIG. 63 and have a casing 270 including at least one inferior spring element locking pin guide 260.

FIG. 66 is a top view of an embodiment of an inferior spring element 50 showing in dashed phantom lines the possible inclusion of a medial fork 244 and a lateral fork 275 defined by a slit 82 which extend about three quarters of the distance between the posterior tangent point 161 and the anterior tangent point 160. Again, an inferior spring element 50 may be made of a fiber composite material, or a spring steel material.

FIG. 67 is a top x-ray view of an embodiment of an inferior spring element 50 showing in dashed phantom lines the possible inclusion of a medial fork 274 and a lateral fork 275 which are defined by a slit 82, and also the beginning of tapering posterior of the anterior tangent point 160. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22. The inferior spring element 50 may be made of carbon fiber composite materials 102. In this regard, the inferior spring element 50 may include a top and bottom cover layer of woven carbon fiber material 102.2 each having a thickness of about 0.23 mm, and also about 33 internal layers of unidirectional carbon fiber composite material 102.1 each having a thickness of about 0.15 mm. As shown, tapering can be introduced in the inferior spring element 50 by shortening the length of about eighteen layers of the unidirectional carbon fiber material 102.1 at approximately 5 mm intervals beginning posterior of the anterior tangent point 160. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

FIG. 68 is a top x-ray view of an embodiment of an inferior spring element 50 showing in dashed phantom lines the possible inclusion of a medial fork 274 and a lateral fork 275 which are defined by a slit 82, and also the beginning of tapering at about three quarters of the distance between the posterior tangent point 161 and the anterior tangent point 160. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22. The inferior spring element 50 may be made of carbon fiber composite materials 102. In this regard, the inferior spring element 50 may include a top and bottom cover layer of woven carbon fiber material 102.2 each having a thickness of about 0.23 mm, and also about 33 internal layers of unidirectional carbon fiber composite material 102.1 each having a thickness of about 0.15 mm. As shown, tapering can be introduced in the inferior spring element 50 by shortening the length of about eighteen layers of the unidirectional carbon fiber material 102.1 at approximately 4 mm intervals beginning about three quarters of the distance between the posterior tangent point 161 and the anterior tangent point 160. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

FIG. 69 is a top x-ray view of an embodiment of an inferior spring element 50 showing in dashed phantom lines the possible inclusion of a medial fork 274 and a lateral fork 275 which are defined by a slit 82, and also the beginning of tapering at about two thirds of the distance between the posterior tangent point 161 and the anterior tangent point 160. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22. The inferior spring element 50 may be made of carbon fiber composite materials 102. In this regard, the inferior spring element 50 may include a top and bottom cover layer of woven carbon fiber material 102.2 each having a thickness of about 0.23 mm, and also about 33 internal layers of unidirectional carbon fiber composite material 102.1 each having a thickness of about 15 mm. As shown, tapering can be introduced in the inferior spring element 50 by shortening the length of about eighteen layers of the unidirectional carbon fiber material 102.1 at approximately 3-4 mm intervals beginning about two thirds of the distance between the posterior tangent point 161 and the anterior tangent point 160. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

FIG. 70 is a top x-ray view of an embodiment of an inferior spring element 50 showing in dashed phantom lines the possible inclusion of a medial fork 274 and a lateral fork 275 which are defined by a slit 82, and also the beginning of tapering at about half of the distance between the posterior tangent point 161 and the anterior tangent point 160. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22.

The inferior spring element 50 may be made of carbon fiber composite materials 102. In this regard, the inferior spring element 50 may include a top and bottom cover layer of woven carbon fiber material 102.2 each having a thickness of about 0.23 mm, and also about 33 internal layers of unidirectional carbon fiber composite material 102.1 each having a thickness of about 0.15 mm. As shown, tapering can be introduced in the inferior spring element 50 by shortening the length of about eighteen layers of the unidirectional carbon fiber material 102.1 at approximately 3-4 mm intervals beginning about half of the distance between the posterior tangent point 161 and the anterior tangent point 160. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

FIG. 71 is a top x-ray view of an embodiment of an inferior spring element 50 showing the beginning of tapering at about three quarters of the distance between the posterior tangent 161 point and the anterior tangent point 160 on the lateral side 36, but less than half of the distance between the posterior tangent point 161 and the anterior tangent point 160 on the medial side 35. Accordingly, the inferior spring element 50 has greater thickness and stiffness on the medial side 35 relative to the lateral side 36. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22. The inferior spring element 50 may be made of carbon fiber composite materials 102.

For example, the inferior spring element 50 may include a top and bottom cover layer of woven carbon fiber material 102.2 each having a thickness of about 23 mm, and also about 33 internal layers of unidirectional carbon fiber composite material 102.1 each having a thickness of about 0.15 mm. As shown using an x-ray view, tapering can be introduced in the inferior spring element 50 by shortening the length of about eighteen layers of the unidirectional carbon fiber material 102.1 at approximately 4 mm intervals beginning about three quarters of the distance between the posterior tangent point 161 and the anterior tangent point 160 on the lateral side 36, and by shortening the length of about 12 layers beginning less than half the distance between the posterior tangent point 161 and the anterior tangent point 160 on the medial side 35. Other variations in the configuration and number of layers used to make an inferior spring element 50 are possible. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

FIG. 72 is a top x-ray view of an inferior spring element 50 including a medial fork 274 and a lateral fork 275 which are defined by a slit 82, and also the beginning of tapering at about three quarters of the distance between the posterior tangent point 161 and the anterior tangent point 160 on the lateral side 36, but less than half of the distance between the posterior tangent point 161 and the anterior tangent point 160 on the medial side 35. Accordingly, the inferior spring element 50 has greater thickness and stiffness on the medial side 35 relative to the lateral side 36. The length of the inferior spring element 50 may be in the range between 100-150 mm, and the width may be in the range of 65-85 mm for a men's size 9 article of footwear 22. In particular, the length of the inferior spring element 50 may be in the range between 120-135 mm, and the width may be in the range of 70-80 mm for a men's size 9 article of footwear 22. The inferior spring element 50 may be made of carbon fiber composite materials 102.

For example, the inferior spring element 50 may include a top and bottom cover layer of woven carbon fiber material 102.2 each having a thickness of about 0.23 mm, and also about 33 internal layers of unidirectional carbon fiber composite material 102.1 each having a thickness of about 0.15 mm. As shown using an x-ray view, tapering can be introduced in the inferior spring element 50 by shortening the length of about eighteen layers of the unidirectional carbon fiber material 102.1 at approximately 4 mm intervals beginning about three quarters of the distance between the posterior tangent point 161 and the anterior tangent point 160 on the lateral side 36, and by shortening the length of about 12 layers beginning less than half the distance between the posterior tangent point 161 and the anterior tangent point 160 on the medial side 35. Other variations in the configuration and number of layers used to make an inferior spring element 50 are possible. Accordingly, the thickness of the inferior spring element 50 may be in the range between approximately 4-5.5 mm at the anterior side 33, but then in the range between 2-3.5 mm at the posterior side 34. In particular, the thickness of the inferior spring element 50 may be in the range between approximately 4.8-5.25 mm at the anterior side 33, but then in the range between 2.6-3.25 mm at the posterior side 34. This particular example and configuration may be suitable for an individual having a body weight of approximately 160 pounds.

As shown in FIG. 66 of U.S. Pat. No. 7,101,235, a parent to the present application which has been incorporated by reference herein, an alternative embodiment of an inferior spring element may be made in two completely separate inferior spring element portions 50.1 and 50.2, that is, instead of a single footwear component having a medial fork 274 and a lateral fork 275. These two separate inferior spring element portions may be configured in an overlapping relationship and then be secured by a single mechanical fastener, or alternatively by two mechanical fasteners, as generally illustrated by FIGS. 203-208, and 216 of U.S. Pat. No. 7,101,235 relating to anterior spring elements. Nevertheless, an upper 23, heel counter 24, inferior spring element 50, and sole 32 of an article of footwear 22 can be releasably secured by a single mechanical fastener 29.

FIG. 73 is a medial side view of an inferior spring element 50 including a medial fork 274 and a lateral fork 275 defined by a slit 82 extending from the posterior side 34 which is generally similar to that shown in FIG. 72, but further including asymmetry in the configuration and curvature as between the medial fork 274 and the lateral fork 275. In particular, the lateral fork 275 may have a different and greater upwards curvature between the posterior tangent point 161 and the posterior side 34 of the inferior spring element 50 for accommodating footstrike in the rearfoot strike zone and thereby possibly serve to reduce the rate of pronation and amount of total pronation experienced by wearers of the article of footwear 22. In an alternative embodiment, the lateral fork 275 may also have a different curvature than the medial fork 274 beginning at a position between the anterior tangent point 160 and posterior tangent point 161 for affecting the same purpose. Other variations in the configuration of an inferior spring element 50 are possible.

While the above detailed description of the invention contains many specificities, these should not be construed as limitations on the scope of the invention, but rather as exemplifications of several embodiments thereof. It can be readily understood that the various teachings, alternate embodiments, methods and processes disclosed herein can be used in various combinations and permutations. For example, a spring element can consist of a heel counter and inferior spring element and be provided as a single integral footwear component. Alternatively, a spring element can consist of a heel counter, superior spring element, and inferior spring element and be provided as a single integral component. Many other variations are possible. Further, some of the footwear components recited in the present application could be at least partially affixed in functional relation to make custom article of footwear with the use of stitching, cement, epoxy, heat and/or sonic welding, fusing, bonding, hook and pile, or other more conventional mechanical means. Accordingly, the scope of the invention should be determined not by the embodiments discussed or illustrated, but by the appended claims and their legal equivalents.

I claim:

1. An article of footwear comprising an upper, a heel counter having a pocket, a sole, an inferior spring element having an end disposed in said pocket, and a single mechanical fastener comprising male and female releasable parts, said inferior spring element disposed below the upper, wherein said upper, said heel counter, said sole, and said inferior spring element are releasably secured together with said mechanical fastener.

2. The article of footwear according to claim 1, further comprising a selectively adjustable cushioning insert disposed below said upper.

3. The article of footwear according to claim 1, said inferior spring element comprising a medial fork and a lateral fork.

4. The article of footwear according to claim 3, wherein said inferior spring element comprises an anterior side, posterior side, medial side, and lateral side, said inferior spring element comprising a slit extending from said posterior side.

5. The article of footwear according to claim 1, further comprising a superior spring element.

6. The article of footwear according to claim 5, further comprising an insole affixed to said superior spring element.

7. The article of footwear according to claim 1, further comprising at least one footwear component selected from the group of footwear components consisting of wedges, insoles, midsoles, heel counter channels, stabilizers, side supports, stability elements, frames, sidewalls, lasting boards, exoskeletons, laces, straps, toe counters, tongues, vamps, quarters, collars, tips, eyestays, bump stops, springs, superior spring elements, anterior spring elements, anterior and inferior spring elements, intermediate anterior spring elements, superior anterior spring elements, inferior anterior spring elements, posterior spring elements, inferior spring elements having medial and lateral forks, spring guards, anterior spacers, posterior spacers, fluid-filled bladders, outsoles, anterior outsole elements, middle outsole elements, posterior outsole elements, stabilizers, cushioning elements, foam cushioning elements, cushioning inserts, traction members, spikes, cleats, bushings, wear prevention inserts, gaskets, intelligent cushioning devices, central processing units, heel counter inserts, and inferior spring element inserts.

8. The article of footwear according to claim 1, wherein said sole comprises an anterior outsole element and a posterior outsole element.

9. The article of footwear according to claim 1, said upper comprising a longitudinal axis, said inferior spring element being capable of rotation at least in the range between five degrees towards said medial side and five degrees towards said lateral side from said longitudinal axis prior to being removably secured in a selected orientation.

10. An article of footwear comprising an upper having a superior side, an inferior side, an anterior side, a posterior side, a medial side, a lateral side, an exterior, an interior, an integral heel counter having a pocket, a sole, means for cushioning including an inferior spring element disposed below the upper having an end disposed in said pocket, and a single releasable mechanical fastener, said upper including said heel counter, said sole, and said means for cushioning including said inferior spring element being releasably secured together with said mechanical fastener, said means for cushioning including said inferior spring element being secured between said upper and said sole.

11. The article of footwear according to claim 10, further comprising a superior spring element.

12. The article of footwear according to claim 10, said inferior spring element comprising a medial fork and lateral fork.

13. The article of footwear according to claim 12, wherein said inferior spring element comprises an anterior side, posterior side, medial side, and lateral side, said inferior spring element comprising a slit extending from said medial side.

14. The article of footwear according to claim 10, further comprising footwear component selected from the group of footwear components consisting of mechanical fasteners having male and female parts, locking pins, snaps, rivets, pins, splines, flanges, hook and pile, hooks, wedges, insoles, midsoles, heel counter channels, stabilizers, side supports, stability elements, frames, sidewalls, lasting boards, exoskeletons, laces, straps, toe counters, tongues, vamps, quarters, collars, tips, eyestays, bump stops, springs, superior spring elements, anterior spring elements, anterior and inferior spring elements, intermediate anterior spring elements, superior anterior spring elements, inferior anterior spring elements, posterior spring elements, inferior spring elements having medial and lateral forks, spring guards, anterior spacers, posterior spacers, fluid-filled bladders, outsoles, anterior outsole elements, middle outsole elements, posterior outsole elements, stabilizers, cushioning elements, foam cushioning elements, cushioning inserts, traction members, spikes, cleats, bushings, wear prevention inserts, gaskets, intelligent cushioning devices, central processing units, heel counter inserts, and inferior spring element inserts.

15. An article of footwear comprising an upper having a length, a superior side, an inferior side, a medial side, a lateral side, an anterior side, a posterior side, an exterior, and an interior, an insole, a sole, a heel counter having a pocket, said heel counter and pocket being rigid, said heel counter extending anteriorly from said posterior side in the range between fifty and sixty percent of the length of said upper, and an inferior spring element disposed below the upper and having an end disposed in said pocket and secured in functional relation to said heel counter.

16. The article of footwear according to claim 15, further comprising at least one footwear component selected from the group of footwear components consisting of mechanical fasteners, mechanical fasteners having male and female parts, locking pins, snaps, rivets, pins, splines, flanges, hook and pile, hooks, wedges, midsoles, heel counter channels, stabilizers, side supports, stability elements, frames, sidewalls, lasting boards, exoskeletons, laces, straps, toe counters, tongues, vamps, quarters, collars, tips, eyestays, bump stops, springs, superior spring elements, anterior spring elements, anterior and inferior spring elements, intermediate anterior spring elements, superior anterior spring elements, inferior anterior spring elements, posterior spring elements, inferior spring elements having medial and lateral forks, spring guards, anterior spacers, posterior spacers, fluid-filled bladders, outsoles, anterior outsole elements, middle outsole elements, posterior outsole elements, stabilizers, cushioning elements, foam cushioning elements, cushioning inserts, traction members, spikes, cleats, bushings, wear prevention inserts, gaskets, intelligent cushioning devices, central processing units, heel counter inserts, and inferior spring element inserts.

17. An article of footwear comprising an upper, a heel counter having a pocket, a sole, an inferior spring element having an end disposed in said pocket and comprising a medial fork and a lateral fork, and a single mechanical fastener comprising releasable male and female parts, said inferior spring element disposed below the upper, wherein said upper, said heel counter, said sole, and said inferior spring element are releasably secured together with said mechanical fastener.

18. The article of footwear according to claim 17, wherein at least a portion of said sole is releasably secured to said inferior spring element.

19. The article of footwear according to claim 17, further comprising at least one footwear component selected from the group of footwear components consisting of wedges, insoles, midsoles, heel counters, heel counter channels, stabilizers, side supports, stability elements, frames, sidewalls, lasting boards, exoskeletons, laces, straps, toe counters, tongues, vamps, quarters, collars, tips, eyestays, bump stops, springs, superior spring elements, anterior spring elements, anterior and inferior spring elements, intermediate anterior spring elements, superior anterior spring elements, inferior anterior spring elements, posterior spring elements, spring guards, anterior spacers, posterior spacers, fluid-filled bladders, outsoles, anterior outsole elements, middle outsole elements, posterior outsole elements, stabilizers, cushioning elements, foam cushioning elements, cushioning inserts, traction members, spikes, cleats, bushings, wear prevention inserts, gaskets, intelligent cushioning devices, central processing units, heel counter inserts, and inferior spring element inserts.

20. The article of footwear according to claim 17, wherein at least a portion of said medial fork is thicker and stiffer than a corresponding portion of said lateral fork.

21. The article of footwear according to claim 17, wherein the medial fork and the lateral fork of said inferior spring element are asymmetric.

22. An article of footwear comprising an anterior side, posterior side, medial side, lateral side, superior side, inferior side, a sole, and an upper having a forefoot area, a midfoot area, and a rearfoot area, said upper comprising an exoskeleton including means for mechanically engaging at least a portion of said sole, said exoskeleton comprising at least one groove portion extending substantially around the anterior side, medial side, and lateral side on the inferior side of said upper in said forefoot area, said sole comprising an anterior outsole element including an outsole portion and also a backing portion comprising a tongue portion, the backing portion of said anterior outsole element being insertable within said at least one groove portion of said exoskeleton in said forefoot area on said inferior side of said upper along a transverse line extending between said medial side and said lateral side corresponding to the widest portion of said forefoot area, said anterior outsole element extending from said anterior side of said forefoot area and having an end disposed within a pocket located in said midfoot area, said anterior outsole element being removably secured in a functional relation to said upper with a removable mechanical fastener.

* * * * *